(12) United States Patent
Marichal

(10) Patent No.: US 11,980,168 B2
(45) Date of Patent: May 14, 2024

(54) SYSTEM AND METHOD FOR IDENTIFYING, FEEDING AND HANDLING ANIMALS, IN PARTICULAR DAIRY CATTLE

(71) Applicant: José Marichal, Canelones (UY)

(72) Inventor: José Marichal, Canelones (UY)

( * ) Notice: Subject to any disclaimer, the term of this patent is extended or adjusted under 35 U.S.C. 154(b) by 249 days.

(21) Appl. No.: 16/956,941

(22) PCT Filed: Dec. 20, 2018

(86) PCT No.: PCT/ES2018/070820
§ 371 (c)(1),
(2) Date: Jun. 22, 2020

(87) PCT Pub. No.: WO2019/122486
PCT Pub. Date: Jun. 27, 2019

(65) Prior Publication Data
US 2021/0000068 A1  Jan. 7, 2021

(30) Foreign Application Priority Data
Dec. 21, 2017  (UY) ..................................... UY37539

(51) Int. Cl.
*A01K 5/02*   (2006.01)
*A01K 1/10*   (2006.01)
*A01K 1/12*   (2006.01)
*A01K 29/00*  (2006.01)

(52) U.S. Cl.
CPC .............. *A01K 5/0275* (2013.01); *A01K 1/10* (2013.01); *A01K 1/123* (2013.01); *A01K 5/0291* (2013.01); *A01K 29/005* (2013.01)

(58) Field of Classification Search
CPC ........ A01K 5/0275; A01K 1/10; A01K 1/123; A01K 5/0291; A01K 5/02; A01K 5/01; A01K 29/005
See application file for complete search history.

(56) References Cited

U.S. PATENT DOCUMENTS

| 3,929,277 A | 12/1975 | Byrne et al. |
| 4,129,855 A | 12/1978 | Rodrian |
| 4,712,511 A | 12/1987 | Zamzow et al. |

(Continued)

FOREIGN PATENT DOCUMENTS

| CA | 2719886 | 5/1996 |
| CN | 202603356 U | 12/2012 |

(Continued)

*Primary Examiner* — David J Parsley
*Assistant Examiner* — Carly W. Lynch
(74) *Attorney, Agent, or Firm* — Muncy, Geissler, Olds & Lowe, P.C.

(57) ABSTRACT

A system and method for individualized feeding of animals, based on a mobile feeding device that continuously moves along a feeding trough. The method includes identifying each animal a number of times until a reliable identification is reached, dispensing individually customized combinations of multiple foods and additives, dragging unconsumed food left in the trough and measuring unconsumed food left by each individual animal, ordering animal arrival/exit to the trough by an endless curtain that enables/blocks access to the trough, with alternative options such as unconsumed food recovery and recycling, with an alternative configuration for animals accessing the trough in any order.

7 Claims, 36 Drawing Sheets

(56) References Cited

U.S. PATENT DOCUMENTS

| | | | |
|---|---|---|---|
| 5,069,165 A | 12/1991 | Rousseau | |
| 5,241,924 A | 9/1993 | Lundin et al. | |
| 5,309,864 A * | 5/1994 | Harmsen | A01K 1/105 |
| | | | 119/57.92 |
| 5,740,757 A | 4/1998 | Smeester | |
| 5,769,023 A | 6/1998 | van der Lely et al. | |
| 5,790,047 A | 8/1998 | Golan | |
| 5,950,562 A | 9/1999 | Schulte et al. | |
| 5,988,106 A | 11/1999 | van den Berg | |
| 7,415,941 B1 | 8/2008 | van den Berg | |
| 2002/0108584 A1 | 8/2002 | van der Lely et al. | |
| 2003/0061998 A1 | 4/2003 | Voogd et al. | |
| 2003/0084853 A1 | 5/2003 | Voogd et al. | |
| 2010/0154714 A1 | 6/2010 | DeVilliers et al. | |
| 2011/0126770 A1 | 6/2011 | Mulder et al. | |
| 2011/0168099 A1 | 7/2011 | Van Lier et al. | |
| 2013/0239900 A1 | 9/2013 | Tabakman | |
| 2014/0238303 A1 | 8/2014 | Andre | |
| 2016/0066545 A1 | 3/2016 | Borchersen et al. | |

FOREIGN PATENT DOCUMENTS

| | | | | |
|---|---|---|---|---|
| CN | 106719033 A | * | 5/2017 | A01K 5/02 |
| CN | 107432250 A | * | 12/2017 | A01K 5/01 |
| DE | 3033977 A1 | | 4/1982 | |
| DE | 10345908 A1 | | 4/2005 | |
| EP | 2151160 A2 | | 2/2010 | |
| EP | 2497360 A1 | | 9/2012 | |
| ES | 2234650 T3 | | 7/2005 | |
| FR | 2704720 A1 | | 11/1994 | |
| FR | 2781120 A1 | | 1/2000 | |
| GB | 936653 A | * | 9/1963 | A01K 1/10 |
| GB | 1190432 A | | 5/1970 | |
| GB | 1242385 | | 8/1971 | |
| GB | 1278481 A | | 6/1972 | |
| JP | H-1189470 A | | 4/1999 | |
| JP | 2007282549 A | | 11/2007 | |
| KR | 101387088 B1 | * | 4/2014 | A01K 5/0275 |
| NL | 7713412 A | | 6/1979 | |
| NL | 8903163 A | | 7/1991 | |
| WO | WO-8001231 A1 | | 6/1980 | |
| WO | WO-8809119 | | 12/1988 | |
| WO | WO-92/08344 | | 5/1992 | |
| WO | WO-0167851 A1 | * | 9/2001 | A01K 1/105 |
| WO | WO-2012/033404 A1 | | 3/2012 | |

\* cited by examiner

MILK PRODUCTION THROUGH LACTANCY CYCLE

FIG. 3
TRANSMISSION DEVICE 121
ASSEMBLY, FRONT VIEW
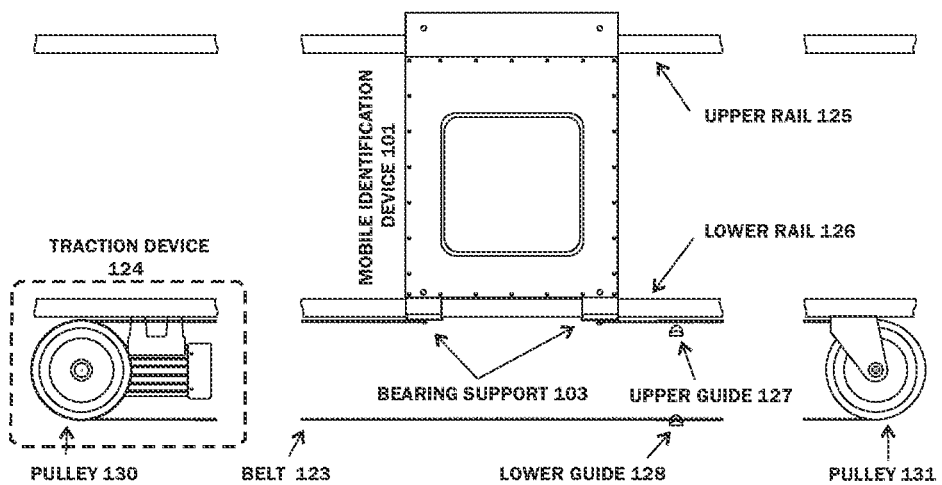
ASSEMBLY, SIDE VIEW
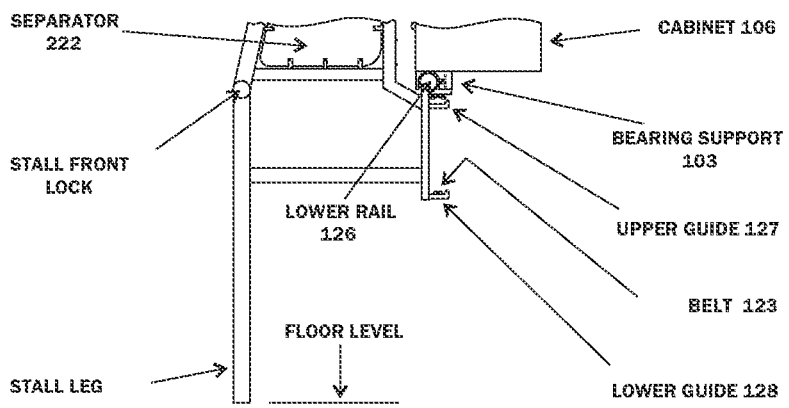

INDICATOR DEVICE 181

INDICATOR PANEL 182

MILKING STALL 221

FIG. 7
STORAGE OF TEMPORARY DATA
MEMORY ORGANIZATION
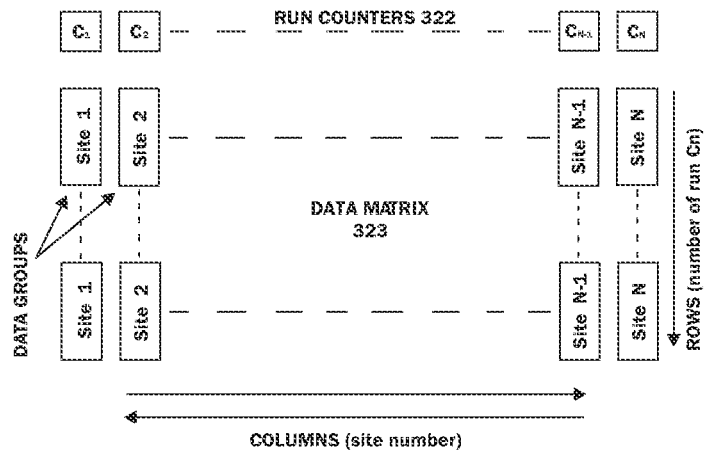
STORAGE ORDER
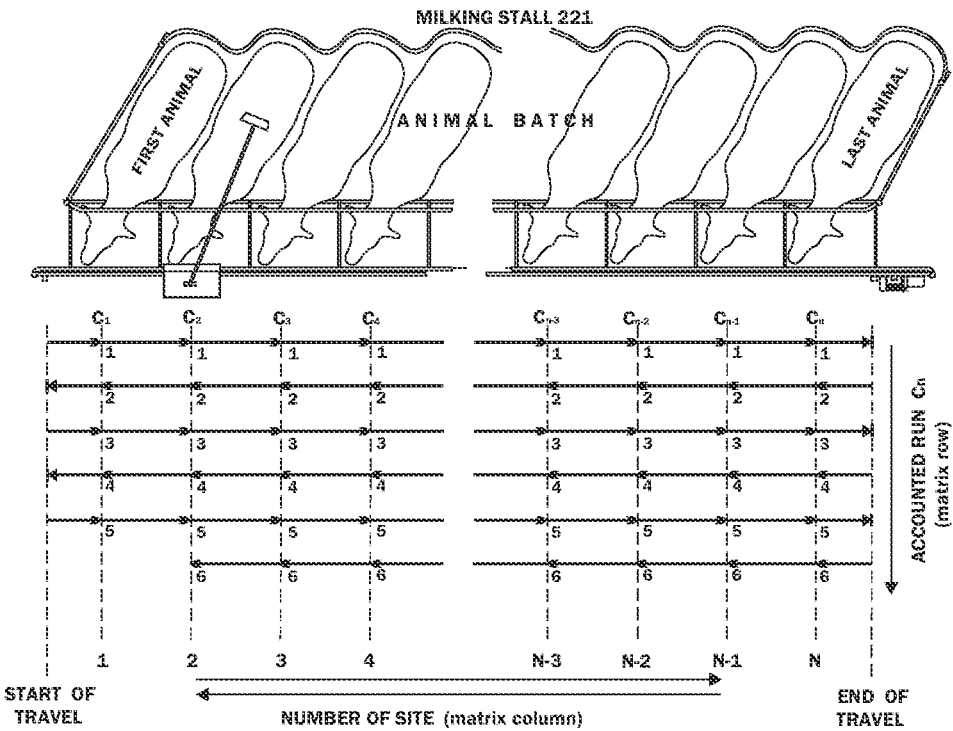

DATA GROUP 421

FUNCTION 441: START NEW BATCH

FUNCTION 481: GO TO NEW SITE

FIG. 13
MOBILE FEEDING DEVICE 501
FRONT VIEW
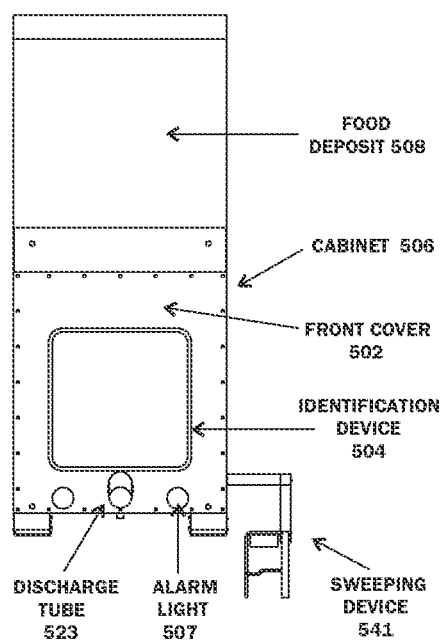
NOTE: the sweeping device 541 sweeps from right to left direction.
ASSEMBLY, SIDE VIEW
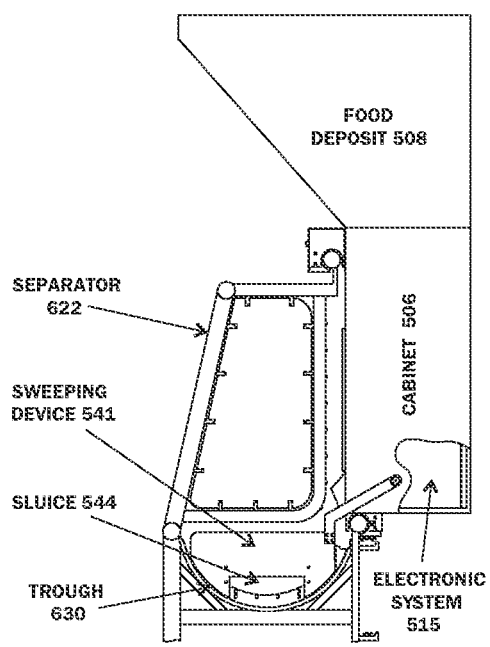
NOTE: the sweeping device 541 sweeps toward drawing.

FIG. 14
DOSING DEVICE 521
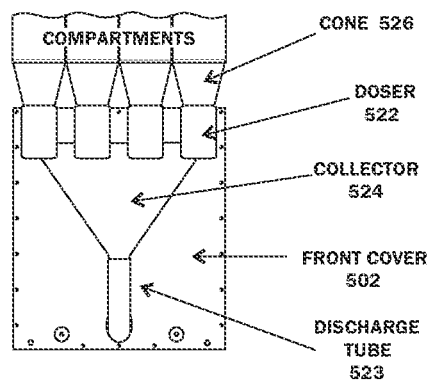
REAR VIEW
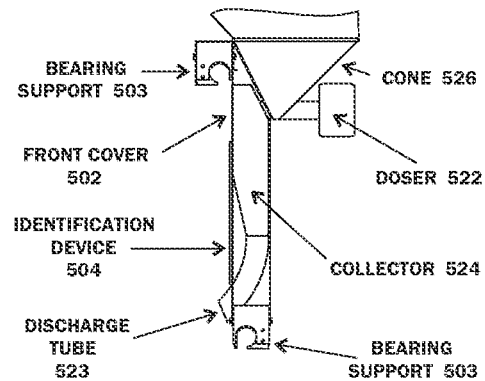
ASSEMBLY, SIDE VIEW

FIG. 15
SWEEPING DEVICE 541
EXPANDED VIEW
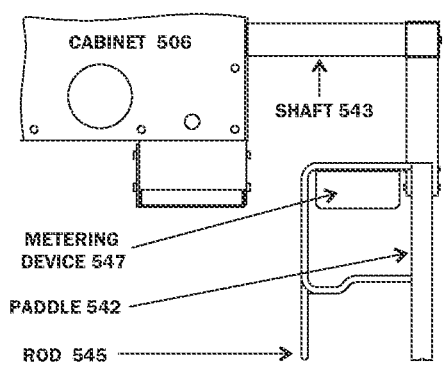
MEASURING SCHEME
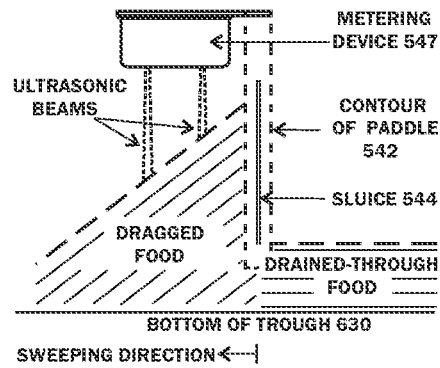
RIGHT SIDE VIEW
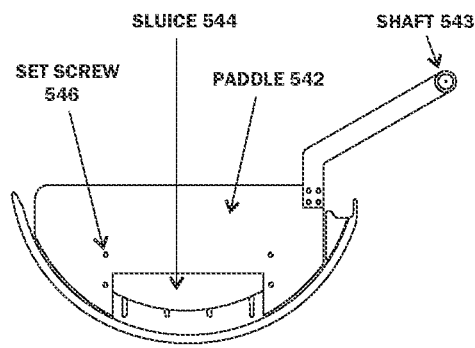
LEFT SIDE VIEW
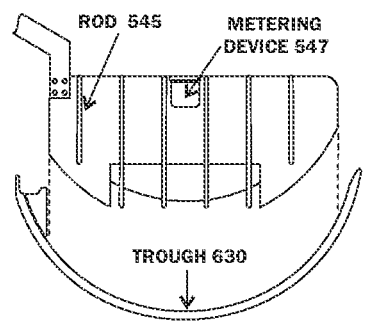

INDICATOR DEVICE 581

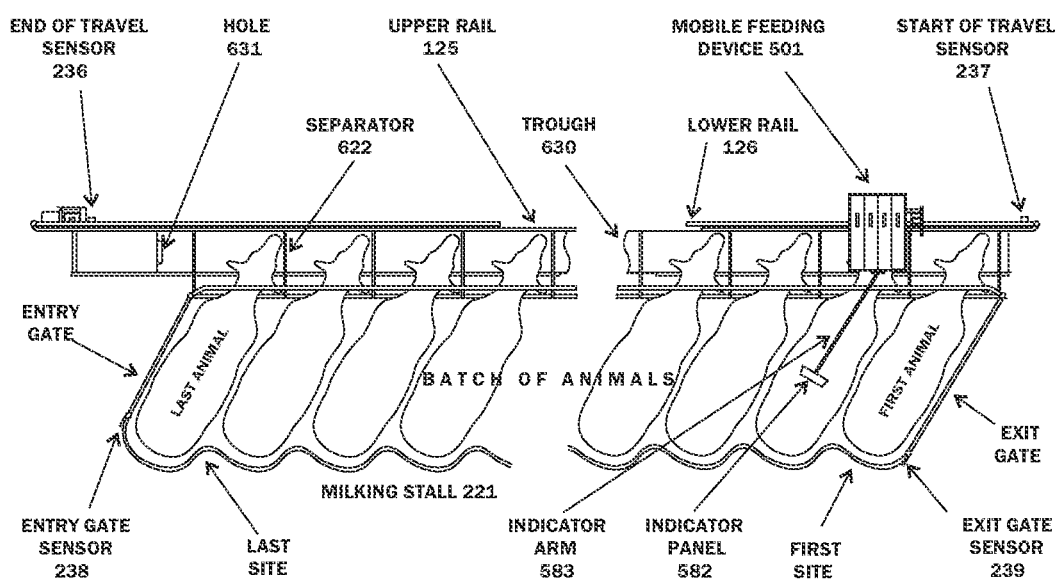

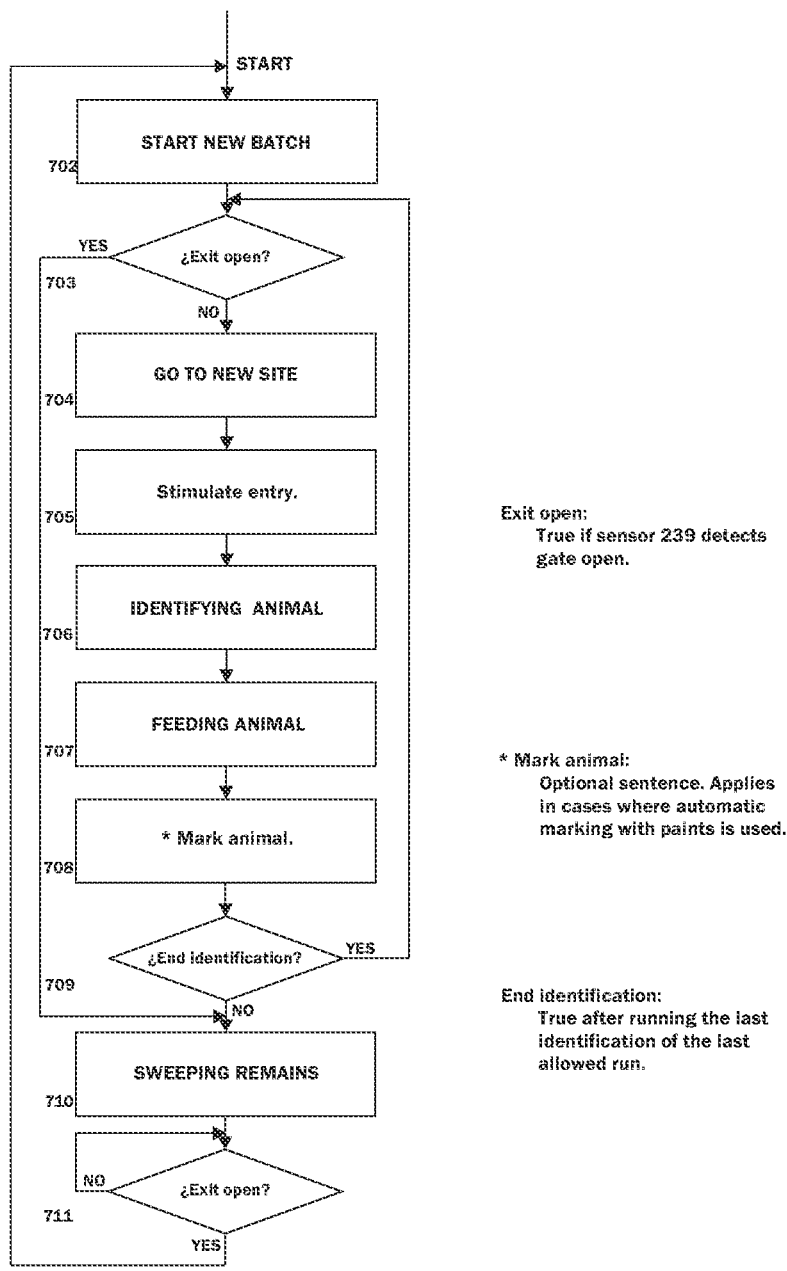

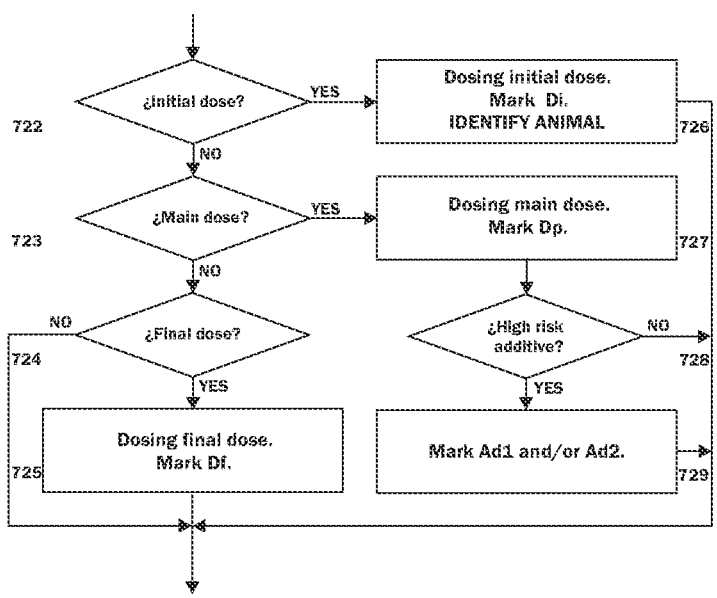

FIG. 19
FUNCTION 721: FEEDING ANIMAL

Initial dose:
True if there are no marks Di or E1.
Valid only in the first run and in cases
where is not possible to dose the
Main Dose or the Final Dose as a
result of existing mark E4.

Main dose:
True if there are no marks Di or Dp
or E4. Valid only in the runs assigned
to dose the Main Dose.

Final dose:
True if there are no marks
Di or Df or E4 or Ad1or Ad2.
Valid only in the runs assigned
to dose the Final Dose.

High risk additive:
True if Vel 1 or Vel 2 are
greater than zero.

DATA GROUP 741

FIG. 22
ENDLESS CURTAIN 801
DEPLOYED CURTAIN, VERTICAL VIEW
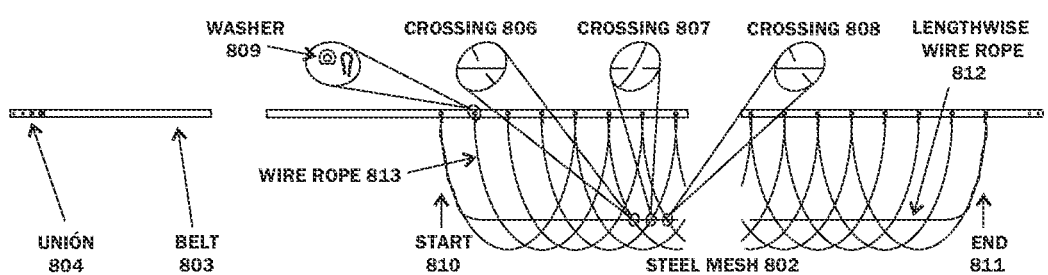
ASSEMBLY SCHEME, HORIZONTAL VIEW
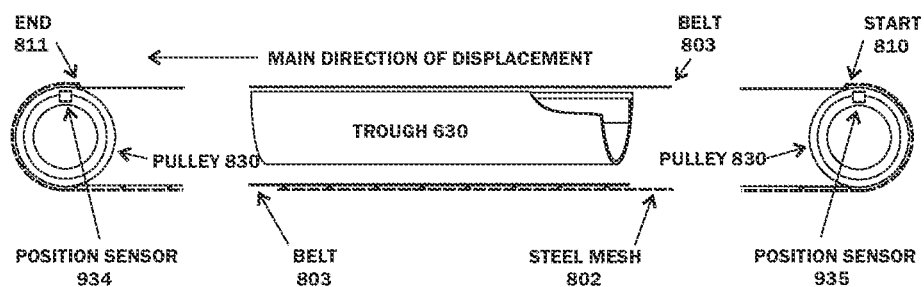

FIG. 23
CURTAIN TRANSMISSION DEVICE 821
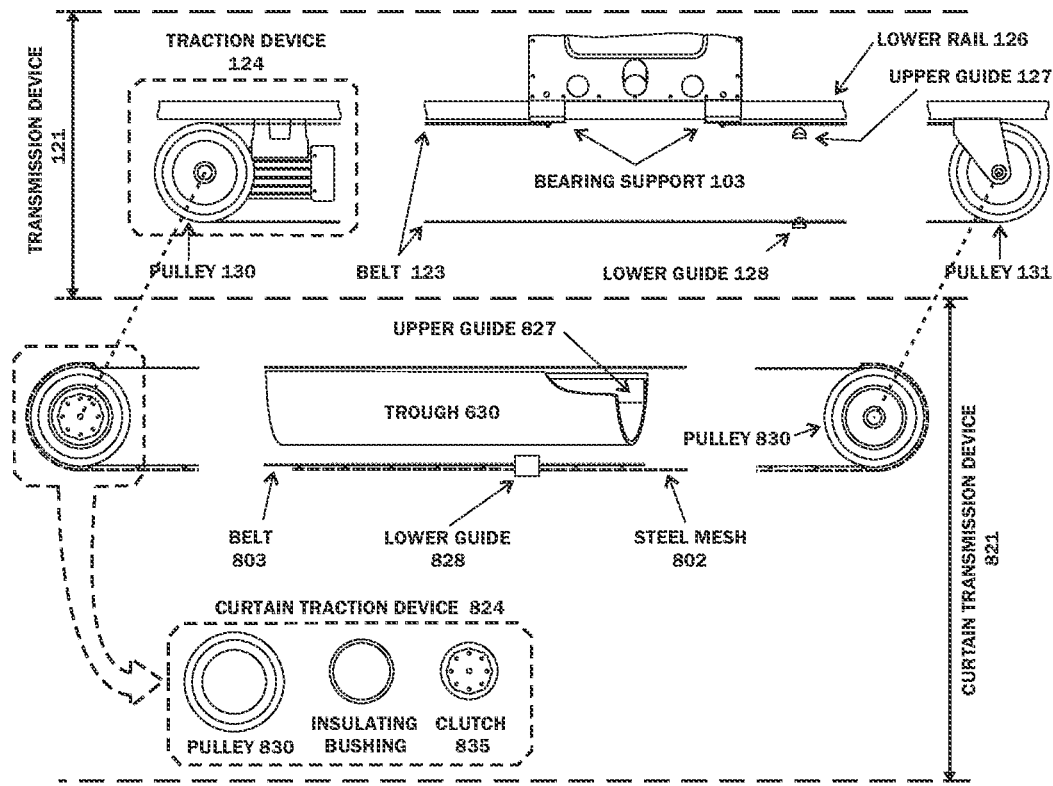
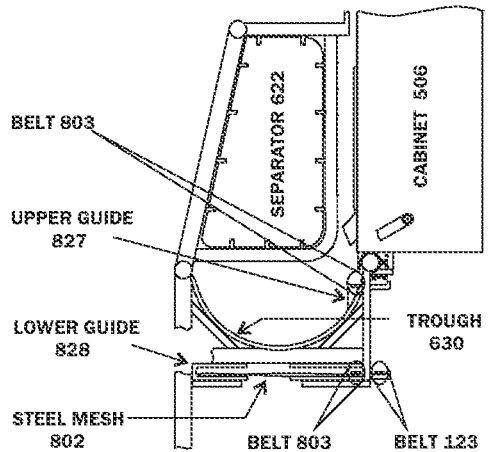
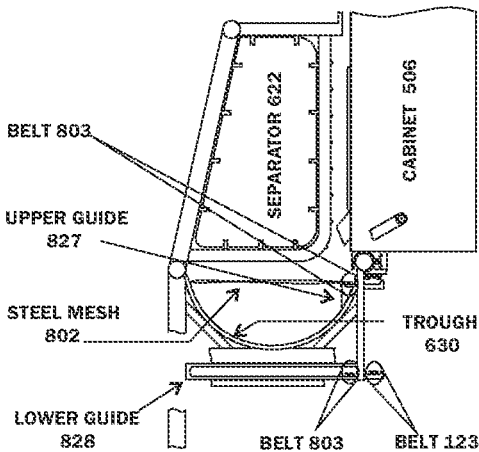

MILKING STALL 921

MOBILE FEEDING DEVICE 1101

RECOVERY DEVICE 1121

DISCHARGING DEVICE 1141

RECOVERY DEVICE 1321

SELECTOR DEVICE 1341

MILKING STALL 1421

RECYCLING DEVICE 1501

FIG. 36
STORAGE OF TEMPORARY DATA
MEMORY ORGANIZATION
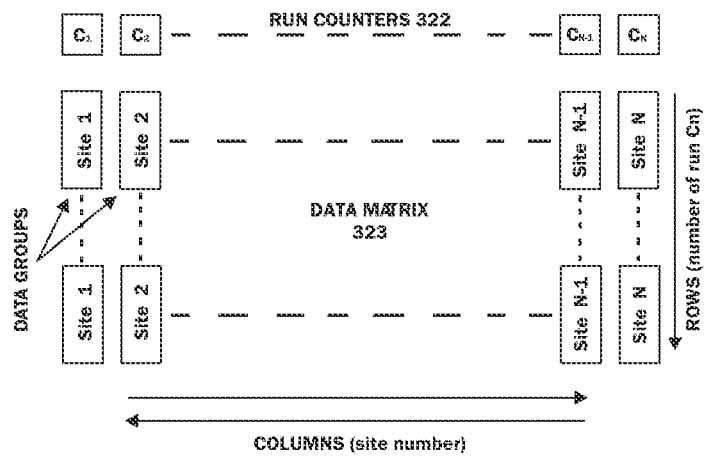
STORAGE ORDER
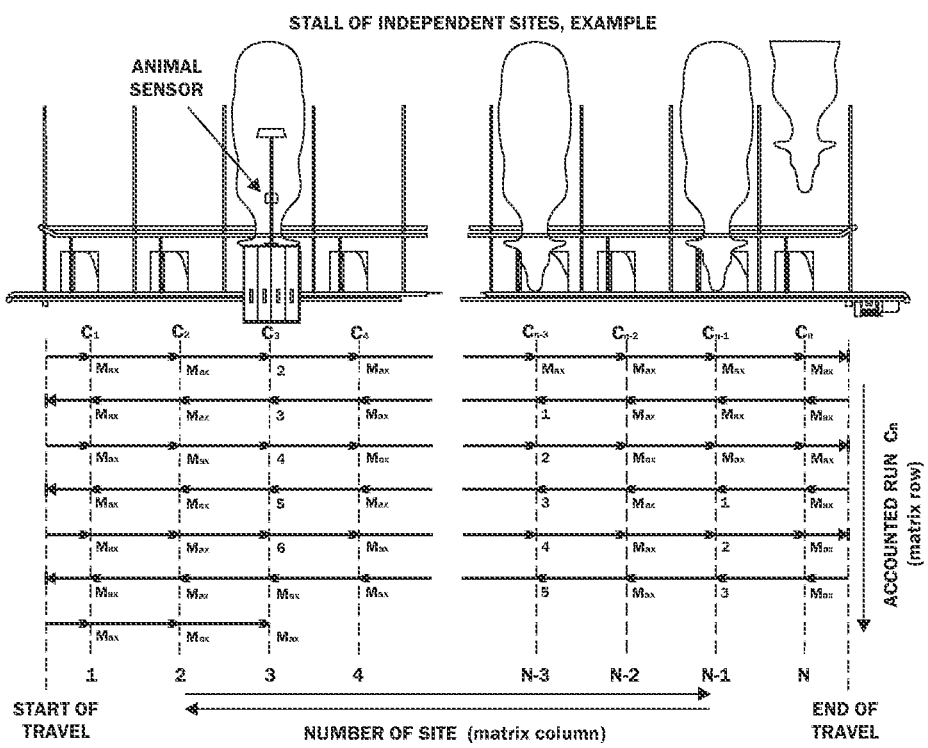

SYSTEM AND METHOD FOR IDENTIFYING, FEEDING AND HANDLING ANIMALS, IN PARTICULAR DAIRY CATTLE

FIELD OF THE DISCLOSURE

The present invention proposes a system and a method for the automatic identification, automatic feeding and handling of animals, directed principally—but not only—to the field of milk production, meat production or other, based on an animal feeding which is predominantly pastoral.

This invention is also useful for any other treatment that requires to keep the animals confined in stalls or cubicles and at the same time requires the individual identification of said animals for activities such as milking, applying ear tags or other sensors, vaccination, application of insecticides, veterinary treatment and any other action pertaining to animal wellbeing and productivity.

This invention pretends to solve the notorious perceived necessity in "pasture-based dairy farm" feeding, especially in those "non seasonal" dairy farms, that's to say those whose herds are formed by animals with a very varied lactation state of advance.

BACKGROUND

Those non seasonal dairy farms don't currently count with solutions to an individualized feeding that are sufficiently adaptable to a wide variety of feeding needs coming from the need to feed herds formed by animals in a very different state of advance in their lactation.

The key aspect of the perceived necessity refers to the individualized feeding of animals that are mainly in the first third of their lactation and whose care strongly defines the dairy farms' economic equation.

The care of animals in the first third of their lactation is specifically analyzed in this application with respect to two fundamental aspects: the quality of milking and the diet control of each individual animal.

As is well known in the field of milk production, the performance of an animal in the first third of its lactation period determines said animal's productivity (in milk produced) not only in the first third of its lactation, but determines to a great degree said animal's productivity for the rest of the lactation period, besides determining its reproductive efficiency and other health aspects.

In temperate climates an animal's mil production along its whole lactation period may be estimated by multiplying its production peak—which occurs around the lactation's third month—by a factor of 200 or more. Attaining the maximum possible production in the first third of the lactation period is the key for attaining an animal's maximum possible production potential, since after that period production will inevitably fall.

FIG. 1 shows two production curves that correspond to two animals of approximately the same productive potential but with which different production peaks are obtained. The area under both curves represents the total produced in the lactation period for each case, a total that may be estimated by multiplying by 200 the production peak for each case. The difference in production is represented by the shaded area.

FIG. 1 shows the magnitude of the multiplying factor for any improvement in the care of an animal in the first third of the lactation period in order to increase the production peak. This in turn will strongly determine the animal's production total along the whole lactation period.

At the same time FIG. 1 clearly illustrates the perceived need that is the unexploited productive potential to which the pasture-based dairy farms here considered are subjected to, both in the aspects of milking quality—as will be discussed later on—as in the aspects regarding the absence of an individualized feeding.

In the non seasonal pasture-based dairy farms, especially in the South American Southern Cone, it is customary to feed the whole diary herd, or at least big groups of same, with the same mix of balanced food and with the same pasture proportion.

In this way, the animals that are in the first lactation third go unnoticed in the animal plurality of big groups or herds of animals that are all fed the same. Even though specific diets are usually designed in order to optimize production, it is not possible to know the "response to diet" of those animals that strongly define the dairy farms' economic equation, that's to say, the animals that are in the first third of their lactation.

By "response to diet" we understand the response that the individual animal shows to the specific diet it has been assigned. In order to know that response it is necessary to know at least the amount of feed effectively consumed by the animal in relation to the expected consumption.

According to the practices applied in the farms here considered it is not possible to know the response to diet of those animals that are in the first third of their lactation as a differentiated group.

Being it that the production peak attained by said animals around the third month of their lactation determines their lactation cycles' total yield, it is of fundamental importance to know the response to diet in order to know how does it influence the increase of the above mentioned peak.

To know said animals' response to diet in their lactation's first third as a way of increasing the maximum peak, and thus each animal's total yield, is the main aim of this invention. As will be seen, specifically knowing the yield of the group of animals in the lactation's first third is what will determine the herd's total yield and thus the dairy farms' economic viability. Such selective model of the mentioned group of animals is what will determine the future survival of an infinity of small and medium sized productive units that can't compete with major establishments.

For these small and medium sized dairy farms, the perceived need for this invention is so intense as to determine their business' survival and the survival of their type of production. The invention here proposed is the solution to the perceived necessity of these small and medium sized entrepreneurs.

Even though there are varied solutions to the individualized feeding of dairy animals, they have been generally designed to operate in productive systems based on confined animals and do not sufficiently adapt to the type of production here considered.

On the one hand it must be considered that in pastoral exploitation units animals use to be confined only during the milking period, being this the best moment both for feeding them so as to balance their diets according to their individual necessities and to treat said animals with food additives.

On the other hand, the very varied nutritional necessities exhibited by those dairy herds must be considered. Since hormones are not usually used to synchronize the heat of said animals, herds are composed of animals in a varied advance in their lactation state, thus having very different nutritional needs.

To contemplate the individual necessities of animals under these conditions requires a high degree of automation in the feeding system that, besides supplying an ample variety of food's types and additives (as a feed supplement in this case), must minimize the implicit risk of affecting animal health and milking quality.

Handling a wide variety of additives requires a high performance of the identification system used, a requirement that is not fulfilled by the low cost solutions offered in the marketplace, especially when these are based on the use of the amply spread RFID ISO 11784-85 technology.

STATE OF THE ART

This analysis of potentially inhibiting antecedents is based on international data banks, including already existing competition's commercial products, catalogs form the trade's companies and especially on the data bases from the European Patent Office, the World Intellectual Property Organization and the USPTO.

The most relevant results are:

US2014238303—describes a method in order to handle a herd of animals, identifying them, milking them, feeding them, and gathering data from same in such a way as to be able to use it in the future. The emphasis is in the milk yield—not in the feeding, doesn't have a mobile identification or feeding system what is understood as management is different from our invention, does not count with the same possibilities (features) or flexibility, does not consider among other things the use of an endless curtain. It describes methods alien to the invention here proposed, and in order to implement its activities it uses a facilities system very different to the ones we propose.

We thus think it is not an inhibiting antecedent.

CN202603356—utility model that feeds the whole herd of animals by means of an Archimedes screw that fills up the whole trough.

We thus think that it is not an inhibiting antecedent.

U.S. Pat. No. 5,769,023—it describes an apparatus that is essentially a milking robot that at the same time determines—through a computer—the amount of food to be given to the animals while being milked. It does not consider a mobile unit that is displaced along the row of stalls in order to identify and feed the animals. It does not handle the animals.

We thus think it is not an inhibiting antecedent.

US2003084853—device designed to automatically feed a bovine for a determined time, giving it a predetermined amount of food during a predetermined time, having an identifier that is in the feeding stall, and at the same time measuring the amount of food consumed by said animal. It does not have a mobile identification and feeding system, nor an endless curtain, nor anything discernible for cattle management.

We thus think it is not an inhibiting antecedent.

US2002108584—device the locates each animal in its stall, with the head in a trough and computer controlled, with a second computer controlling the milking process, being it that both computers recognize the specific animal through transponders sited in the animal's collar, having this device two arms, one for cleaning the udder and the other for coupling the milking apparatus. There are no feeding devices, no mobile identifies, no herd handling system.

We thus think it is not an inhibiting antecedent.

NL8903163—feeding and/or milking device, having an identification unit in the animals and an identifier that identifies them on their way to their respective stalls, connected to a mechanism that opens or shuts the stalls as needed. The identifier and the feeder are not mobile but fixed, the identification operation happens before entering the stall, and it has no cattle management system.

We thus think it is not an inhibiting antecedent.

GB1278481—this device, given its date of 1969, could not possibly have the features that our invention has. Besides, it is only for feeding, being the handler that will decide the feed mix to be administered to each animal. There is a ration dispenser (doser) in each stall, and not one that is moved along the various stalls. There is a manual identification when the animal is in its stall.

We thus think it is not an inhibiting antecedent.

DE10345908—facilities for feeding and identifying cattle. There are no milking facilities, being it that after the facilities this application describes the cattle is then moved to the milking halls. Cattle are moved sideways on a conveyor belt, there is no individualized ration dosage, there is no identifier, and no facilities for cattle handling.

We thus think it is not an inhibiting antecedent.

WO9208344—this patent describes a method for animal feeding where same freely enter—and when they so desire—a feeding stall, where they are identified by a transponder and fed through a doser device in two portions according to the animal's necessities, being said doser (dispenser) movable from one stall to the next. This invention does not refer to milking, does not manage the residual food that remains in the troughs, does not use an endless curtain or similar devices for the efficient change of animal groups since they enter the stalls when they so wish; all the animals of the herd must be present in the feeding hall at the same time, suggesting that this invention is only for cattle that is bred permanently enclosed and under a roof, in the style of a breeding ranch of pure blood animals for reproduction, or for countries as Switzerland.

We thus think it is not an inhibiting antecedent.

WO8809119—this system, as the previous one, is for feeding animals that are bred sheltered under a roof, in a fixed housing, having a mobile doser, being it that the food is measured and dosed on the spot and is then transported to where each animal in particular is, returning the movable device to the initial place after having unloaded the ration. The animal detector is in each stall and is fixed. There is no renewal of the group of animals, thus there is no cattle handling, there are no milking devices and there are no movable identification devices.

We thus think it is not an inhibiting antecedent.

U.S. Pat. No. 7,415,941—there is a circular geometry in this device, where the stalls are radially located. In this way, even if there is an identification of each animal in order to feed it according to its particular needs, there is no displacement of the identification device, nor of the dispenser (doser) apparatus, it is not related with milking nor does it allow for herd management.

We thus think it is not an inhibiting antecedent.

U.S. Pat. No. 5,069,165—this system consists of a feeding device that moves along a rail that passes through all the stalls, from which hangs a scale that is in turn hanging from the rail, and by means of which each particular animal's food is measured and dosed. This system is something very heavy and complex, with a plurality of Archimedes" screws. The hanging containing cart has its own traction system in order to move along the rail or rails, with its engine and control system that allows it to stop in each particular stall. Each animal's identification is at the stall's entrance and there are no milking facilities or handling facilities.

We thus think it is not an inhibiting antecedent.

CA2719886—this patent refers to a sophisticated herd control method by means of automatic identification, and the successive measure of the animal's weight and feeding so as to determine the best moment to send it to the slaughterhouse. It is essentially a feeding and selection method with a projection to the esteemed time where the animal will attain the necessary conditions (weight) to be separated from the herd and where the food is dispensed according to each animal's necessities. There is no system specifically for diary cattle and much less to milking and does not resemble the invention herewith proposed in any way. It is, literally, a fattening-up system.

We thus think it is not an inhibiting antecedent.

GB1242385—identification and feeding system for individualized animals, where the identification is carried by each animal hanging from its neck, has a series of electrical synthonized circuits and it's identified because four of twelve oscillators are dampened. It is not thought for dairy cattle, of for milking, or for cattle management.

We thus think it is not an inhibiting antecedent.

U.S. Pat. No. 3,929,277—system for monitoring each animal's ingestion, not necessarily cattle, having each animal an electronic identification, and by means of troughs located on scales. When each animal withdraws, the amount of consumed ration is kept in a memory unique for that animal. It is a system for following the feeding development, not for individualized feeding, of for herd management, nor is it specifically for dairy cattle or related to milking.

We thus think it is not an inhibiting antecedent.

U.S. Pat. No. 5,740,757—invention that refers to one of many devices to which cattle freely approximates, with an identification device in each animal that allows a measured and individualized ration for each animal. There is no identificatory or mobile dispenser, there are no facilities for cattle management, has no relation to dairy cattle in general or milking in particular.

We thus think it is not an inhibiting antecedent.

US2003061998—device that automatically provides an animal with a predetermined amount of one or more foods during a specific period. It has an animal identification method which is in the feeding site, measuring a sub-period between the last feeding opportunity and the moment when the animal is identified, on which depends the food balance provided on said sub-period. There is no mobile identifier or mobile dispenser and there are no features for cattle management.

We thus think it is not an inhibiting antecedent.

WO80/01231—device that has a mobile identifier and food dispenser, where the identifier reads the information provided by an information transmitter on the animal. Even though there are some similarities regarding the identification and feeding operations, it is not the same method, there are no milking or herd handling facilities and uses electronic as old as 1980, so that what our invention proposes could not have possibly been executed with electronic and computing 40 years old.

We thus think it is not an inhibiting antecedent.

FR2704720A1 (year 1993, owner and inventor Pierre Sigal)—system for equipping milking stalls with a central aisle, comprising a device for accommodating sheep and goats and which, by means of a curtain, impedes the animal from seeing all the available stalls, except for the last, that screen successively liberating the stalls one by one as they are occupied by the herd. From the back wall towards the entrance and through a movement related to the movement of the food dispenser, the required ration is quickly liberated according to the identification of each animal who has access to a free stall, being said identification done by means of a disposable device that is market available, and simultaneously allowing milking personnel operating in the central aisle to adjust the milking machine to the animal's nipples without the need to pull it back by means of a cable or capstan. This invention predates ours by 24 years, a fact that, given the development in electronics is in itself a sizable difference. Moreover, this invention does not manage the residual food that is inevitably left in the troughs and the herd handling is made by means of a hanging curtain that serves as a door to each pale or stall that each animal must occupy, controlling at the same time the access to the stall and to the food. That hanging curtain is not used for animal management as they go out of their places when the operation is over. Furthermore, it operates in a very different way from our invention. Both the mobile apparatus and the hanging curtain must be robust enough to withstand direct contact with the animals and the push they may exert when they compete for access to one site and the food they know is there. Our invention, on the contrary, uses and endless curtain that is displaced always in the same sense, either over or inside the stalls and only controlling food access, putting order to the animals both during their entrance and exit, and only controlling food access. Moreover, the mobile device we propose is not in contact with the animals and our endless curtain does not need to endure the pressure exerted by the animals. Besides, this system does not manage the residual food left in the troughs.

We thus think it is not an inhibiting antecedent, although we consider it the closest patent in the state of the art.

FR2781120A1 (year 1998, Etablissements Bayle, inventor Pierre Sigal)—invention derived from the previously cited, and by the same inventor. It describes a facility for automatically siting the animals along and at the side of a central aisle, comprising a framework that defines several individual cubicles, having each cubicle vertically sliding doors and an inferior stop where the doors rests in when in a low and open position. A lock holds the door in its closed position, being it that the opening and closing of the individual doors is controlled by a roller that slides along a ramp in a cart and that displaces itself by motor along the framework, in which cart there is also a means of identifying the animals. The way of controlling the access to the stalls by means of elevating doors is a mechanism totally alien to the one proposed by our invention. Differently to ours, animal access is controlled with respect to the stalls instead of to the food, and this invention does not manage the residual food remaining in the troughs, something by the way essential to our invention.

We thus think it is not an inhibiting antecedent.

SUMMARY

The proposed invention provides an identification method that optimizes de performance of the automatic identification, being same based on the use of a mobile device that moves near the animals in order to identify them. In the particular case of the identification technology RFID ISO 11784-85, same allows to manage the high rate of failed identifications and a high rate of loss of the identification device (tag).

Additionally, it is necessary to manage the food that may remain in the trough after the animals have eaten since it implies a risk both for health and animal productivity, both for the animals that have not ingested the expected food amount as for the ones that may ingest such food afterwards.

The trough's remaining food management is dealt with by the prior art for the case of "housed dairy farming" based on confined animals (not for the pasture-based ones) by means of the use of "Feeding stations" sited inside confined areas. Though the previous art proposes the use of devices similar to a feeding station for feeding in the milking stalls, none of them solves in a cost-effective way neither the handling of the trough's remaining food or the identification and handling of animals as they enter and depart the stalls.

Contrary to the state of the art, the proposed invention provides a feeding system that, mainly through the use of a "sweep device" that is displaced inside and along the trough, manages, at a low cost, the food that remains in the trough. Said remaining food is minimized or eliminated and at the same time the not ingested food in each particular site (individual stall's place) is measured, associating said amount to the identity of the animal that was previously in that each site.

Additionally, it is required to minimize that deterioration of the milking quality caused by the detention of animals during their entrance to the stall in search of food remaining in the trough. Due principally to the type of milking equipment used in farms here considered, the detention of animals may cause a generalized deterioration of milking quality due to the gap generated in some animals between the start of their milking and the "oxytocin effect" that takes place in said animals.

The invention herewith proposed provides an animal handling system that, through the use of an "endless curtain" whose advance allows or impedes the access of animals to their food, in a sequential mode, minimizes the detention of animals as they enter and depart the stalls and at the same time provides a solution in order to facilitate the separation of animals at the stall's exit, thus optimizing animal handling inside the milking stall.

Even though for some applications it is possible to dispense with the use of the endless curtain, the combined use of said curtain with the sweep device allows for the whole system's cost reduction, thus attaining a low cost solution that is particularly well suited to the specific practices and conditions of the pasture-based dairy farms herewith considered.

BRIEF DESCRIPTION OF THE DRAWINGS

The accompanying drawings are presented to aid in the description of embodiments of the invention and are provided solely for illustration of the embodiments and not limitation thereof.

FIG. 3 describes transmission device 121 that allows to displace mobile identification device 101 in the milking stall's 221 longitudinal sense.

FIG. 7 illustrates a possible way of organizing in the system's memory the data generated or obtained during the identification process for a batch of animals, and the storing order of said data during said process.

FIG. 13 describes the main parts of mobile feeding device 501 and its assembly with respect to some of the parts of milking stall 621 in FIG. 17.

FIG. 14 describes the dosing device 521 and its assembly in mobile feeding device 501.

FIG. 15 describes the sweeping device 541 and a scheme of the way in which the unconsumed food volume is measured.

FIG. 17 shows the upper view of milking stall 621 and the lay-out of the different parts of the feeding system with respect to said stall.

FIG. 18 shows feeding process 701, that describes the animal feeding process and that includes the functions of identification process 301 of FIG. 6.

FIG. 19 shows the flow diagram corresponding to function 721 "FEEDING ANIMAL", one of the possible implementations of the corresponding function in block 707.

FIG. 22 describes the construction of endless curtain 801.

FIG. 23 shows curtain transmission device 821 and its assembly with respect to the transmission device 121 in FIG. 3, used for displacing mobile identification device 101 or mobile feeding device 501.

FIG. 36 illustrates a possible way of organizing data in the memory, and exemplifies the order in which said data is stores for the case of independent sites systems.

DETAILED DESCRIPTION OF THE INVENTION

Figure 1:
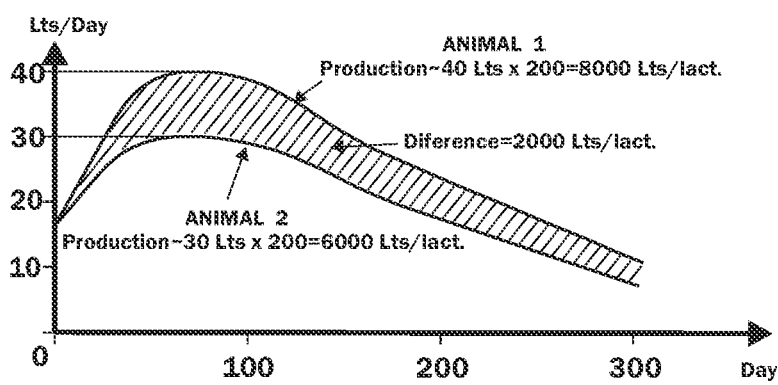
FIG. 1 illustrates two production curves that correspond to two animals of approximately the same productive potential but with which different production peaks are obtained.

As a previous element to the description of the Preferred Embodiment of our invention, which is done below, we will abound in a detailed analysis of the three aspects that are fundamental in the proposed invention: electronic identification, feeding, and animal handling.

We understand that the separate study of each one of these three aspects, including for each aspect current perceived needs—and the way in which our invention solves them—is a way of presenting our invention in a way that may help the Evaluator better understand the magnitude of the perceived need.

We must further say that the inventor has personally perceived these needs on the field during decades of dairy farm advising. It is not an abstract intellectual pursuit.

1) Electronic Identification and Proposed Solution.

a) Current Situation

In pasture-based dairy farming here considered it is convenient to supplement animal diet according to individual necessities, by means of an adequate feeding automation in the milking parlor.

Said automation's performance closely depends on the identification system's performance, a system that is used to determine both the animal's identity and the particular position of the stall in which said animal will feed.

The most frequently used identification systems are based in a reading/identifying device sited at the stall's entrance. Although those "at the entrance" identification systems are low cost, they do not turn out to be adequate for certain aspects that should be considered.

The first aspect to be considered is the strong increase in the number of sites (individual stall's places) of stalls used, and at the same time there is a strong preference for the use of "fast circulation stalls". This is a direct consequence of the increase in the size that herds have had in current times.

It is known as "fast circulation stalls" those milking stalls that have an entry gate and/or a cow platform, both of a greater width than conventional herringbone stall.

When it is desired to use the "at the entrance" type of identification in these fast circulation stalls, the width of the entry gate must be narrowed, with the subsequent deterioration in the stall's performance, and at the same time the performance of the identification system will also be deteriorated by the intertwining of animals that occurs inside the stall's cow platform.

A second aspect to be considered is the type of electronic identifiers used. Same are often held by the animal by means such as a collar, in the hind legs by a bracelet or in an ear by means of an ear tag.

The identifier of the type RFID ISO 11784-85, that is used attached to the animal's ear, is having a growing acceptance due primarily to its low cost and the increasing compulsiveness of its use for the purpose of animal traceability.

As a consequence of the above, the use of the RFID ISO 11784-85 technology when used in the entrance identification systems is particularly attractive for its low cost, but unfortunately this combination shows an even lower performance that when collar or strap identifiers are used.

The main difficulty is the great variability in the orientation that a tag may have at the moment of its excitation/reading, due to the animal's notorious mobility in the ear region where that tag is attached.

A third aspect to be considered is that the increase in the number of stalls' sites contributes to the strong deterioration in the identification's performance,—whichever technology is used—when entrance identification systems is used.

In this way the stall's entrance animal identification does not satisfactorily solve the difficulties introduced by the RFID ISO 11784-85 type of identification, nor the ones introduced by the fast circulation stalls and the high number of sites.

As an alternative to the entrance identification systems the marketplace offers various identification systems based on the use of a fixed reader in each site of milking stall. Given that in this case it is possible to verify animal's identity during their stay in the stall a greatly improved identification system's performance is attained as compared to the entrance identification systems.

Even so, the cost of these systems is highly dependent on the number of sites, resulting in a considerably high cost when its application to stalls with high number of sites is considered. Additionally, the system's cost is not diluted or diminished when it is used jointly with feeding systems, as it is indeed diluted in the case of mobile feeders.

Within the mobile feeders must be considered the identification methodology used by the "Robot Stalle" of Bayle Industries (see patents FR2704720A1 and FR2781120A1 already considered). Even though it is a high cost solution, it is in our opinion the closest prior art, both for animal identification and for animal feeding and management. These aspects are discussed below.

Stalle's identification methodology is based in the combined use of a stall with headlock gates and an animal accommodating system, and though results in an improvement in effectiveness with respect to the prior art, it uses high cost mechanisms and does not sufficiently solve the low performance exhibited by the RFID ISO 11784-85 technology.

b) Proposed Solution

Beyond the identification technology used, it is possible to establish a relative comparison between the entrance identification systems and the identification solution herewith proposed, if the impact that each animal identification loss has on the performance of the identification system is considered.

For the entrance identification case, the identification loss of one animal means the loss of reference of the previous identifications obtained, with respect to the stall's sites to be subsequently occupied by animals, for the batch's total that goes into the stall and that includes that particular animal.

For example, for a milking stall of 30 sites and 97% probability of obtaining an animal's identification, there is a probability "Ps" that a same batch has at least a non-identified animal that amounts to 60%, according to Equation 11

$$P_s = 1 - 0.97^{30} \cong 0.6 \qquad \text{Eq.11:}$$

This type of identification systems don't usually resolve in an automatic way the loss of reference abovementioned, but the worker (handler) must find the unidentified animal or animals and enter them to the system, making the corresponding corrections for the other animals.

When this loss of reference is not solved at all, the probability that a particular batch contains at least one unidentified animal is equal to the general average of animals affected by such a loss of reference, that's to say 60%.

In the case of the solution herewith proposed, the identification is done by means of a "mobile identification device" containing the necessary mechanisms for animal identification, being said mobile device displaced many times near the animals while they stay confined in the milking stall.

During the stay of a batch of animals in the stall the mobile identification device performs multiple "runs" along the stall, that's to say multiple longitudinal displacements in both directions, identifying each animal confined in the stall during multiple "identification opportunities" that are distributed along the time the animals are confined in the stall.

Given the multiple identification opportunities it is possible to compare the multiple identifications obtained for the same site, thus improving—as a result of all the comparisons made—the "identification reliability" finally obtained for that site.

In this way the application of the solution here proposed is not limited to the use of a specific identification technology. On the contrary, it may be applied in any case where its use is justified so as to improve the identification's performance.

The term "reliable" is here used in a qualitative way and depends of two indicators, the probability of rightly identifying an animal and the probability of rightly assigning said identity to the number of the site (individual stall's place) occupied by the animal.

In the same qualitative sense, it is considered that said reliability may be adjusted by varying the number of identification opportunities whose obtained identification readings must result identical in order to consider that an identification is reliable.

Given that the different tasks related with animal identification may require different identification reliability levels, it is possible to establish different reliability thresholds by using more than one pre-established number of identity readings that must result coincidental.

If for the proposed solution it is assumed that in each identification opportunity there is the same probability of obtaining an identification as in the example above, that's to say 97%, a relative comparison may be established.

If additionally the execution of two identification opportunities per site is considered, there is for each site a probability "Pp" of obtaining an identification of 99.9%, according to equation 12. Said probability results in this case to be the general probability of obtaining an animal identification in relation to the site it occupies.

$$P_p = 1 - 0.03^2 \cong 0.999 \qquad \text{Ec.12:}$$

This comparison pre-supposes that the technology used for animal identification—whichever it might be—shows the same probability of obtaining an identification both when it is applied to the stall's entrance than when it is used in the "mobile identification device".

Comparing the mathematical expression of the two equations mentioned it may be concluded that the identification at the stall's entrance contributes to the deterioration of the technology used while the solution herewith proposed contributes to its improvement.

It may be additionally concluded that the stall's entrance identification performance results highly deteriorated as the number of sites is increased. In this way the solution herewith proposed results in its being even more adequate when it is used for a high number of sites.

Furthermore, the identification system's performance at the stalls' entrance results strongly deteriorated when the technology RFID ISO 11784-85 is used.

In this sense, it is important to consider mainly the identification losses caused by a bad orientation of the identification tag at the moment of its reading. As we have mentioned previously said orientation shows a great variability.

If during an identification opportunity there are difficulties for identifying one animal, it is possible to perform multiple reading/identifying attempts concentrated in a short period of time. Nonetheless, it is unlikely that the animal may change its tag orientation in such a short period.

Although this situation tends to be partially compensated by an extension of the time in which successive reading/identifying attempts are taken and/or by an extension of the trajectory along which the animal circulates while its identification is attempted, these strategies contribute to increase the animals' entrance time to the stall.

Additionally, animals' behavior variability shows at the moment of identification must be considered. In the case of stall's entrance identification, the greater difficulties have to do with the circulation speed the animal has when passing through the identification system.

The solution here proposed also solves these aspects of RFID ISO 11784-11785 identification through the use of multiple identification opportunities, being it possible in each opportunity to carry out the multiple reading/identifying attempts described above without affecting the animal's entrance time to the stall.

Given that the time elapsed between identification opportunities is much longer than the time in which one identification opportunity occurs, there will be a greater probability that the animal changes the orientation of its tag between those identification opportunities and/or that it changes the behavior that impedes its identification.

When fast circulation stalls are used, the proposed solution's performance is not affected by the intertwining of animals inside the stall's cow platform, and at the same time the use of entry gates of any width is allowed.

Nonetheless, those stalls allow for some mobility to animals as they stay confined in said stall, a feature that affects the identification's performance. There are numerous solutions in the marketplace that allow to reduce said mobility, but they are usually high cost.

The principal effect of the mobility of animals during their stay in the stall—when considering the use of the proposed solution—is the occurrence of interferences in the identification between animals in adjacent sites.

The proposed solution aims to reduce the effect that such interferences have on the identification performance by means of the multiple opportunity identification mechanism described above and by means of a "reversing mechanism" applied to the mobile identification device.

The reversing mechanism consists in displacing the mobile identification device in the opposite direction to the run that is being executed, thus performing identification(s) in the site(s) recently served and then retaking the direction of the run that was being executed.

The reversing mechanism is also used in order to reduce the effect that another reading mistake may have on the identification performance and on animal management. This reading mistake is the displacement of one or more animals with respect to their site, which usually occurs during animals' stall entrance as they are trying to get to a feeding place.

Such displacement is detected by the mobile identification device when one or more animals that have been identified in their perspective sites is(are) displaced in the same direction as the mobile identification device, being them identified in the following site to the one recently occupied.

In this way the proposed solution dispenses with the high cost systems that are used in other inventions in order to reduce animal displacements, requiring for said target only the use of small fixed separators installed at the animals' head's height.

Finally, we must consider, as a particular solution, the mode in which the "Robot Stalle" resolves similar necessities to the ones here described but applied on sheep and goats according to European practices.

Even if this robot performs animal identification in a single identification opportunity, when the animals appear on their respective site, its performance is much superior than when animal identification is done at the stall's entrance.

The robot's system to accommodate animals allows them to accede to each site only one animal at a time, eliminating interference opportunities by any animal different to the one identified on the previous site.

Given that the Robot Stalle works in combination with headlock gates, each animal is tied to a site when it tries to accede to the food dispensed by the robot, thus eliminating the possibility of a displacement or alteration of the animals' order.

Even though this combination of mechanisms is effective, it results in high cost when applied to the case of farms here considered, where stalls with a great number of sites are used to confine great sized animals.

When the Robot Stalle utilizes RFID ISO 11784-85 technology, considerations regarding the tag's orientation at the reading moment—as well as its impact on identification system's performance—must be considered.

This robot must identify animals in only one identification opportunity (only one pass or run). As a consequence, if it is desired to perform a high number of reading attempts of a tag, an increase on the animals' entrance time to the stall is inevitably produced.

Additionally, for said Robot, the possibilities of performing diagnostics that allow to differentiate the incidence of various causes that contribute to generate failed readings are limited.

Since failed readings originated on a tag's bad orientation largely overcome the ones for other causes, it is not possible to measure the incidence of said other causes. For example, given the presence in the stall of an animal that has lost its tag, it is not possible to automatically diagnose said loss without generating a high occurrence of false diagnostics.

On the contrary, the solution here proposed allows the diagnosis on the loss or persistent bad functioning of a tag to be made on a single animal's stay in the stall. It is thus possible on a single stay of the animal in the stall to automatically determine its separation from the herd in order to verify the tag's state.

The decision to separate the animal from the herd, while said animal stay in its site, is made when the system detects that on said site no identification has been obtained in any of the identification opportunities performed during the stay of said animal in that site.

With the exception of the above case, it is possible to relate each tag to a specific site since at least one identification will have been obtained.

Then, it is possible to generate a "tag's history data record" for each tag where the number of identification opportunities where no identification was obtained is recorded. As a function of said number, it is possible to separately diagnose the incidence of other multiple causes that contribute in the generation of failed readings.

Finally, and as a result of differentiating the incidence of said multiple causes, it is possible to estimate the incidence of the tag's bad orientation on the identification system's performance.

The cases analyzed are only examples of an ample panoply of diagnosis that are possible given the redundant information generated by multiple identification opportunities principle. Said diagnosis advantage allow a better optimization and monitoring of the identification system, independently of the identification technology used.

2) Feeding Systems and Proposed Solution a) Current Situation

In pasture-based dairy farms here considered, usually, animals are individually confined only during milking operation, being this the most adequate moment both for feeding said animals with the goal of balancing their diets according to individual needs and for treating them with feeding additives.

Feeding during milking operation must contemplate the very varied nutritional necessities that herds have in said dairy farms. Since hormones are not usually used to synchronize animal heat, herds are composed by animals with varied state of advance in their lactation and thus having very different nutritional necessities.

Contemplating the individual necessities of animals in this situation requires a high degree of automation of the feeding system that, besides providing an ample variety of foods and additives (as a nutritional supplement in this case), must minimize the implicit risks that this practice has on animal productivity and wellbeing.

We understand as nutritional supplement any mix of foods and additives that are added to animal diet with the purpose of improving its nutritional balance.

The term "additive" refers to an ingredient or combination of ingredients added to the food in order to satisfy a specific need the animal may have. It may be for example mineral salts, oligoelements, medicaments, vaccines, vitamins or others.

The best-known solution to balance animal diet in the previous art is known as "feeding station". A feeding station is capable of identifying animals and administering them multiple types of foods and additives according to the preestablished feeding parameters in each "animal's history data record".

The feeding stations have been developed to operate in housed dairy farms, systems based on the permanent confinement of animals. In that environment, said stations are the main tool for individualizing animal diets while feeding in the milking stall plays a secondary role.

The most accepted solution for feeding animals in the milking stalls, due to its low cost and simplicity, is based in the use of multiple hoppers (as little food deposits), having each one its own doser mechanism, where each one of these hoppers corresponds to each site of the milking stall.

The multiple hopper feeders result in a high cost when the administration of multiple types of foods is considered, since in this case the number of hoppers and dosers is multiplied by the number of different food's types.

The marketplace additionally offers a good variety of mobile feeders capable of mixing multiple food's types, but in the same way as the feeding stations, they have been developed to operate in productive systems based of the permanent confinement of animals.

A particular case within mobile feeders is the already mentioned Robot Stalle, being same the closes prior art, and resolving in an effective way the supply of multiple food's types during milking operation. This robot's principal limiting factor is the lack of management of the food that is not consumed by the animals.

It is understood as "management of the food not consumed by the animals" the measurement of the unconsumed food for each animal, which allows to know the amount of food effectively consumed, as well as the handling of the unconsumed food, be it for discarding it or for recycling it.

In the case of the Robot Stalle, unconsumed food by an animal batch remains in the trough to be later consumed by the next animal batch entering the stall. Moreover, in this case both factors are unknown: the amount of food actually consumed by the animal and what type of food it consumes beyond that currently supplied.

To sum up: both the defect and the excess feedings are unknown, as well as the animals that ate in defect and the ones that ate in excess. Also, the unconsumed food is unknown, and the next animal is fed as if that unconsumed food didn't exist, being this lack of management of this unconsumed food an important waste and cost increase.

Also, the consumption of one food type notoriously different to the habitual one or in quantities significantly higher than the normal ones, during a few visits of the animal to the stall, may affect said animal's health and/or productivity. The effects may go from a fall in productivity to clinical symptoms of acidosis or other serious symptoms.

b) Proposed Solution

In order to supplement animals' diets in milking stalls, and according to the needs described, a high degree of automation in the feeding system is required, something for which the prior art clearly does not provide an adequate solution.

The feeding systems based on the use of multiple hoppers result in high cost if it is desired to dispense multiple food's types, since the number of hoppers must be multiplied by the number of food's types.

The feeding solution here proposed, on the contrary, is based on the use of a "mobile feeding device" that incorporates the elements of the mobile identification device already described, that allows to supply multiple food's types and additives, in multiple sites of a same stall by means only one mobile feeding device.

The mobile feeding device is provided of a food deposit and a dosing device, where the food deposit is divided in multiple internal compartments, each one of them connected to a food doser so that each compartment may contain a different food's type to be dispensed.

It is thus possible to dispense in each particular site any combination of food's types, where each food's type may in turn be formed by any combination of foods and/or additives.

Certain compartment(s) will be destined to contain those food's types whose consumption supposes a high risk for animal health and/or productivity. From the point of view of system functioning it is considered that those food types are in themselves, or contain, a high-risk additive.

We consider "high risk additives" those whose consumption by the animal, during one or several stays in the stall and in amounts significantly different to the ones assigned to its diet, could deteriorate animal health and/or productivity.

b.1) Supply of Foods and Additives

Within the mobile solutions capable of dosing multiple food's types in is interesting to analyze the Robot Stalle.

In the case of the Robot Stalle the possibilities of stimulating animals, by means of food, during the final milking stage are limited. In this case this stimulus may be attained only for those animals fed to the "maximum ingestion capacity", that's to say in the cases where a high amount of food is dispensed to an animal and same remains ingesting the food until the end of its stay in the milking stall.

The solution herewith proposed, on the contrary, doses the food in multiple stages during the stay on one batch of animals in the milking stall. Even though here we mention three food doses this does not limit the reach of the proposed solution regarding the number of stages or runs in which said doses may be administered.

During the first run, and eventually in later runs, an "initial dose" is dispensed, being it independently of the individual diets and not containing high risk additives.

Starting with the run where reliable identifications are beginning to be obtained, a "main dose" of food is dispensed depending on the animals' individual diets, which is dispensed only to the reliably identified animals and may contain high-risk additives.

Finally, a "final dose" of food is dispensed, same also depending on the animals' individual diet, which is dispensed only to the reliably identified animals, which can't contain high risk additives and that will not be dispensed to the animals that have been given a main dose containing high risk additives.

The administration of food in three stages allows for animal stimulation during milking's final stage without necessarily dosing a high food amount, being said stimulus possible even when a low amount of food has been dispensed as a whole.

Even when a very low amount of food has been dispensed as a whole, it is possible to count with its stimulus during the animals' entrance to the stall, the milking start and its final stage. In said case the main dose dispensing may be omitted and the initial dose as well as the final dose may be reduced.

The "final dose" is omitted in the cases where high risk additives are being dispensed, this omission with the purpose of extending the time that the animal uses for ingesting said additives. That period of time is usually incremented by the deterioration of the taste of the food which has been mixed with a high-risk additive. Since the high-risk additives are administered only in exceptional cases, it is irrelevant not to count in such cases with the "final dose" stimulus.

b.2) Identification Reliability

In the case of the Robot Stalle the animal is identified with only one run or identification opportunity, thanks to the combined use of a stall with headlock gates and an animal accommodating system. This quality allows feeding animals immediately after the first and only identification opportunity.

Even though it is indispensable to count with a reliable identification of the animal in order to feed it according to its individual diet, same does not result indispensable for stimulating the animal with food as it enters the stall and its milking is started.

In the case of the here proposed solution the initial dose is used, being same independent from the animal's identification, in order to excite said stimulus. This characteristic allows to make the feeding start independent from the time required to obtain a reliable identification.

In this way, the proposed feeding procedure does not interfere with the possibility of adjusting the identification's reliability. Furthermore, differently to Robot Stalle, said reliability may be adjusted as a function of the risks inherent to the use of additives.

On the other hand, in the Robot Stalle the time devoted for an identification opportunity may not be extended without extending the animal's entrance time to the stall, while in the solution here proposed that linkage does not exist.

In the case of the proposed solution, the time extension devoted to an identification opportunity is used to train the animals by means of the food, with the goal of improving the identification performance.

If the dispensing of food is established as a routine immediately after obtaining the animal's identification, said animal will associate that behavior that allows for its quick identification with success in food obtention.

The time extension during which animal identification is attempted then results in a time extension during which the animal may change its behavior or posture in order to obtain its food.

Dispensing food immediately after identification is thus a "training mechanism" that is used during the first run and/or later runs as required.

Additionally, the time extension devoted to one identification opportunity permits the inversion of the training mechanism, that's to say allows to dose food first and then to make an additional identification attempt, once a reasonable time of unsuccessful identification attempts has elapsed. In this way the cases of animals that have not established a relationship between their behavior and the successful obtention of food are contemplated.

b.3) Handling of Unconsumed Food

When it is desired to dispense high risk additives and/or dispense a high variety of food's types in substantial amounts, it is necessary to manage the food that is not consumed by the animals and remains in the trough.

In the case of the Robot Stalle no automatic mechanism is provided in order to manage the unconsumed food, being this its main limiting feature from the point of view of the needs here considered.

If an animal does not ingest, or cannot totally ingest, a food that includes a high risk additive, the health and/or productivity of said animal may be affected as well as the health and productivity of the following animal that will ingest the food not consumed by the first animal.

Even when high risk additives are not dispensed, the supply in high quantities of an ample variety of food's types may end up affecting animal health and/or productivity.

According to the herd behavior that dairy animals usually show, batches of animals are naturally formed and animals' entrance's order to the milking stall maintains a certain stability, that's to say that each animal will occupy the same site in the majority of his stays in the stall. Additionally, when animals voluntarily enter the stall, these naturally formed batches of animals will enter the stall maintaining some stability in their order (batches' order).

Thus if a first animal in particular does not ingest his food, or ingests it partially, during multiple consecutive visits to the milking stall, a second particular animal that usually occupy the same site after the first particular animal may repeatedly ingest in many consecutive times the food not ingested by the first animal.

This animal behavior must be taken into consideration, since an ingestion of a food's type sensibly different to the usual one and/or in higher amounts than the usual ones, during multiple consecutive stays in the stall could also trigger health problems and/or reduce its productivity.

In the case of feeding stations these aspects are solved through some type of sensor that detects the existence of food in the trough so that, by dispensing small successive food doses and detecting if the animal ingests each dose before dosing the following, it is possible to stop the dosing when the animal stops ingesting food.

Nonetheless, implementing this mechanism in milking stalls with a high number of sites results in high cost, since each site must be provided with its own sensor and at the same time requires a dedicated food dispensing system for each particular site that further enhances cost and complexity.

The solution here proposed solves the handling of unconsumed food through mechanisms for sweeping or dumping the food that remains in the trough. It specially provides a low-cost mechanism for a "partial sweeping" of the unconsumed food, a mechanism further explained under "preferred embodiment".

For the partial sweeping of the unconsumed food, the mobile feeding device is provided with a sweeping device that is displaced inside and along the trough, partially sweeping the remaining food.

In this case the sweeping device is provided with a draining mechanism that permits to drain part of the food dragged during the sweeping, being such drained-through food distributed along the trough's longitudinal axis and thus reducing the amount of food dragged during the sweeping.

It is thus possible to reduce the sweeping device's size, redistribute (and recycle) great portion of the unconsumed food remaining in the trough and minimize the amount of food that is finally withdrawn from the trough.

Recycling the swept food means, for any of the cases here considered, to supply said food in small amounts to the animals to be subsequently fed, so as to minimize to the desired value the risk implied in the ingestion of such a small amount of food.

In the case of a partial sweeping, a considerable portion of the non-ingested food is recycled upon allowing animals entering the stall—after performing the partial sweeping—to ingest the drained-through food during said sweeping. Eventually the partial sweeping shall withdraw small amounts of food from the trough (at the end of sweeping run), that can be discarded or recycled manually.

Additionally, the solution here proposed provides mechanisms for the "total sweeping" or for the "dumping" of the food remaining in the trough, being these mechanisms exemplified in the "Alternative solutions". Said mechanisms are based in the use of a "recovery device" that functions attached to the mobile feeding device, inside which is deposited the food that is withdrawn from the trough by means of the total sweeping or the dumping mechanisms.

The food deposited inside the recovery device is later unloaded in one or more food receivers sited in fixed points of the mobile feeding device's trajectory. The food accumulated in said receivers may be withdrawn by means of any other mechanism.

A solution for automatically recycling the food deposited in the recovery device is also provided, this by means of a "recycling device" that functions attached to the mobile feeding device. Said solution is also exemplified in the "Alternative Solutions".

In this case the recycling device withdraws food from the recovery device and mixes it with the food existing in the food deposit of mobile feeding device itself. In this way, it operate without food receivers in fixed points and without the mechanisms necessary to withdraw the food from said food receivers.

b.4) Measuring the Unconsumed Food.

Besides the previously mentioned food handling, an adequate unconsumed food management requires knowing the amount of food not consumed by each individual animal.

Any of the proposed mechanisms for unconsumed food manipulation, be it by means of the partial sweeping, the total sweeping, or the dumping of said food, allow to measure for each particular site the amount of unconsumed food and allow to associate said amount with the identity of the animal that previously occupied the site.

It is possible to evaluate, among others, the animals' maximum ingestion capacity. This value may be obtained, for a particular animal, based on the small gradual variations in the amount of unconsumed food by said animal during multiple visits to the stall. This is possible only if the amount of food dispensed to said animal tends to be above its maximum ingestion capacity.

The value of said maximum ingestion capacity allows to automatically adjust the amount of food dispensed to a particular animal according to the evolution of its food consumption during its last stays in the stall, thus allowing to minimize the amount of unconsumed food and thus the amount of food that must be withdrawn from the trough.

In the case of the partial sweeping, said automatic adjustment allows to reduce the size and complexity of the sweeping device, while in the other cases it allows to optimize the recovery device's size and the recycling device's capacity.

On the other hand, said automatic adjustment of the amount of dispensed food is particularly necessary when it is desired to feed animals that are in their lactation's first third.

In said period, the amount and quality of the animal's ingested food must be maximized for the purpose of compensating the nutritional deficit that the animal suffers as a result of starting to produce milk. The degree to which such nutritional deficits are compensated determines the animal's productivity, not only during its lactation's first third, but also largely determines the whole lactation's period productivity, besides determining its reproductive efficiency and other health aspects.

Besides determining the maximum ingestion capacity, knowing the amount of non-ingested food allows to know the response that a particular animal presents with respect to a specific diet.

Such evaluation is particularly necessary during the lactation's first third. In this period, besides maximizing the ingestion, the diet must be continuously adjusted and evaluated. The variation in the animal's ingestion capacity must therefore present a gradual increase while the animal adapts its digestive system to the new nutritional demand, being the rate of said gradual increase an indicator of the animal's response to the assigned diet.

After the lactation's first third, and with the purpose of optimizing feeding costs, the dispensing of food is usually gradually reduced and less quality foods being usually used. In this period the reduction of the dispensed food is usually done as a function of the lactation's state of advance and/or as a function of the milk production obtained, being thus irrelevant to know the animal's response to the assigned diet or its maximum ingestion capacity.

Beyond the determination of an animal's maximum ingestion capacity—that is determined based on the small gradual variations in the amount of unconsumed food—it is good to know the occurrence of significant variations in short periods of time, that will be taken as alert indicators.

When a taste deteriorating additive has been dispensed, usually a high-risk additive, said alert will indicate that the animal has ingested an amount significantly smaller than expected and thus its diet should be modified.

Excepting the previous case, an important sudden reduction in the ingestion of food will be taken as an alert indicator for the early detection of sickness.

b.5) Characteristics of the Partial Sweeping

The "total sweeping" mechanisms or the "dumping" ones described in "Alternative solutions" suppose a higher cost than the partial sweeping mechanism since they necessarily require the use of the recovery device, besides requiring the use of the recycling device or of other(s) device for handling the food withdrawn from the trough.

While in the total sweeping or dumping mechanisms the amount of unconsumed food is measured by the recovery device, in the case of the partial sweeping the amount of unconsumed food is measured by means of a metering device that is attached to the sweeping device.

Even though the proposed invention must not be restricted to the use of a specific measuring technique the metering device may be implemented at a very low price using only one or a few level (height) metering devices attached to the sweeping device. The volume of food present in each site is calculated in this case based on multiple measurements of the level (height) of the food being dragged by the sweeping device during the sweeping.

The food's draining-through technique contributes to improving the measurement, since every calculation of the volume of dragged food will be more precise as the levels of said dragged food remain low. Even so a high precision shall not be obtained due mainly to the very varied sliding over itself capacity that said dragged food will exhibit during the sweeping.

The measuring precision must be sufficient to establish some food amount thresholds, such that once the food amount is above some predetermined threshold a certain state of the feeding process is diagnosed.

For example, a first threshold may be established in such a way that once it is surpassed, during some stays of the animal in the stall, the food amount dispensed to said animal may be adjusted to a lower value, considering that eventually its ingestion capacity may be below the expected level.

For example, a second threshold may be established in such a way that once it is surpassed, during one or some stays of the animal in the stall, an alarm may be fired indicating that the animal has not completely ingested a high risk additive, or conversely indicating that the animal may be sick.

Even though a higher number of thresholds may be established, it is interesting to illustrate how based on a measurement, even a low precision measurement, and with only two thresholds, it is possible to manage the unconsumed food according to already desired requirements.

Beyond the amount of unconsumed food measurement aspects, the drained-through food's flow rate must be controlled so as to minimize the risk implicit in its consumption, especially when said food contains high risk additives.

The measurement of the amount of the food dragged by the sweeping device, whichever the measurement technique may be, allows us to know the amount of drained-through food in each site. Moreover, it allows to approximately know the sites where the high-risk additives contained in the food result to be distributed along the trough.

This characteristic allows for an automatic regulation of the maximum drained-through food's flow rate according to the implicit risk in said food's consumption and allows to make automatic corrections on the food quantity that must be dispensed to the next animals that will occupy the sites where such food was drained-through.

Said maximum volume may also be regulated in a manual way, being possible to regulate it for example during the system's start up or when there are important changes in feeding practices.

Finally, it must be considered that the partial sweeping does not totally solve the effects of the food remaining in the trough since in some cases the food drained-through during the sweeping may notoriously affect animal behavior and/or milking quality. In such cases the partial sweeping must be complemented with the use of the animal handling system also provided by the current invention.

3) Animal Handling and Proposed Solution
a) Current Situation

Beyond nutritional purposes, animal feeding during milking is usually done to improve animal handling and milking performance; nonetheless, some feeding practices may cause a deterioration in both aspects.

The food that a batch of animals don't consume during their stay in the stall and that remains in the trough until the moment of the next batch's entrance generates the detention of the animals in said next batch as they enter the stall.

When there are no foreseen mechanisms for impeding animal access to the food remaining in the trough, or for controlling the amount of said food, a high occurrence of animal detentions will occur, generating important variations in the entrance time of said animals to the stall.

As the number of sites in a stall increases, the undesired effects of those variations in the entrance time on milking performance will increase, possibly reaching an extreme where feeding animals during milking may turn counterproductive.

Beyond milking performance, the detention of animals during their entrance and exit to the stall reduces the stall's performance and causes difficulties in animal handling, being "animal handling" the tasks related to the animal circulation flux in the stall and to their adequate accommodation in the stall's sites.

There are, in the previous art, several types of mechanical systems that control animal access to their sites during their stay in the stall, and in some cases also controlling or facilitating said animals' exit from the stall.

One of those systems is the one used in the "rapid exit stalls". This system controls access to the sites by means of movable separators, while during animal exit the trough is elevated out of animal reach.

The closest solution in the state of the art is the one used in the already mentioned Robot Stalle. This robot also directly controls animal access to their respective sites, while it forces animals to raise their heads and abandon the food as they exit the stall.

Generally, the existing solutions in the prior art are highly costly when their application to a high number of sites and/or for big sized animals is considered, their application not resulting viable in the pasture-based dairy farms here considered.

b) Proposed Solution

Due mainly to the milking practices used in pasture-based dairy farms here considered, the deterioration in milking performance caused by detentions of animals during their entrance to the milking stall becomes especially relevant.

In such farms, the milking parlor are usually composed of two milking stalls longitudinally located at both sides of a central aisle through which the operator circulates. In order to reduce milking equipment costs, each milking unit is used for milking on both sides of said central aisle in the corresponding sites facing each other.

Thus, as a first animal in a random site is milked, a second animal in the same site number but on the opposite stall must wait until the corresponding milking unit is free in order to be milked.

If there has been a delay during the first animal's entrance to the milking stall said delay will also be extended to the second animal in the opposite stall, causing a mismatch between the start of its milking and the "oxytocin effect" occurring in its metabolism.

It is known as oxytocin effect the high liberation into the bloodstream of the hormone oxytocin, exhibited by a milking animal after being stimulated in order to start its milking and lasting some minutes and then naturally reduced to normal levels.

An increase in the abovementioned mismatch causes an early reduction in the milk flow that the second animal delivers during its milking, caused by the natural reduction of the oxytocin level and thus requiring a longer milking time. The milking time extension on its turn means an increase in the pain caused by the milking equipment to the second animal, accelerating the reduction in the oxytocin level.

As a consequence, the milking of the second animal will have a delay that on its turn may cause a mismatch between the milking start and the "oxytocin effect" on a later third animal that will occupy the same site as the first animal. In this way, the mismatch effect may eventually propagate affecting multiple animals but starting with an extension in a single animal's entrance time.

Moreover, since "high line" milking equipment are usually used, which are particularly aggressive regarding the pain caused to the animal during low milking flow's time, conditions for the ready propagation of the mismatch effect are given.

Said mismatch, and its propagation, are usually reduced to a great extent if the operator keeps a strict control on the milking routine times. Nonetheless, the tendency to increase the number of milking stalls' sites and the reduction of operators convey in practice to a reduction of said time control.

b.1) Food Access Control

The current solution proposes an animal handling system that allows, among other things, to minimize animal detention during their entrance to the milking stall when same is caused by the food remaining in the trough.

The animal handling system here proposed specifically complements the partial sweeping mechanism, allowing to minimize animal detention caused by the drained-through food. Besides said case, the handling system here proposed may result convenient in any case where it is intended to optimize animal handling and/or minimizing the detention of animals caused by food remaining in the trough or by the food smell coming from the trough.

The animal handling system proposed controls the access of animals to the food by means of an endless curtain fitted with a blocking portion that impedes animal access to the food remaining in the trough and a non-blocking portion that allows said access.

In the moment prior to a batch of animals' entrance to the stall, the blocking portion will be set in such a way as to impede animal access to the food in the totality of sites except for the first one. During the entrance of animals, that's to say during the first run (performed by the mobile feeding device), the blocking portion is displaced one site ahead of the mobile identification device, thus progressively freeing the access of animals to their food until arriving to the last site.

In this way access to food is allowed to each site at the same time as the mobile feeding device gets to the same site. This allows to dispense the initial dose during the first run according to the feeding mechanisms already described.

During the animal's exit from the stall, the blocking portion is displaced one site behind the mobile feeding device, progressively impeding animal access to the food for the first site and until the last.

Animal access to food is thus impeded one site behind the mobile feeding device with the purpose of applying the semi-automatic separation that is described from here on.

b.2) Semiautomatic Separation

The solution here proposed provides a low-cost alternative for facilitating the separation of animals at the stall's exit. This semi-automatic separation is based on the use of the endless curtain and animal stimulation through food.

When during the animals' stall exit it is desired to change the destiny of an animal, for example to separate it from the other animals, the endless curtain's displacement is stopped in such a way that the blocking portion impedes animal's access to food up to the previous site to the one occupied by the animal whose destiny we wish to change, simultaneously to the supply of food to said animal in order to stimulate it to remain in its site while the animals that antecede it abandon the stall.

After said animals that antecede the one we wish to separate abandon the stall, the necessary operations are made to change the destiny of the animals upon exiting the stall, by means of closing or opening the necessary gates or through any other mechanism, and after these operations are made the displacement of the endless curtain is again allowed, thus impeding the food access to the animal whose destiny has been changed.

When it is desired to change the destiny of the following animal—with respect to the previously described—the abovementioned operations must be repeated in order to stimulate said animal to remain in its site. This is the case in which it is desired to separate only one animal from the rest.

The semiautomatic separation does not ensure the retention on the animal whose destiny must be changed, and for this reason it is convenient to use it jointly with some type of marking the animals to be separated.

The very same characteristics of this invention make viable the marking of animals with paint. The combination of semiautomatic separation and marking with paint may result more attractive than the automatic separation systems in the case of farms here considered.

In the case of the Robot Stalle it is possible to ensure the retention of the animal that must be separated by selectively unlocking the headlock gates as the herd's stall exit is happening. This is a typical characteristic of the headlock stalls.

Beyond the usefulness of semiautomatic separation as a low-cost solution, this animal separation is useful as a complement when automatic separation systems based on ISO 11784-85 technology are used.

Said separation systems do not detect animals that have lost their tag or whose tag is persistently malfunctioning, with the result that animal separation is not possible. Given that the solution herewith proposed allows to detect such cases, semiautomatic separation as is here proposed is an adequate complement for jointly operating with the automatic separation systems considered.

b.3) Compatibility of the Solution

Differently to the animal handling systems offered in the marketplace, the system proposed only controls the access of animals to the food instead of access to the stall's sites. That's to say, it allows the animal to place itself or remain in the site, even when access to food is not allowed. This feature allows the reduction of the costs originated by the high number of sites and the management of big animals, and at the same time this feature gives compatibility with the identification and feeding systems here proposed.

In the cases of the Robot Stalle and the movable separators considered before, where access to the sites is controlled, the systems must have enough mechanical robustness in order to sustain the direct pressure that animals exert against different parts of said systems, including the pressure resulting from animal competition for food access.

Even though the reach of the proposed solution must not be restricted to a specific type of endless curtain, it must be considered that the curtain's width or height and involved fastening mechanisms determine to a great extent the system's cost when it is applied to a high number of sites. The use of canal type feeder (trough), without compartments separation between sites, is therefore especially useful to hold at a low cost the long curtain extension necessary to control access of animals to the food.

Additionally, if the curtain is displaced inside the trough, the pressure that animals may exert on the curtain is endured by the trough and not by the curtain itself, this aspect allowing to drastically reduce the systems sturdiness with respect to the previously existing ones.

For example, a low-cost option could be the use of an endless curtain whose blocking portion impeding animal access to the trough may be made with steel wire ropes forming a mesh that may be electrified.

Given that the use of electrified fences is frequent in pasture-based dairy farming, the use of electric shocks inside the milking stall must not necessarily generate an increase in animal stress during milking as long as the requisites describes in the preferred embodiment are fulfilled.

Another low-cost option, not necessarily requiring the use of electric shocks to impede access to the food, may be the use of high resistance canvas for manufacturing the curtain's half that is used to impede animal access to the food.

Contrary to the Robot Robot, food access control allows the animals to locate themselves in their sites as they enter the stall, independently of the endless curtain's position and of the mobile feeding device.

In this way, the handling system allows for the time extension dedicated to one identification opportunity without extending the animals' entrance time to the stall, simultaneously allowing to apply the training mechanism and its eventual inversion. In this way, access control to the food also provides compatibility of the handling system with the rest of the system here proposed.

Beyond the usefulness of the animal handling system in order to minimize the effect of draining-through food remaining in the trough after the partial sweeping, said solution must be used to minimize animal detention caused by the food smell emanating from the trough.

Given that in the first lactation third animals will be dispensed high quality food, usually with a very attractive taste, these foods' smell may cause a detention, mainly, of those animals which had already had these foods substituted for other ones of lesser quality.

Finally, the animal handling system here proposed may be used jointly with any other identification and feeding systems, and with any of the purposes of improving animal handling, improving the milking performance or improving the stall's performance. It may even be particularly useful for operating with feeding systems that do not manage the food remaining in the trough.

Preferred Embodiment

Together with the solutions that the current invention proposes in order to identify, feed and handle animals, it is included in this preferred embodiment those that allow to optimize the proposed system's cost and at the same time solve the specific necessities of the pasture-based dairy farms in less developed countries, especially in the South American Southern Cone.

Such necessities, that are the same as previously analyzed in "Detailed description of the invention", have their origin mainly in the use of certain low-cost equipment and in the use of certain practices to be considered in the following paragraph.

Regarding low-cost equipment, it is outstanding: the use of herringbone milking stalls and other fast circulation variants, the absence of mechanisms for controlling animal access to the stalls' sites and/or the food existing in those sites, the use of multiple hopper feeding systems dispensing a single food's type, the use of identifiers type RFID tags of ISO 11784-85 technology applied to the animal's ear, the use of automatic identification systems that operate at the stalls' entrance, and the use of "high line" milking equipment where each milking unit is used to alternately milk on two facing stalls.

Regarding the main practices to be considered, the following ones are outstanding: the formation of milking herds of medium and high number of animals, the very varied state of advance in the lactation cycle of the animals conforming said herds, the application of a same diet (not individualized) to groups of a high number of animals or to the whole milking herd, the low individual animal confinement time (usually only during milking), the use of milking stalls of medium to high number of sites, and the low number of operators in relation to the number of sites in said milking stalls.

We refer to application environments where it is beneficious to perform animal handling through an electrified endless curtain, mainly with the goal of minimizing animal detention as they enter the stall, being that a moment when they are attracted by the presence of food in the trough or by the smell of same.

Given that it is intended to feed batches of animals of varied state of advance in their lactation cycle, to a sizable portion of these animals the high quality food (tasting better) dispensed at the lactation's beginning may have been substituted for a lesser quality food. These animals will then be strongly attracted by the smell or presence of the high-quality food that they have consumed at the beginning of their lactation period.

Said strong attraction is one of the main reasons for the tendency to electrify the endless curtain in order to discourage animals that want to get near to the trough in order to smell or lick the trough's surroundings or the upper part of the endless curtain. Another important reason for electrifying the endless curtain is that it reduces the costs of the proposed feeding system and its utilization.

The necessities originated by the abovementioned aspects, as well as the qualitative aspects of the corresponding solutions proposed have already been exposed in depth in the "Detailed description of the invention".

1) Electronic Identification, Proposed Solution a) Identification System (Description of Hardware)

The proposed identification system in the current preferred embodiment has been designed so as to be operated by means of another system, or "operating system", and it generally fulfills the functions of animal identification and reporting the information to the operating system.

Figure 2:
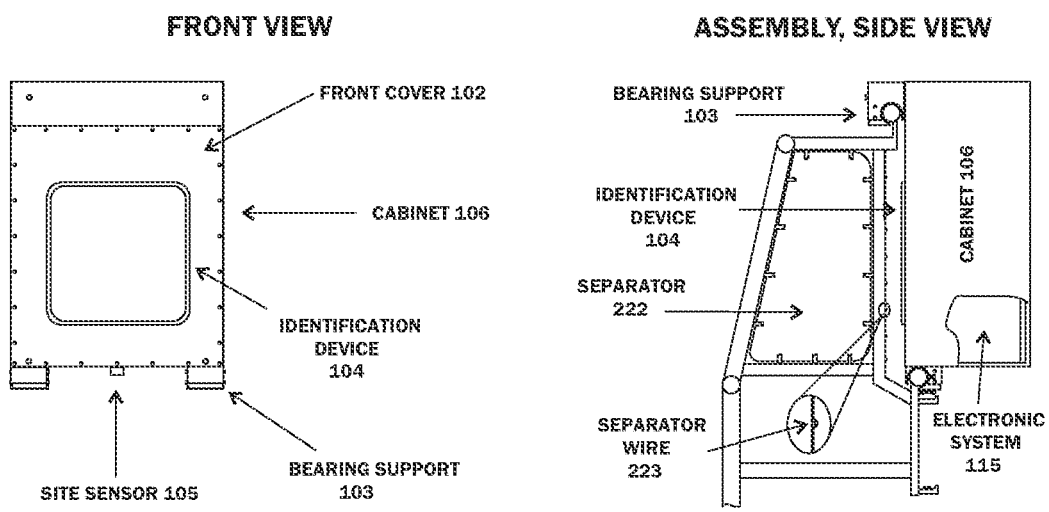
FIG. 2 describes the main parts of mobile feeding device 101 and its assembly with respect to some parts of milking stall 221 of FIG. 5.
Figure 5:
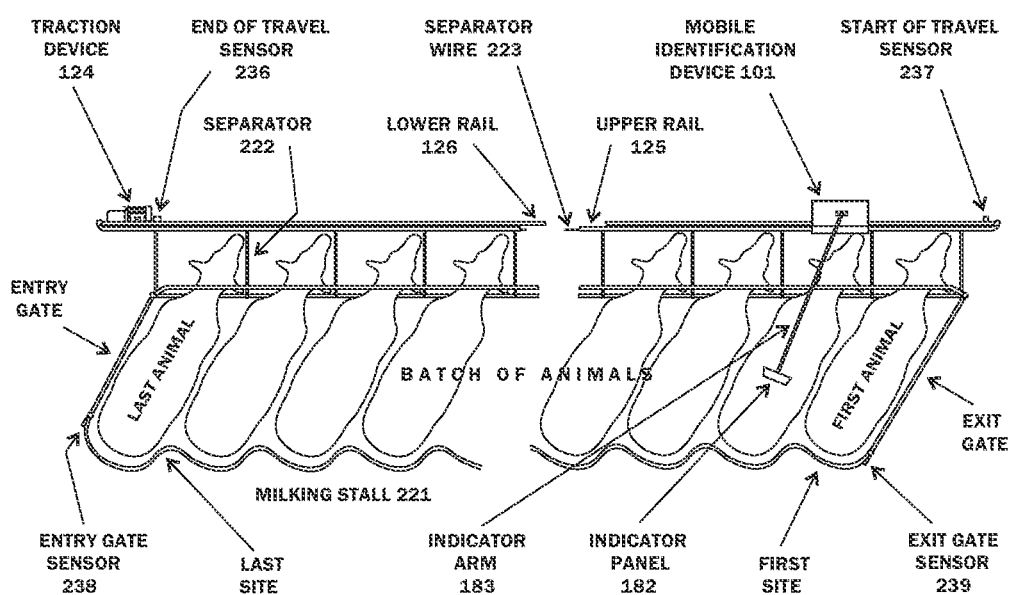
FIG. 5 shows the upper view of milking stall 221 and the lay-out of the different parts of the identification system with respect to said stall.

FIG. 2 describes the main parts of the mobile identification device 101 and its assembly with respect of certain parts of the milking stall 221 of FIG. 5.

The mobile identification device 101 is formed mainly by the very cabinet 106 structure. This structure in mounted on rails by means of four ball bearing supports 103, allowing to move the cabinet on two horizontal rails.

The mobile identification device 101 is displaced on said horizontal rails arranged on the stall's longitudinal sense, being detected its location in front of each site by means of the site sensor 105. Once a site is detected the mobile identification device 101 will stop in order to identify the animal that is in that site.

The identification is done by means of the identification device 104, that for the case of this embodiment is implemented by a copper wire coil that is incorporated to the front cover 102 of cabinet 106.

The front cover 102 may be made of fiberglass, plastic or other materials. Whichever the used material is, it must fulfill the purpose of separating the identification device 104 from the other metallic parts without notoriously affecting the behavior of the electromagnetic field emitted or received by said device.

Cabinet 106 holds in its interior, among others, the electronic system 115 that controls the identification system (including the identification device 104). The electronic system 115 may also be configured to exchange information with other mobile identification devices, with the system's fixed parts and with the "operating system".

The multiple separators 222 (see FIG. 5) must be built of any material that blocks electromagnetic waves, as for example galvanized iron sheet. These separators will be arranged between the animals' heads in such a way that when an exciting signal is emitted in order to identify the animal in a site, the tags of the animals in adjacent sites will not be excited.

Multiple separator wires 223 will be arranged in the stall's longitudinal sense, between separator 222 and the zone where the mobile identification device 101 is moving, forming a mesh that impedes the collision of the mobile identification device 101 and the animals' heads. The material and or location of separator wires 223 must not notoriously affect the behavior of the electromagnetic field emitted or received by the identification device 104.

FIG. 3 describes the transmission device 121 that allows for the displacement of mobile identification device 101 in the longitudinal sense of milking stall 221.

The transmission device 121 allows to displace the mobile identification device 101 on upper rail 125 and lower rail 126. The traction for this displacement is made by traction device 124, consisting of a motor with reduction gear and a pulley 130 acting on belt 123.

Belt 123 is mounted on pulleys 130 and 131, and its extremes are fastened to bearing supports 103 that operate on lower rail 126. The belt 123 tension may be adjusted from either of its extremes. The weight of the belt 123 long extension, said extension from pulleys 130 and 131 is supported by means of several upper guides 127 and multiple lower guides 128, guides that are attached to the lower rail 126 supports, as the assembly is shown in its lateral view in FIG. 3.

Figure 4:
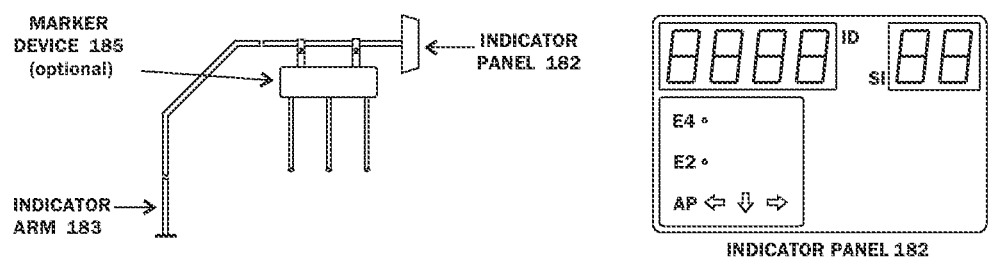
FIG. 4 describes indicator device 181 that reports to the operator information regarding the site in the moment that it is being served by the mobile identification device 101.

FIG. 4 describes the indicator device 181 that reports the information relative to the site to the operator, in the moment when it is served by the mobile identification device 101.

The indicator arm 183, besides acting as support of indicator panel 182, may also act as a support for the animal sensor (that detects the presence of an animal in the site) in the cases where its use is required, and may also act as support for other devices that may operate above the animals. For example, animals' temperature measurement, insecticide applier, other readers of transponders or identification, animal markers with paint, etc.

In this invention it is also contemplated, as an optional issue, the use of marker device 185 for the purpose of marking animals with paint in the case of those animals whose separation has been decided.

Indicator panel 182 has an "ID" display that shows the animal identification code of the identified animal, an "SI" display that shows the number of the site where the animal was identified, and other luminous indicators.

Luminous indicator "E4" indicates in advance that a reliable identification shall not be attained in the expected moment, luminous indicator "E2" indicates the impossibility of obtaining an identification and luminous indicators "AP" show the sites where animal separation is required.

Luminous indicator "AP" (arrow type) pointing downwards indicates if the animal occupying that site where the mobile identification device 101 is must be separated, while the ones pointing to the sides indicate if the corresponding contiguous animal must be separated.

The information obtained or generated by the identification system may on its turn be reported to a specific operator, and/or to any user in general, by means of any type of interface, either local or remote. These interfaces will be part of the "operating system" to which the proposed system reports information.

The indicators included in indicator panel 182 are only examples of the indications that may be included in said panel. In this case the indicators included are those that are better adapted to the field of application of the current preferred embodiment.

FIG. 5 shows an upper view of the milking stall 221 and the layout of the identification system's different parts, with respect to the stall.

The milking stall 221 is a variant of the herringbone stall, here considered as a fast circulation stall, where stall's cow platform and its entry gate and exit gate are, all of them wider than the conventional herringbone stall.

The transmission device 121 in FIG. 3 is arranged in front of milking stall 221 in such a way that the mobile identification device 101 is displaced in front of animals' heads.

FIG. 5 shows the layout of upper rail 125, lower rain 126 and traction device 124, being all these parts fixed to the milking stall.

Mobile identification device 101 will perform runs between the start of travel sensor 237 and the end of travel sensor 236 so that it includes all animals from the first to the last as shown in FIG. 5.

Entry gate sensor 238 and exit gate sensor 239 allow the identification system to detect when said gates are either open or closed. These sensors are used to detect the entrance and exit of animals of milking stall 221.

Indicator arm 183 is set with a slight inclination so that indicator panel 182 is located above the animal in the moment that said animal is identified, in order to indicate in a physical way the identified animal.

In this description reference has been made to only one milking stall over which only one mobile identification device works. Nonetheless multiple milking stalls may coexist within the same identification system, and over each one of them one or more synchronized mobile identification devices 101 may work, each one serving a subgroup of sites within the stall.

b) Identification Method (Description of its Functioning).

The identification method's preferred embodiment is herewith described in its main aspects, by means of a process dedicated to animal identification that is repeated for each batch of animals that enters the stall.

The software for this identification process will be executed by a "higher level software" that at the same time is an interface with the "operating system". The design and implementation of the identification process software is considered out of the scope of the current description. The design and implementation of the "higher level software" is also considered out of the scope of the current description. The protection of both will be through the copyright.

The batch of animals entering milking stall 221 is of equal or smaller number than the number of sites in said stall and will be completely evacuated before the entrance of the next batch. The process through which the animals are identified is repeated for each batch that occupies said stall.

Figure 6:
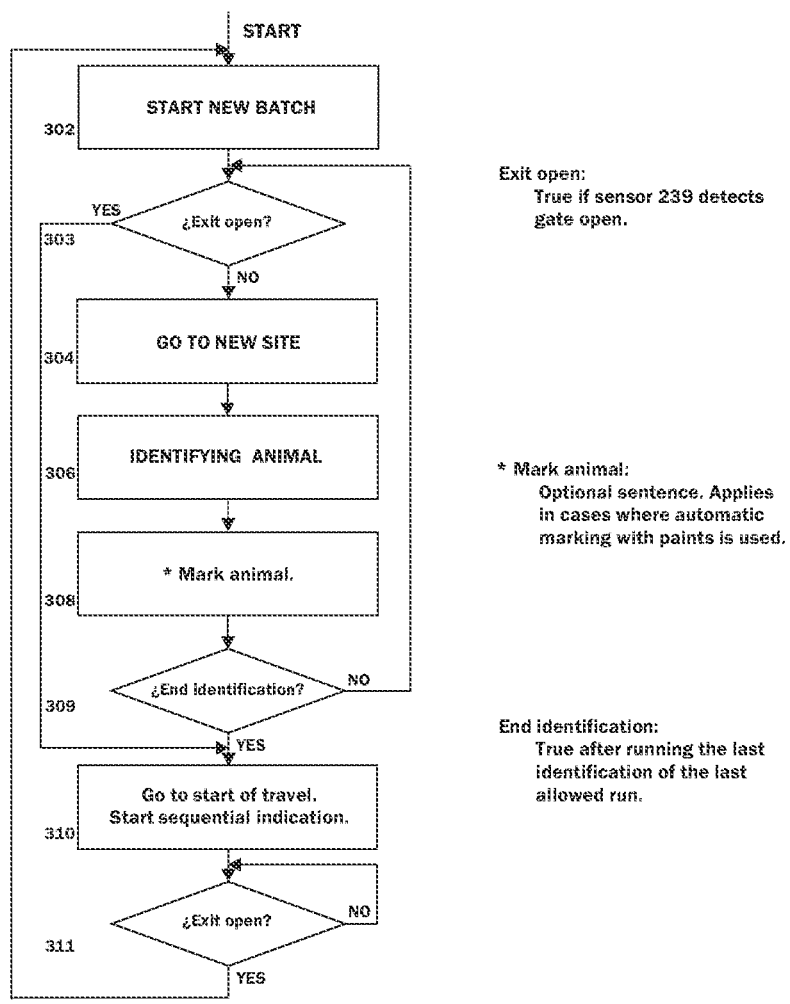
FIG. 6 shows identification process 301, describing the animal identification process.

FIG. 6 shows the animal identification process 301.

Every time that the identification system is initialized, or that the identification process of a batch of animals ends, block 302 is executed, where the system is prepared to start the identification process for a new batch of animals.

It is understood as the "execution" of a block the execution of the functions (in capital letters), of the statements (in small letters), and of the conditions (in small letters and with interrogation signs) that are included in the block.

Once the entrance of a new batch of animals to milking stall 221 is allowed, block 304 will be executed, where mobile identification device 101 is displaced up to the first site in order to start the animal identification process.

During the identification process the flow will iterate mainly in the loop included between blocks 303 and 309, displacing the mobile identification device 101 from site to site by means of block 304, identifying the animal present in each site by means of block 306.

The displacement for abandoning a site will be started after the obtention of the identification in said site. In this way mobile identification device 101 will abandon the first site when the animal there is identified, the second site will be abandoned when the second animal is identified, and so on.

When there is no animal in the site served by the mobile identification device 101, or when it is not possible to identify the animal there, the displacement of said device may be forced by the intervention of the operator and/or after a certain time has elapsed.

In this last case the flow will remain stopped in block 306 until one of the mechanisms for forcing the displacement of said device is executed, after which the flow may be allowed again to execute block 304 and the corresponding displacement to a new site.

In this way, mobile device 101 will be displaced from site to site until the last site has been served, thus completing a run. Then it will be displaced in the opposite direction and a new run will be made in that direction, and so on successively making runs in both directions for as long as the same batch of animals stay in milking stall 221.

What was described above is the way in which the multiple "identification opportunities" (as described in "Detailed description of the invention") are generated for each site, said identification opportunities being distributed along the stay of the same batch of animals in the stall.

The identification obtained in each identification opportunities by means of block 306, will be stored in memory associated with the site number in which it was obtained. In this way it will be associated for each site as many identifications as runs there have been for that site during the animal batch identification process.

FIG. 7 shows a possible way of organizing in the memory the data generated or obtained during a batch of animals' identification process as well as the storing order of said data during said process.

The runs during which each site has been served are accounted by the run counters 322 implemented in the system's memory. The value of each run counter 322 is used for selecting a row in data matrix 323.

The number of the site that is served by the mobile identification device 101 is stored in a program variable that is on its turn used to select a column in matrix 323. In this way, each data group or entrance to matrix 323 will contain the data corresponding to a specific site, generated or obtained during a specific run accounted for by run counter 322 corresponding to that particular site.

The order in which data of matrix 323 are stored depends on the displacement of the mobile identification device 101, as is shown in the "storage order" of FIG. 7. In such example the mobile identification device 101 has already made five complete runs and is stopped in the second site as it executes the sixth run.

From the point of view of each particular animal's identification process it is interesting to consider the accounted runs instead of the run that is being executed. For example, in FIG. 7 a fifth run has been accounted for the first site—that's to say that the respective run counter 322 has increased to the number of five—while for the other sites six runs have been accounted for.

In this way, both the identification process for each particular animal and any other process that depends on identification—for example the feeding process—must be performed in each site according to the number of runs accounted for each site by the respective run counter 322.

In the current realization, all the run counters 322 are initiated from zero at the same time when the system starts and each time that a new batch of animals enters the stall. This last case must not be considered as a "starting a run counting" action proposed by the identification method (claim 1. point $a_6$), where it is proposed to start the counting for one site each time that an animal enters said site, but it is a simplification that in this case is possible to use given that all the run counters 322 are initiated from zero at the same time.

The data generated or obtained during a batch of animals' identification process will be stored in matrix 323 and must be transferred to the "operating system" necessarily before the start of the identification process of a new batch of animals, moment when the data of matrix 323 will be deleted.

The identification of a batch of animals is finished when block 309 derives the flow to block 310, or may be finalized by the operator without regard for the identification process' state of advance by means of the opening of milking stall 221's exit gate, opening that is detected in block 303 deriving the flow to block 310.

In block 310 the mobile identification device's displacement towards the start of its travel is initiated and the sequential indication is started. The sequential indication shows for some seconds in the indicator panel 182 the information referring to each site, displaying the information of all sites in a sequential mode and without regards for the position or the site where the mobile identification device 101 is.

Excepting the cases where the sequential indication is activated, indicator panel 182 displays the information corresponding to the site where the mobile identification device 101 is, being the information displayed in said panel updated every time that the site sensor 105 detects a new site.

The opening of the exit gate by the operator, besides ending the identification process when it is detected in block 303, is also used to end the identification process when it is detected in block 311. The sequential indication will remain active during the execution of block 311 and during the start of the identification process dedicated to the following batch of animals that is to enter the stall.

In block 308 it is possible to mark with paint those animals that must be separated. The statement "Mark animal" is of optional use and its implementation exceeds the current description's reach.

This solution's reach must not be restricted to the tasks here defined for blocks 308 and 310. The possibility of serving multiple animals in multiple opportunities during their stay in the stall may turn viable the use of the same mobile identification device for other additional automatic tasks.

For example, in block 308 it is possible to additionally implement the dosage of foods, reading other transponders or identifiers carried by the animal, measuring animal temperature, insecticide application, etc.

In the case of block 310 other tasks may also be additionally implemented, as for example the management of food remaining in the trough after animals have fed, the control of mechanisms that allow the optimization of animal handling inside the stall, etc.

b.1) Identification Mechanisms

The data generated or obtained during a batch of animals' identification process and temporarily stored in matrix 323 is managed mainly in block 306 of FIG. 6.

Figure 8:
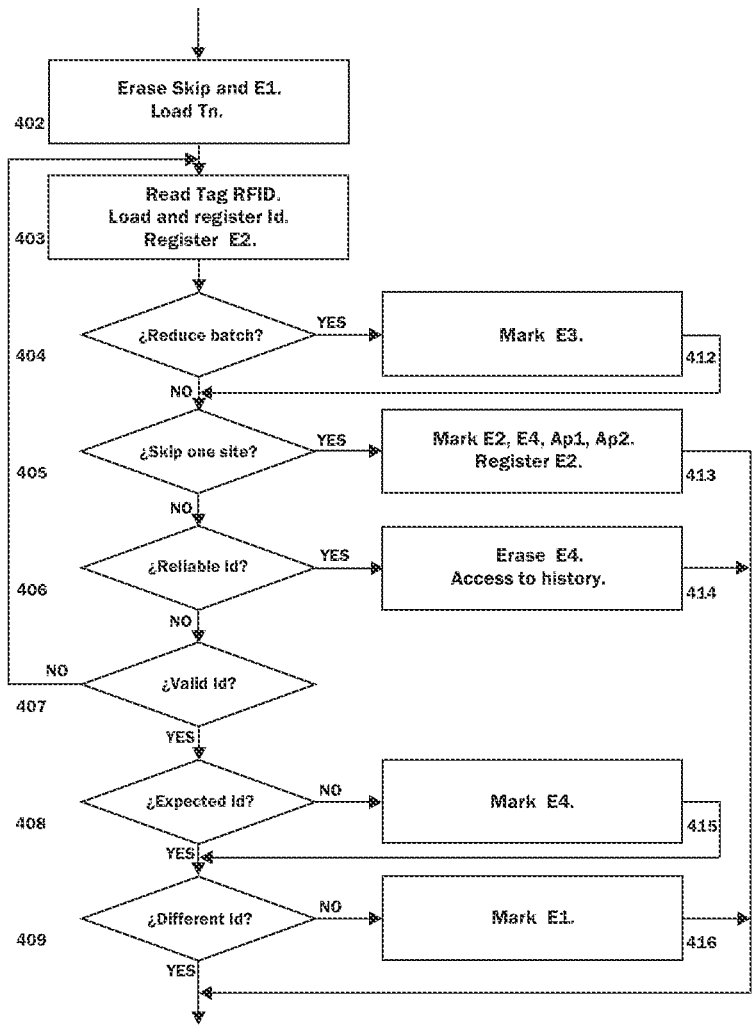
FIG. 8 shows the flow diagram for function 401 "IDENTIFYING ANIMAL", one of the possible implementations of the function corresponding to block 306.

FIG. 8 shows the flow diagram of function 401 "IDENTIFYING ANIMAL", one of the possible implementations of the function corresponding to block 306.

The flow of function 401 iterates mainly between blocks 403 and 407. When in block 403 it is not possible to obtain an identification, block 407 detects that a valid "Id" (identification code) has not been obtained and block 403 is executed again and a new "identification attempt" is made, that's to say, an excitation signal is emitted again with the purpose of activating the RFID tag that may be near to the identification device 104.

This is the way in which the "multiple identification attempts" are generated, these attempts corresponding to the same "identification opportunity" as it has been defined in the "Detailed description of the invention", being these attempts the ones that take place when it is not possible to identify an animal and that may be extended in time according to the mechanisms that are described as follows.

Figure 9:
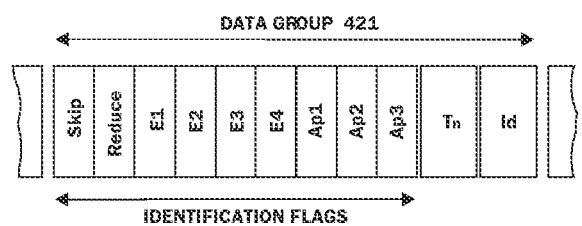
FIG. 9 shows the fields of data group 421, one of the possible structures of the data groups or entries to matrix 323.

FIG. 9 shows the fields of data group 421, that is one of the possible structures of the data groups or entries in matrix 323.

When in block 403 an "Id" (identification code) is obtained, same is loaded in the same name field of data group 421. Additionally, each "Id" that is read for the first time is permanently (non volatile) registered in the system itself (system registry), thus generating an entry (or memory space, that does not belong to matrix 323), where the information related to said "Id" is registered.

Differently to the "animals' history data record", it will be possible to have access to this "system registry" without regard to the reliability of the identification obtained. This registry shall be used mainly for the storage of information related to the diagnostic system and the identification tags.

In block 402 the flags "Skip" and "E1" are erased, and the field "Tn" is loaded with the system's time value. Even though the totality of data for groups 421 are erased in block 302 of FIG. 6, a group 421 may contain data if the reversing mechanism of the mobile identification device has been previously executed, said mechanism as was described in "Detailed description of the invention".

When it is not possible to identify an animal in a site, the displacement of the mobile identification device 101 is forced by means of the operator's intervention and/or after some time has elapsed, according to the condition of block 405.

During the first and second accounted runs, said condition is fulfilled only if the flag "Skip" has been marked through the operator's intervention. Flag "Skip" will be marked by the operator through the activation of an easy access switch, as for example a switch that allows to be activated through a rope at the operator arm's length that goes longitudinally through milking stall 221.

After the operator marks the flag "Skip" a first preestablished time must elapse for that condition to be fulfilled. This preestablished time must be chosen so as to disincentive the indiscriminate use of this mechanism by the operator. The delay introduced by this time must be longer than the average time for verifying the presence of an animal in the site considered, or the verification of the animal's state.

After the second accounted run the displacement may be forced only after a certain time has elapsed. The condition of block 405 will then be fulfilled after a second preestablished time has elapsed—shorter or equal to the first preestablished time—being said time measured starting with the detention of the mobile identification device 101 in the site being considered.

After the condition in block 405 has been fulfilled, block 413 is executed marking flag "E2", among others, indicating the impossibility of obtaining an identification in the site that is being served by the mobile identification device 101.

Flag "Ap1" indicates the separation of the animal in that site and is marked when no identification is obtained in any of the accounted runs for that site. In this way the separation of an animal is determined for the cases where it has lost its tag or said tag shows a persistent malfunction.

Marking flag "Ap1", to be executed in block 413, is thus dependent on the state of flags "E2" of all entries to matrix 323 that correspond to the site served, that's to say, of all the column of matrix 323 corresponding to the site served.

The flag "Ap2" indicates the separation of an animal in the site being marked when the average of marks of flag "E2"—considering the latest stays of an animal in the stall-exceeds a preestablished threshold. In this way the separation of an animal is determined for the cases when its tag shows a non-persisting malfunction.

The system registry includes a registry of the occurrences of flag "E2" being marked. To each "Id" registered, that is to each identifying tag entered to the system, corresponds a data field where said quantity of occurrences for each stay in the stall of the animal corresponding to said "Id".

After flag "E2" being marked one or more times during the stay of an animal in the stall, the amount of marks is accounted by means the statement "Register E2" executed in block 403. Said statement counts the marks "E2" of the column of matrix 323 that corresponds to the site occupied by the animal.

The quantity of "E2" marks is assigned to the "Id" of the corresponding animal once said "Id" is obtained in block 403. When during the stay the same batch of animals more than one "Id" is obtained for the same site, que amount of marks will be assigned to the last "Id" value obtained.

Given that the flag "E2" is marked in block 413 and not in block 403, the statement "Register E2" is also executed in block 413 with the purpose of updating the counting of "E2" marks after the obtention of the last "Id" in block 403.

Flag "E4" is used to generate an identification error alert. The statement "Mark E4", be it executed in block 413 or in block 415 determines said flag's mark for the recently accounted run and for later runs, that's to say for the rest of matrix's 323 column.

Block 406 detects, for the column in matrix 323 that corresponds the site being served, if the amount of matrix entrances with coincident "Id" values reaches the preestablished value so as to consider an identification reliable. If this happens statement "Erase E4" in block 414 is executed, deleting flag "E4" for the recently accounted run and for the rest of that column in matrix 323.

The statement "Access to history" of block 414 is in charge of allowing information transfer between the data history of the identified animal, history that will belong to the "operating system", and the columns of matrix 323 corresponding to the site occupied by said identified animal. Said transfer will remain open during the rest of such animal's stay in the stall.

Given that the animals' history data record will belong to the operating system, said information transfer will be carried out by the "superior level software" that will act as an interface between the identification system proposed and the operating system.

Once the condition of block 406 for a site is fulfilled, the flow shall be derived to block 414 in every subsequent run, independently of the "Id" value obtained in block 403 in said subsequent runs. The results of these identifications, even though they don't have any effect on the determination of the identity of the animal considered, are useful diagnosing information.

When the number of animals available for occupying the stall is smaller than the number of sites in the stall, it is equally possible to perform the identification process. In such case the operator must mark the flag "Reduce" when the mobile identification device 101 stops in the site occupied by the last animal that is part of said lesser number batch. The flag "Reduce" will be marked preferably through the activation of a switch by the operator.

If block 404 detects that flag "Reduce" has been marked, the statement "Mark E3" of block 412 is executed, same determining the marking of flag "E3" for all the column of matrix 323 corresponding to the site being served. The site marked with flag "E3" will be taken from then on as the end of the run, and the displacement direction of mobile identification device 101 shall be inverted when it gets to that site.

When block 407 detects the obtention of a valid identification code "Id" it derives the flow to block 408. For this case the "Id" value will be valid if it is higher than zero, that's to say when it has been possible to read an identification tag.

In block 408 it is detected if the "Id" value is the expected one, by comparing it with the one obtained in the same site during the previously accounted for run, that's to say the one of the upper entrance to the same column of matrix 323. If value "Id" is different to the one obtained during said run, flag "E4" is marked in the abovementioned way.

In block 409 it is detected if the "Id" value is different from the one obtained in the contiguous site previously served, that's to say the value of the previous entrance on the same row of matrix 323. If the "Id" value is the same, then flag "E1" is marked, thus starting the "reverse mechanism" of mobile identification device 101.

The reverse mechanism temporarily reverses the displacement direction of mobile identification device 101, so that the previously served contiguous site is served, and then inverts again the direction, reestablishing the original direction of the displacement.

The value of run counter(s) 322 involved in said displacement inversion will remain unaltered so that the data generated or obtained during said process will replace data previously stored in the same row of matrix 323. The exceptions to be considered are flags "Skip" and "E1", that are deleted in all cases in block 402.

The backward movement that involves a single site previously served is enough for solving the identification interferences between adjacent sites, that's to say when in block 403 the tag of an animal present in an adjacent site is excited and read, instead of doing it for the animal's tag in the site served in that moment.

Nonetheless, in order to solve the "animal displacement", when said displacement involves more than one animal, it is necessary to execute the reverse mechanism on more than one consecutive sites. In these cases, the displacement's direction is re-established to its original sense after the multiple sites previously served have been newly served.

b.2) Identification Alarms

Certain alarms and diagnostics will be reported to the user by means of indicator panel 182. Except for the case of sequential indication, the information displayed in indicator panel 182 corresponds to the site occupied by mobile device 101, or the site it has previously occupied, and is updated every time that a new site is served.

The state of some indications of indicator panel 182 correspond directly with the state of the identification flags of corresponding data group 421 (or the entrance to matrix 323). This is the case of flags "E2", "E4", "Ap1", "Ap2", "Ap3".

The error alarm "E2" corresponding to flag "E2" is fired when it has not been possible to obtain an identification. At the same time alarm "E4" is fired and its effect lasts according to the mechanisms defined above to mark or delete flag "E4". Alarm "E4" indicates in advance that a reliable identification will not be obtained in the expected time.

The indication of animal separation "AP", for the case of the indicator arrow pointing downwards, corresponds to the state of the flags "Ap1", "Ap2" y "Ap3" of data group 421 of the site being served.

When arrow "AP" pointing downwards indicates animal separation by turning on in red, color which belongs to flag "Ap1", indicates a separation request generated by the tag's loss or its persistent malfunctioning.

When arrow "AP" pointing downwards indicates animal separation by turning on in yellow, color which belongs to flag "Ap2", indicates a separation request generated by the diagnosis of tag non persistent malfunctioning.

When arrow "AP" pointing downwards indicates animal separation by turning on in green, color which belongs to flag "Ap3", indicates a separation request that comes from the operating system.

Arrows "AP" pointing to the sides report the state of the same flags but of adjacent sites. These arrows have the purpose of providing the operator more information on the separation requests.

In this way, it is proposed to solve by means an autonomous process, based on the identification system proposed, the diagnosis related to two of the failed readings' causes: the tag's loss or persistent malfunctioning and the tag's non persistent malfunctioning.

A third failed readings cause that may be diagnosed is the system's malfunctioning (not of the operating system). It is considered that this cause might be present when an increase in marks "E2" happens, in a generalized way, in such a way that it generates a notorious increase in the number of animals not identified in a reliable way. Within this occurrence profile it can be found, for example, a hardware or software malfunctioning, a deficient system start up or bad handling of same.

A fourth cause of failed readings, determined as a result of abovementioned causes' diagnosing, is the tag's bad orientation at the moment of reading. In this case the occurrences profile of mark "E2" will be the one remaining in time a permanent way, with small variations that do not affect in a notorious way the obtention of reliable identifications.

This last occurrence profile must be considered as a performance indicator for the identification system that may be used for preventive maintenance. This indicator makes early detection possible—and thus the prevention—of factors that may compromise the identification system's optimum performance.

This indicator will exhibit a minimum value after the system's functioning has been optimized, value that may not be reduced and that shows the incidence of the tag's bad orientation on the system's performance.

The diagnosis mechanisms for the third and fourth causes, as well as its communication to the operator—identification system's malfunctioning and tag's bad orientation at the moment of reading—will be implemented preferably in the operating system.

b.3) Displacing Mechanisms

In block 302 of FIG. 6 the system is prepared so as to start the identification process of a new batch of animals, where mobile identification device 101 is displaced until the start of travel.

Figure 10:
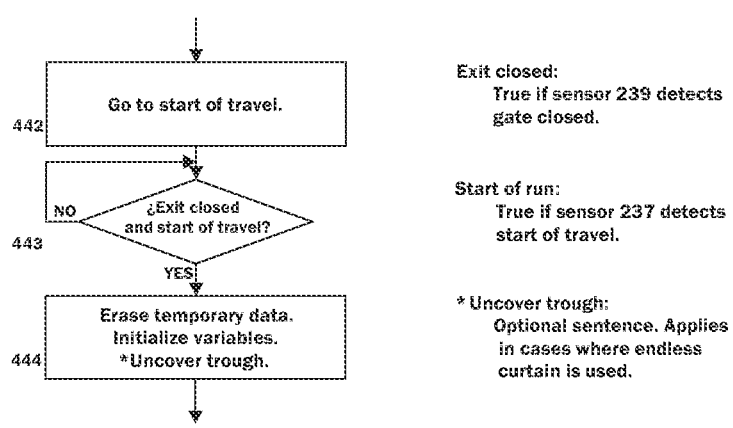
FIG. 10 shows the flow diagram of function 441 "START NEW BATCH", one of the possible implementations of the function corresponding to block 302.

FIG. 10 shows the flow diagram for function 441 "START NEW BATCH", that is one of the possible implementations of the function corresponding to block 302.

The statement "Go to start of travel" of block 442 starts the engine of traction device 124 in the displacement direction towards "Start of travel". In block 443 it is awaited until mobile identification device 101 reaches the "Start of travel sensor 237" and for the closing of the exit gate of milking stall 221, so as to the execute block 444.

In block 444 temporary data is erased from the whole of matrix 323, the program variables are initialized, being them the ones that contain the number of site occupied by mobile identification device 101 and the direction of said device as well as the run counters 322, that are all initialized to zero.

If "start sequential indication" has been started previously in block 310, this is deactivated in block 444. Indicator panel 182 starts then to display the information referring to the site that is being served by mobile device 101.

The statement "Discover trough" is of optional use and must be habilitated in the cases where the endless curtain is used for animal handling.

After the identification process has been started, the displacement of mobile identification device 101 is controlled mainly by block 304 by means of the function "GO TO NEW SITE".

Figure 11:
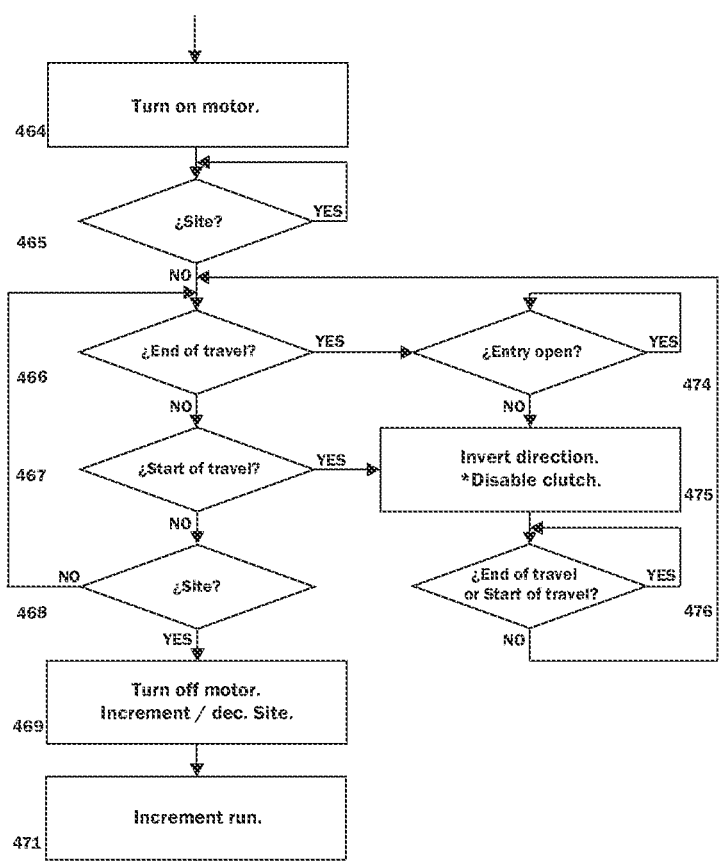
FIG. 11 shows the flow diagram of function 461 "GO TO NEW SITE", one of the possible implementations of the corresponding function of block 304.

FIG. 11 shows the flow diagram for function 461 "GO TO NEW SITE", one of the possible implementations of the corresponding function of block 304 in FIG. 6.

FIG. 11 shows a basic implementation of this function, similar to the one that it would use for the case of "independent sites" described in "Alternative solutions". In the case of the current embodiment, this implementation is only used to more clearly illustrate the displacement mechanisms used.

Function 461 does not incorporate mechanisms for inverting the displacement direction beyond the ones used at the start or end of run. When mobile identification device 101 reaches a start or end of run, the direction of the displacement is inverted by modifying the variable that contains the direction of displacement in block 475.

During one run, the displacement is made from site to site, said displacement being detained every time that the site sensor 105 detects that mobile identification device 101 is in front of a site in an optimal position to serve that site.

When the displacement is started in one site, after having started the engine of traction device 124 in block 464, the condition of block 465 allows to displace the mobile identification device 101 out of the detection reach of site sensor 105.

Except when it is detected an end of travel in block 466 or a start of travel in block 467, the flow will then iterate between blocks 466 and 468 until a new site is detected in block 468.

After detecting a new site, block 469 is executed, where the motor is turned off and the variable containing the site number is incremented or decremented. The increment or decrement of the site number is determined according to the displacement direction of mobile identification device 101.

In block 471 the run counter 322 corresponding to the new site to which the mobile identification device 101 has moved is incremented. From the point of view of the identification process, it is from this moment on that said site is considered served by the new run that has been accounted for.

After detecting an end of travel in block 466, it is waited in block 474 until the operator shuts the entry gate of milking stall 221. In this way it is avoided that the last animal of the batch may withdraw voluntarily from milking stall 221.

Both the detection of said end of travel as the detection of a start of travel in block 467, will generate the inversion of the direction of travel in block 475. In both cases, the condition of block 476 then allows the displacement of mobile identification device 101 out of the reach of end of travel sensor 236 or of the start of travel sensor 237.

The statement "Disable clutch" of block 475 is an optional statement and its execution must be enabled when the proposed system uses the endless curtain for animal handling.

During the displacement direction's inversion, the program variable that turn on the motor will remain unaltered. Nonetheless, for safety reasons, the motor will be stopped through hardware mechanisms that are independent of the sensors here considered and will turn on once its displacement's direction has been inverted.

In the current embodiment it is required to apply the reversing mechanism with the purpose of solving the identification interference between adjacent sites and "animal displacement". Additionally, it is required to count with the possibility of reducing the number of animals that constitute the batch of animals that enters the stall.

Both requirements imply the inversion in the direction of displacement, beyond the one made at the beginning and end of the run. For these reasons, in the current embodiment the function of FIG. 12 that controls displacement must be used.

Figure 12:
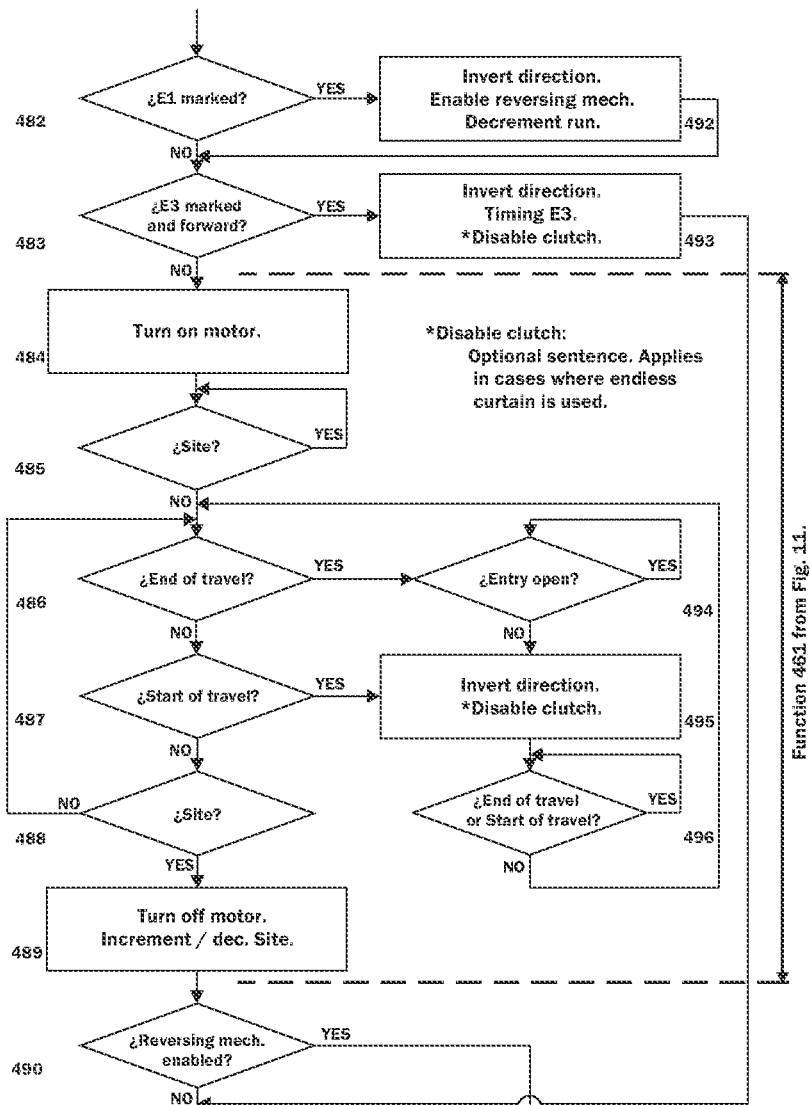
FIG. 12 shows the flow diagram of function 481 "GO TO NEW SITE", a case that includes the reverse mechanism and the mechanisms for reducing the number of animals in a batch.

FIG. 12 shows the flow diagram of function 481 "GO TO NEW SITE", that includes the reversing mechanism and the mechanism for reducing batch's animals number.

The function of FIG. 12 incorporates the mechanisms foreseen in function 461 of FIG. 11. Function 481 adds, with respect to function 461, the blocks that are at the beginning and end of the flow diagram and keeps the functions of blocks having a correlative numeration.

Blocks 482, 490, 492, and 497 are in charge of executing the reverse mechanism. When the mark of flag "E1" is detected in block 482, the displacement direction is inverted in block 492 before turning on the engine. After mobile identification device 101 accedes to the adjacent site served immediately before, and the motor is turned off, the displacement direction is restituted to its original direction since in block 497 is inverted again.

Statement "Enable reversing mechanism" executed in block 492 activates a program variable that controls the reverse mechanism. The activation of said variable is detected in block 490, then being deactivated on executing block 497. In this way it is avoided to increase the run counter 322 belonging to the site acceded after the backward movement, that's to say, the data that shall be newly obtained or generated for said site will substitute the data already loaded at the entrance of matrix 323 of the same accounted run.

The statement "Decrement run" of block 492 decrements run counter 322 belonging to the site where the backward movement is started, in such a way that the recently generated entrance to matrix 323 is ignored. In this way, once the original displacement direction has been restituted the site where the backwards movement has started shall be served again, but the data that will be newly obtained or generated for that site will substitute the data already loaded at the entrance of matrix 323 of the same accounted run.

The reverse mechanism may be repeated for more than one consecutive site when there is a multiple animal displacement in milking stall 221. If upon serving the site where the backwards movement ends flag "E1" is marked, said flag will be detected in block 482 during the following execution of function 481, thus initiating a new backwards movement instead of retaking the displacement in the original direction.

On the other hand, the mechanism that allows to reduce the number of animals that constitute the batch that enters the stall is implemented by means of blocks 483 and 493. When in block 483 flag "E3" is detected and mobile identification device 101 is moving in the forward direction (in the direction towards the last site), then said mechanism is executed.

Given that the site served before the execution of function 481 must be taken as end of travel, not only must the displacement direction be inverted in block 493, but besides in said site must be generate the "identification opportunity" corresponding to the new run that is initiated in the opposite direction.

Before any displacement to abandon said site occurs, a new identification opportunity must be generated after certain time has elapsed with respect to the one previously performed. The statement "Timing E3" of block 493 has the purpose of stopping the execution flow in order to generate the corresponding delay.

After executing block 493 the flow is derived to block 491 thus avoiding to turn on the motor in block 484. In block 491 the run counter 322 is incremented accounting for the new run that immediately afterwards will serve the same site being considered.

When stalls have a high number of sites, or the application surrounding so requires, multiple synchronized mobile identification devices may be used, each one serving a subgroup of sites in the same stall.

In this case, a first mobile identification device 101 starts its first run on the first stall's site and when it gets to the last site of the first subgroup, the second mobile identification device takes the control (synchronizing the first run), same initiating its first run on the second subgroup's first site, and so on. When a mobile identification device 101 passes the control to the next one, it is liberated and may start the following run in the opposite direction.

When passing control from the first to a second mobile identification device 101 the first one is thus liberated, it supposes that the condition in block 487 of the second device must be controlled by the first one and that the condition of the first device in block 486 must be controlled by the second one, a configuration that must be repeated up to the last mobile identification device 101, that will serve the last site subgroup.

This mechanism may optionally operate in a similar way in the reverse direction, that's to say from the last to the first mobile identification device 101. When the last mobile identification device 101 gets to the last subgroup's first site it waits until the penultimate mobile identification device completes the corresponding run and occupies a contiguous site in order to pass the control to it, in which moment it is liberated to start the next run in the opposite direction. In this way said mechanism may optionally operate for any run beyond the first one.

2) Animal Feeding, Proposed Solution a) Feeding System (Description of Hardware)

The feeding system proposed in this preferred embodiment—that incorporates the main parts of the identification system already described—has been designed to be operated by another system, or "operating system", and it fulfills mainly the functions of identification and feeding of animals, as well as reporting information to the "operating system".

FIG. 13 describes the main parts of mobile feeding device 501 and is assemblage with respect to some parts of milking stall 621 in FIG. 17.

The mobile feeding device 501 additionally incorporates, with respect to the mobile identification device 101, the functions of food storage, food dosage, and sweeping the food not consumed by the animals.

Food deposit 508 is coupled on the upper part of cabinet 506. Said deposit has internal divisions generating four different compartments, each one storing a different "food type".

The food dispensed is discharged in trough 630 by means of the discharge tube 523 only in the specific points where the mobile feeding device 501 has stopped in order to serve a site. The mechanisms for stopping mobile feeding device 501 in each site are the abovementioned ones for the identification system.

The unconsumed food sweeping is done by means of the displacement of sweeping device 541 inside trough 630. The position of sweeping device 541 shown in FIG. 13 is the one adopted during the run when the sweeping is done (sweeping run).

Sweeping device 541 may also be coupled to cabinet 506 on the opposite side to the one shown in FIG. 13, when the stall's configuration is the mirror image of the one shown in milking stall 621.

In the front cover 502 there are two alarm lights 507, whose purpose is to alert the animals so that they withdraw their heads form the trough during the sweeping run.

Electronic system 515, besides the functions already described for the identification system, incorporates the hardware for the food dispensing system and for the food sweeping control in any of its variants. It also incorporates the hardware, of optional use, for animal handling control, for the food recovery device and for the recycling device, being these described below.

FIG. 14 describes the dosing device 521 and its assemblage on mobile feeding device 501.

The dosing device 521 operates within cabinet 506 and is coupled to the lower part of food deposit 508. Said device extracts the different types of food from each compartment of food deposit 508 and mixes them before discharge the resulting mix by means of discharge tube 523.

The bottom of each compartment of food deposit 508 is constituted by a cone 526 that fulfills the function of adequately sliding the food towards its corresponding doser 522, which by means of an Archimedes screw extracts the food and unloads it inside collector 524.

The food is mixed by means of the simultaneous contribution of the dosers 522 that participate in the mix and through the zig zag food route as it descends through collector 524. The speed of each screw's turn is controlled by the electronic system 515 and will be what determines the contribution of each type of food to the mix.

The cabinet's front cover 502 forms a single piece with collector 524 as shown in FIG. 14. The whole piece's material must fulfill the task of separating identification device 504 from the rest of the metallic parts without notoriously affecting the behavior of the electromagnetic field emitted or received by such device.

FIG. 15 describes sweeping device 541 and outlines the way the unconsumed food volume is measured.

Cabinet 506 contains the mechanism that controls the turning of shaft 543 that allows to pull down or pull up the sweeping device 541 in the vertical sense in the moment that it is inserted or withdrawn from trough 630. FIG. 15 shows the lowered position, that's to say the one adopted during the sweeping.

The food remaining in the troughs dragged by paddle 542 as it is displaced by mobile feeding device 501 during the sweeping run. At the same time the food volume remaining in each site is measured by means of metering device 547.

Sweeping device 541 incorporates sluice 544 having the purpose of draining part of the food dragged during the sweeping action. The aperture of sluice 544 will be regulated in a manual way by means of setting screws 546, according to the feeding practices used.

The measuring scheme in FIG. 15 shows the way the food level dragged during the sweeping is measured. Metering device 547 is implemented in this case by two ultrasonic level sensors whose ultrasonic beams operate as shown in the measuring scheme.

The two ultrasonic beams are emitted approximately at the same time (although not exactly) in such a way that two dragged food level values are obtained, one for each ultrasonic beam. The two values of the food level allow to know both the level of the dragged food's surface and such surface's slope. This is considered as one "measuring shot" by metering device 547.

Even though during the measuring shots sweeping device 541 will generally be moving, the distance that same may advance during the time spent by the ranging shot is negligible. This property allows to make multiple consecutive shots, concentrated in a short time, in order to finally obtain average values. This is considered as a single "level measurement" of the dragged food, and it yields an average value of the food level for each ultrasonic level sensor.

During the sweeping trajectory for a single site, multiple "level measurement" is done distributed at regular distances, based on which the food volume dragged by paddle 542 and the drained-through flow under sluice 544 are calculated.

When the level of the dragged food is above the lower edge of sluice 544, the drained-through dragged food flow turns to be constant. This constant value is the maximum drained-through flow and is adjusted by setting the height of sluice 544 by means of setting screws 546.

FIG. 15 also shows the lateral views of sweeping device 541, where the relative positions of metering device 547, multiple rods 545 and trough 630 may be seen.

Rods 545 that are electrified during the sweeping run, have the purpose of minimizing collisions of sweeping device 541 with animals' heads while they remain feeding, and avoids the interference of said animals within the measuring area of metering device 547.

Trough 630 must be made of non-conductive material and must not have screws or metallic fastenings near sweeping device's 541 operation area. Besides, the trough's 630 internal surface must facilitates the displacement of sweeping device 541 and of the swept food itself.

Figure 16:
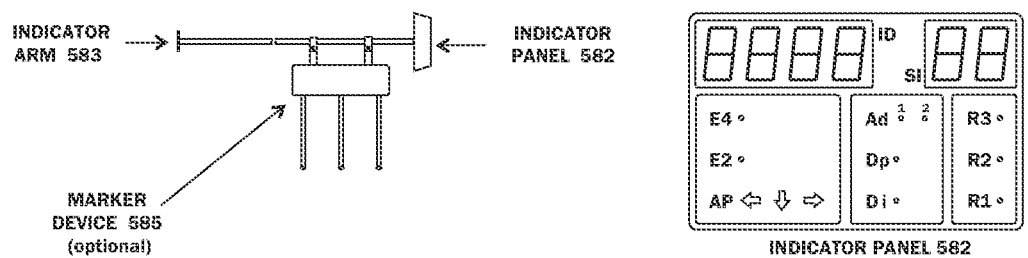
FIG. 16 describes indicator device 581 that reports to the operator the information pertaining to the site in the moment it is being served by mobile feeding device 501.

FIG. 16 describes indicator device 581 that reports to the operator the information relative to the site in the moment that it is served by mobile feeding device 501.

Indicator device 581 incorporates the functions already described for the identification system. Indicator panel 582 incorporates the luminous indicators of the second and third columns, that will report the feeding process' state of advance and the corresponding alarms.

Luminous indicators "Ad", "Dp" and "Di" report information referring to food dosing, while luminous indicators "R3", "R2" and "R1" do it for the unconsumed food swept.

The information obtained or generated by the feeding system may on its turn be reported to the operator in particular and to any user in general by means of any local or remote interface. These interfaces will be part of the "operating system" to which the proposed invention will report said information.

The indicators included in indicator panel 582 are only examples of the indications that may be included in said panel. In this case the indicators included are those it is believed better apply to the application environments before defined for preferred embodiment.

FIG. 17 shows the upper view of milking stall 621 and the layout of the feeding system's different parts with respect to said stall.

Trough 630 is a continuous one, of the canal ("gutter") type, without compartments between sites. Sweeping device 541 may longitudinally travel the whole trough's extension without said trough's internal surface offering any resistance to the sweeping device.

The length of shaft 543 must be such that, once mobile device 501 stops on a site, sweeping device 541 will have completed, for the before-served site, both the food sweeping and the corresponding food level measurements.

At the end of the sweeping run, mobile feeding device 501 must be more beyond the last site in order to complete the corresponding sweeping of said last site. For this reason, upper rail 125 and lower rail 126 must be extended beyond the last site.

The food dragged until the end of the sweeping run will fall through hole 631 in a food receiver that is below trough 630. In normal functioning conditions, the amount of food dragged up to the run's end will be small or nil.

In the same way as the identification system's abovementioned embodiment, the proposed feeding system may contain one or multiple mobile feeding devices in such a way that both systems share information and also with the rest of the system.

This multiplicity refers to multiple milking stalls 621 having their own mobile feeding device 501 and/or multiple mobile feeding devices functioning in a same stall, synchronized in such a way that each one serves a subgroup of sites in the stall.

b) Feeding Method (Description of its Functioning)

The feeding method's preferred embodiment is described in its main aspects by means of a process dedicated to animal feeding that includes the animal identification process. The process software's design and implementation are considered out of the current invention's scope and will be protected by its copyright.

FIG. 18 shows feeding process 701, same describing the animal feeding process and including the functions of the identification process 301 of FIG. 6.

Feeding process 701 incorporates the blocks of identification process 301 numbered in a correlative way. Blocks 702, 703, 704, 706, 708, 709, 711 correspond exactly with said blocks in correlative numbering.

The food is administered to each animal in three doses called "initial dose", "main dose", and "final dose", being them conveniently distributed during the animals' stay in milking stall 621.

The initial dose is independent of the animal's' identity and must be calculated in such a way that it may be ingested up to three times by any animal during the same stay in the stall, without it resulting in a risk for the animal's health and/or productivity.

The statement "Stimulate entry" in block 705 doses an initial dose for the first site after starting a batch's identification process. In this way the first animal's arrival to the first site in the stall is visually and olfactorily stimulated during its entrance to the stall.

According to the execution of the identification process, the flow shall iterate manly between blocks 703 and 709. Food dispensing will be done by means of the execution of block 707 during some of the runs already anticipated for the identification process.

Except for the case described in block 705, the dosage will be done in the moment immediately after animal identification, including the case of the initial dose where it is not required to know the animal's identity.

This is the way the already mentioned "training mechanism" (in "Detailed description of the invention") is implemented, same consisting in feeding the animal in the moment it adopts a posture or behavior that allows identification.

Once animal identifying task is finished block 710 is executed, in same the unconsumed food being swept along the trough by means of the function "SWEEPING REMAINS". This function incorporates the statements of block 300, a correlative block in the already mentioned identification process.

b.1) Food Dosage

FIG. 19 shows the flow diagram for function 721 "FEEDING ANIMAL", that is one of the possible implementations of the corresponding function in block 707 of FIG. 18.

During the first accounted run, and after having identified the animal in each site, block 722 determines the dosage of the initial dose, to be executed in block 726. The exception to this rule occurs when an animal's identification is not possible and displacement the mobile feeding device 501 must be forced.

In the cases the displacement of the mobile identification device 501 is forced, an additional "identification opportunity" is generated in block 726 after the initial dose has been dispensed. The function "IDENTIFYING ANIMAL" executed in block 726 is the same as the function executed in block 706 of FIG. 18.

This is the way the inversion of the training mechanism is used, consisting in feeding the animal immediately before attempting to identify it, as has been described in "Detailed description of the invention".

The function "IDENTIFYING ANIMAL" of block 726 is thus executed only if there is a mark in flag "E2" for the corresponding site, this flag indicating the impossibility of identifying an animal in said site.

Figure 20:
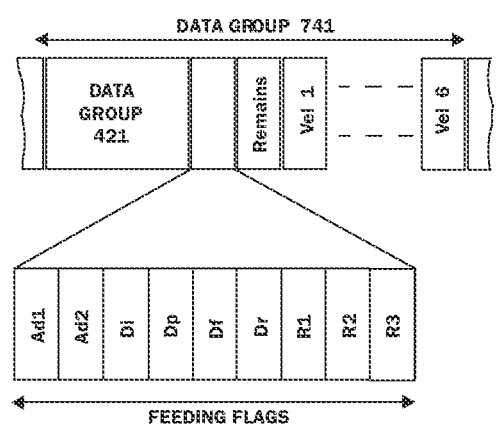
FIG. 20 shows the fields of data group 741, one other of the possible implementations of the data group or entries to matrix 323 in FIG. 7.

FIG. 20 shows the fields of data group 741, another possible implementation of the data groups or entries to matrix 323 of FIG. 7.

For the feeding process case, to each entrance to matrix 323 of FIG. 7 corresponds a data group 741. Data group 741 includes data group 421 corresponding to the identification process.

As for the above mentioned identification system, data generated or obtained during an animal batch's feeding process will be stored in matrix 323 and must be transferred to the "operating system" necessarily before the beginning of a new batch's feeding process, in which moment the data of matrix 323 will be deleted.

Flag "Di" indicating the dispensing of the initial dose is marked by the statement "Stimulate entry" executed in block 705 in the case of the dose administered to the first site, and is marked in all the other cases upon executing block 726.

The main dose is administered in block 727 after the condition of block 723 has been fulfilled, and the final dose is administered in block 725 after fulfilling the condition of block 724. Flag "Dp" is also marked in data group 741, indicating the administration of the main dose and the flag "Df" indicating the administration of the final dose respectively.

Both the condition of block 723 and the one of block 724 include as a condition the existence of a reliable identification (of animal) and they are valid only while the runs assigned for the administration of the corresponding doses are being executed, as specified in FIG. 19. It is considered that there is a reliable identification in a site if there is no mark flag "E4" for said site during the accounted run when it corresponds to administer the main dose or the final dose.

Given that the feeding process depends on the identification process, the number of the run that determines the administration of the respective dosage for each site will be the number of accounted run (by run counters 322) in said each site.

The runs assigned for administering the main dose will be chosen in such a way that said dose starts to be administered in the different sites preferably during the same run where reliable identifications start to be obtained, and depending of the application's environment, said dosage may be extended for more than one run.

The runs assigned to administer the final dose will be, preferably, the penultimate and the last ones, being said last run the last one allowed by the condition of block 709 of FIG. 18.

The main dose and the final dose are formed by the combination of different types of food that are dosed simultaneously according to the speed of dosers 522 that are defined by the values of fields "Vel 1" to "Vel 6" of data group 741, while for the initial dose that is done by fields "Vel 3" to "Vel 6".

The speed of the first doser will be determined by field "Vel 1" when the compartment of food deposit 508 corresponding to said doser contains a high-risk additive, while it is determined by field "Vel3" for the other cases. Fields "Vel 2" and "Vel 4" for determining the speed of the second doser will be used in the same way.

Flags "Ad1" and "Ad2" of data group 741, that are marked in block 729, correspond respectively to fields "Vel 1" and "Vel 2", and their marks indicate that the corresponding additive has been effectively mixed with the other food types that make up the main dose dispensed in block 727.

The final dose dosage has been executed in block 725 only if high-risk additives have not been included in the previously administered main dose for the corresponding site. The condition of block 724 is fulfilled only if flags Ad1 or Ad2 have not been marked for the corresponding site. The omission of the final dose has as its main purpose to extend the time that the animal spends in the ingestion of food with high-risk additives.

When during the last run assigned to dispense the main dose the mark of flag "E4" impedes dosage, the condition of block 722 allows to dispense a second initial dose in substitution of the main dose. In the same way a third initial dose in substitution of the final dose will be dispensed.

After dispensing said second and third initial doses, in block 726 an identification opportunity is generated again if an identification has not been obtained during the last— recently executed—identification opportunity, that's to say if there is a mark in flag "E2".

In this way, the inversion of the "training mechanism" may be executed up to three times for the same animal during its stay in the stall. Said execution implies the dispensing, up to three times, of the initial dose, and for this reason said dose must be calculated so that it can be ingested up to three times by any of the animals as has been explained above.

The volume and composition of the different food doses will be calculated by the "operating system". Said system will calculate for each case the speed values "Vel 1" to "Vel 6" and will load them in the corresponding entrance of matrix 323.

In the case of the main dose and the final dose, these vales will be calculated as a function of the individual feeding parameters indicated in the history data for each animal—history that belongs to the "operating system"—and will be loaded once the reliable identification has been obtained for the corresponding site.

In the case of the initial dose, these values will be calculated according to the already described requirements, being them applied equally to all sites with the exception of the cases where the volume finally dispensed in the site is adjusted as a function of the food that has remained in the trough corresponding to that site.

Whenever it is possible, the volume of the first initial dose dispensed during the first accounted for run will be adjusted for each site as a function of the value of the field "Remains" calculated for said site during feeding process of previously served batch. This is possible if said data of the "Remains" field belonging to a batch of animals previously served are available.

The amount of food that remains in the trough for any site, as will be shown below, is temporarily stored in the field "Remains" of data group 741, corresponding to the batch of animals previously served.

b.2) Food Partial Sweeping

The current embodiment incorporates the partial sweeping of the food remaining in the trough after a batch of animals has been fed. The volume of food remaining in the trough after the sweeping shall not overcome, in any case, the "maximum remaining food volume" through sluice 544 during the sweeping done in said site.

It is understood as maximum remaining food volume the maximum food volume that may remain in a site after having performed the sweeping in said site. This depends on the maximum drained-through food's flow rate through sluice 544 whose value is adjusted by setting the height of sluice 544 by means of the setting screws 546.

Said maximum remaining food volume must fulfill the above-mentioned requirements at the moment of calculating the initial dose, since it will virtually form part of the same initial dose dispensed to the following animal that occupies the corresponding site.

Figure 21:
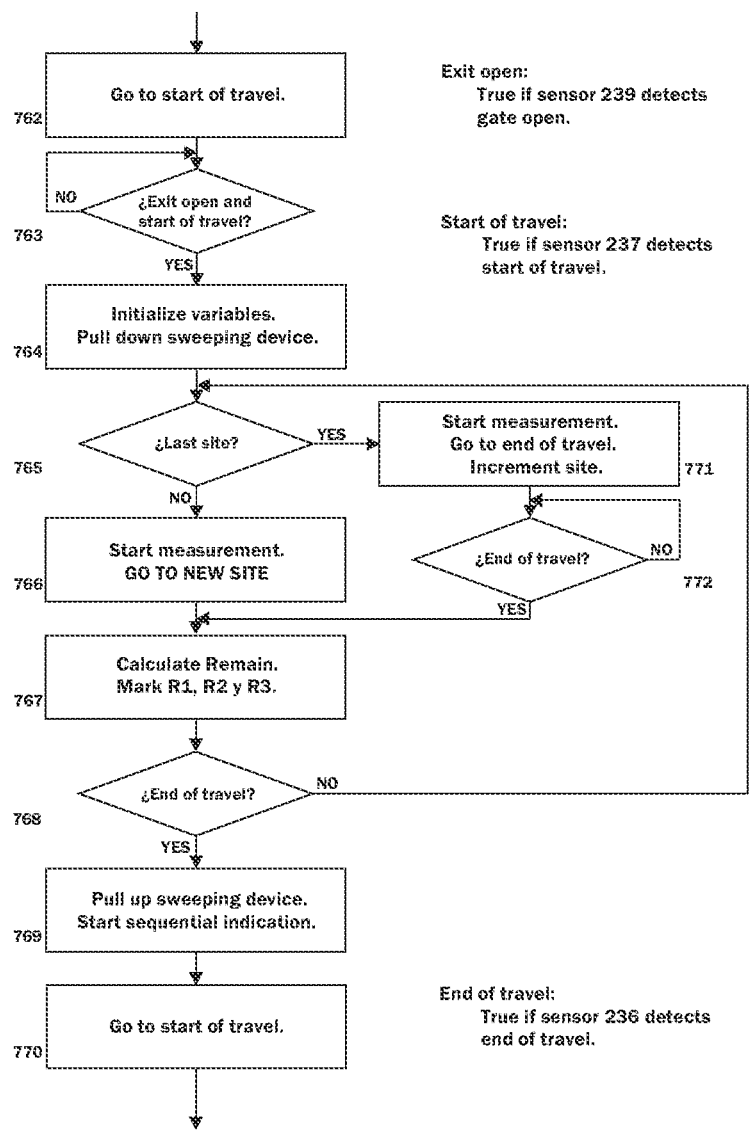
FIG. 21 shows the flow diagram of function 761 "SWEEPING REMAINS", one of the possible implementations of the function corresponding to block 710.

FIG. 21 shows the flow diagram of function 761 "SWEEPING REMAINS", that is one of the possible implementations of the function corresponding to block 710.

In block 762 the displacement of mobile feeding device 501 is started towards the start of travel, while in block 763 it is waited until said device reaches the start of travel and besides that the exit gate of milking stall 621 opens.

In block 764 the variables containing the site number and displacement direction are initialized. Besides, run counters 322 will be loaded with the value for the last run allowed by block 709 of FIG. 8, so the following accounted run in each site will be the "sweeping run".

Matrix 323 will count with an additional row dedicated to the sweeping run, row acceded as the sweeping run is accounted for by the corresponding run counters 322 on the different sites.

The statement "Pull down sweeping device", executed in block 764, lowers the sweeping device 541 inside the trough 630 in order to start the sweeping, and turns on the alarm lights 507 in order to alert the animals regarding an eventual electrical shock caused by rods 545 of the sweeping device 541.

During the sweeping run the flow iterates between blocks 765 and 768. The mobile feeding device 501 is displaced from site to site by mean of the same function 481 "GO TO NEW SITE" that was used before, which is executed for this case in block 766.

Given that during the sweeping action the sweeping device 541 advances behind the mobile feeding device 501, the sweeping action in a particular site will be completed once the mobile feeding device 501 stops in the next site.

When mobile feeding device 501 is stopped in a site, block 767 is executed so that the value of field "Remains" is calculated and the marks for flags "R1", "R2" and "R3" are determined, same corresponding to the site before the site served.

Since during the sweeping run the values of flags "R1" to "R3" are not available for the site served, alarms "R1" to "R3" of indicator panel 582 can't be reported during said run. Reporting these alarms will be done once the sequential indication in block 769 has been initiated.

The displacement of mobile feeding device 501 from the last site—detected in block 765—until the end of travel—detected in block 772—is performed by the statement "Go to end of travel" in block 771.

The mechanisms just mentioned allows for the detention of mobile feeding device 501 at the end of travel until block 770 is executed. If it were different, the function "GO TO NEW SITE! executed in block 766 would automatically start the displacement of mobile feeding device 501 in the opposite direction upon detecting the end of travel.

When mobile feeding device 501 is at the end of travel, block 767 is executed once more, allowing to calculate the values of the last sweeping action done in the last site.

Once the end of travel has been detected in block 768, block 769 is then executed, where sweeping device 541 is pulled up from the trough, the alarm lights 507 are turned off, and the sequential indication in indicator panel 582 is started.

During the sweeping action trajectory for a single site, multiple "level measurement" are done distributed at regular distances, based on which the food volume dragged by paddle 542 and the drained-through flow under sluice 544 are calculated. Each food level measurement results from the mechanisms already detailed in "Feeding System".

Consider the following volume calculations for one specific site:

The volume of the remaining unconsumed food (Vr) existing in said site may be expressed according to equation 51, as the difference between the volume of food dragged at the beginning (Vi) and at the end of the sweeping action for said site (Vf), plus the contribution of the food volume drained-through by sluice 544 (VD) in its sweeping action trajectory.

$$Vr \cong Vf - Vi + VD \qquad \text{Ec.51:}$$

The volume of drained-through food (VD) in a site may be expressed according to equation 52, as the summation of the drained-through volume of each distance interval corresponding to a measurement of the food level.

$$VD \cong \Sigma_{n=1}^{n=m}[Vd_n] \qquad \text{Ec.52:}$$

Given that the calculus of volume depend in all cases on the measured level of food ($N_n$), with n from 0 to m (being m the number of measuring intervals within each site), the final result for said volume may be expressed as a function of the measured level according to equation 53

$$Vr \cong Vf(N_m) - Vi(N_0) + \Sigma_{n=1}^{n=m}[Vd_n(N_n)] \qquad \text{Ec.53:}$$

The volume of food calculated shows a non-lineal dependence on the level of dragged food and on the slope of the dragged food's surface. Such dependence varies according to the physical characteristics of the food used and the physical characteristics of each application (For example: trough with a curved bottom, straight bottom, vertical walls, etc.).

For these reasons there must be a tabulation procedure in order to determine food's volume value depending on measured level and measured slope, same will be applied during the startup of each application or for a significant change in the physical characteristics of the dispensed food.

In the cases where the accumulated food level by paddle 542 is above the maximum foreseen level, being same detected by metering device 547, mobile feeding device 501 will automatically stop in order to allow the manual withdrawal of part of the accumulated food.

Every time that this occurs the operator must manually withdraw a preestablished food volume (Vret), being this value added to the calculus of volume for the rest of the food according to equation 54:

$$Vr \cong Vf(N_m) - Vi(N_0) + \Sigma_{n=1}^{n=m-1}[(F\max)(V_{ret})] + \Sigma_{n=1}^{n=m}[Vd_n(N_n)] \quad \text{Ec.54:}$$

"Fmax" must be considered as a logical function of unit value only in the measurements where a maximum level has been detected and of nil value for all the other cases.

The first and the last measurement of the food level made in a site must be excluded from the maximum level detection mechanism already described. In the border between consecutive sites the last level measurement comes to be the first of the following site.

The statement "Start measurement" executed in blocks 766 and 771 will start the series of level measurements made by metering device 547, a series that will end upon execution of block 767.

The mechanism by which measurements are made operates in a parallel way to the execution of function 761. Said mechanism will be in charge of generating the stopping of mobile feeding device 501 when the food level is above the foreseen maximum, and of generating the start after manually withdrawing part of the accumulated food.

When it is not desired to implement the mentioned stop mechanism, paddle 542 may be substituted for another one of less height, in order to allow the accumulated food to overflow above said device. The overflowing food volume may also be calculated based on the already mentioned level measurements and their corresponding tabulation.

In this case, after the sweeping run additional displacements of the sweeping device must be made in order to redistribute the food remaining in the trough, in such a way that the volume of food remaining in a site does not overcome the maximum volume of drained-through food that may remain in a site.

b.3) Feeding Alarms

The luminous indicators "Ad", "Dp" and "Di" of indicator panel 582 indicate the feeding process' state of advance and at the same time report some alarms with respect to said process.

Luminous indicators "Ad" (1 and 2), "Dp", and "Di" will directly report the state of same name flags by turning on a green light. In such a case only the feeding process' state of advance is indicated.

When the initial dose is dispensed for a second or third time the indicator "Di" will blink in red color, indicating a state of alarm to the operator. Indicator "Dp" will blink in the same way if after omitting the corresponding dose the animal's history indicates that said dose should have been dispensed, and indicators "Ad" will do the same if jointly with said dose the dosage of some additive has been omitted.

Luminous indicators "R1", "R2" and "R3" depend on the same name flags, whose marks are determined during the sweeping process as a function of the value of field "Remains".

For determining said marks depending on the value of field "Remains" three thresholds are established. As said value overcomes each one of the three thresholds, flags "R1" to "R3" will be marked in the corresponding data subgroup 741.

The thresholds' value of must be calculated according to particular feeding practices for each application's environment and taking as a reference the case where the three planned doses are administered and there is no high-risk additive dispensed.

A first threshold, corresponding to the mark of flag "R1", is established so that the volumes below said threshold may be ignored.

The errors introduced by the volume measurement are thus ignored, for reasons of the mechanical parts adjustment and by the food the animals may not ingest due to physical limitations in the surrounding and/or of the animals.

When it is desired to increase the food volume administered to an animal, the dosed volume is usually gradually increased according to some daily increase rate (proportion), in order to allow the animal's digestive system to adapt to the change.

If additionally, it is desired to exploit to the maximum the animal's digestive capacity, said volume must be gradually increased until the maximum is reached, same being detected when the first threshold is overcome.

A second threshold, corresponding to the mark "R2" is established in such a way that the volume difference between the first and the second thresholds is, preferably, somewhat bigger than the volume difference chosen for the beforementioned daily increase rate.

When it is desired to exploit the animal's maximum ingestion capacity, the food volume must be adjusted in an automatic way as a function of the marks of flags "R1" and "R2", obtained during the animal's latest stays in the stall.

A third threshold, corresponding to mark "R3", is established in such a way that there is a considerable food volume above the second threshold, so that the mark of flag "R3" is an indicator of an anomalous situation in the animal's food ingestion.

According to the meaning that has been assigned to the abovementioned thresholds, luminous indicators "R1" to "R3" of indicator panel 582 will turn on without blinking and in a green color, thus indicating the results of the sweeping when the animal has been assigned an adjustment plan to its maximum ingestion capacity.

For the cases where high-risk additives are used, the same threshold values as already defined are used, but with different meanings. When there is a mark in flags "Ad1" and/or "Ad2" the marks of flags "R1" to "R3" are used to evaluate the degree of rejection that a particular animal has shown to the ingestion of a high-risk additive.

In said case the luminous indicators "R1" to "R3" of indicator panel 582 indicate the degree of rejection by blinking in red color. Its meaning then results in an alarm indication.

Excepting the two cases just defined, luminous indicators "R1" to "R3" of panel 580 will then turn on blinking in yellow color, indicating the existence of unconsumed food according to the already defined threshold values.

This indication in yellow color and blinking represents an alert to the existence of unconsumed food, whose cause must be determined by the operator.

An early detection sickness alarm may be generated, after the mark of flag "R3" in several stays of the animal in the stall, if the animal has not fed with high-risk additives in said stays. Those high-risk additives—as already defined in "Detailed description of the invention" shall be used to treat punctual cases.

The adjustments in the food volume dispensed to the animals will be done by the "operating system", taking as a reference the value of flags "R1", "R2", and "R3" and the meaning here defined for the corresponding thresholds.

3) Animal Handling, Proposed Solution a) Handling System (Description of Hardware)

The proposed handling system in the preferred embodiment results mainly from incorporating an endless curtain to the previously defined feeding system, said curtain impeding or habilitating animal access to the food in the trough.

The blocking portion of the endless curtain that impedes animal access to food, when same is displayed inside the trough, is implemented in said embodiment by means of a steel mesh that is electrified during the operation. The electrification of the mesh will be done according to the norms inherent to electrified fences for animals.

In this way the contact of animals with said mesh is drastically reduced, and at the same time the pressure that animals may accidentally exert on said mesh is endured by the trough's bottom. These aspects are the ones that allow to notoriously reduce the cost of the handling system.

Given that the current embodiment is designed in order to be applied during animal milking, it is also of vital importance to avoid the unnecessary stress that the animals may feel during their stay in the stall. The proposed solution fulfills in this case the requisites of not forcing animals to significantly change their posture with the purpose of avoiding the electrical shock, and also not forcing them to compete with other animals in order the obtain the room that will allow them to avoid the electric shock and/or comfortably acceding the food.

FIG. 22 describes the construction of the endless curtain 801.

The endless curtain 801 is built with multiple steel wire ropes that are fixed to belt 803 in multiple places of said belt, so as to conform the steel mesh 802 that includes approximately half of the belt's length.

Steel mesh 802 is attached to belt 803 by means of rivets and washers. Around each rivet that holds a wire rope a closed fold of said wire rope is made, being said fold fastened by washer 809 with folded edges.

The construction of steel mesh 802 is done starting with four wire ropes 813, where each one of them forms multiple contiguous arches set lengthwise will respect to belt 803, and a lengthwise wire rope 812 set in the same sense as belt 803 that passes in between said arches.

Beginning at start 810, the first wire rope 813 is extended forming a first arch that goes from the first rivet to the fifth rivet. Above the first arch the second wire rope 813 is extended, forming a second arch that goes from the second rivet to the sixth rivet, and so on.

After the first four arches have been made the wire rope that formed the first arch goes on after the fifth rivet after its fold, and passes over the previous arches (for ex: arcs of wire ropes 2, 3 and 4) forming the fifth arch. This procedure is repeated for each successive arch by going above the preceding ones.

After fastening all the arches to belt 803, the longitudinal wire rope 812 is extended from the start 810 to the end 811, crossing alternately above and below each arch it intercepts according to crossings 806, 807, 808 of FIG. 2.

The assembly diagram of FIG. 22 shows the lay out of curtain 801 with respect to trough 630. The diagram of FIG. 22 shows the belt 803, which by means of union 804, is closed on itself forming endless curtain 801.

Belt 803 is tensed between pulleys 830 located at each end of trough 630. Steel mesh 802 and belt 803 are not held only by pulleys 830, but the part that operates above the trough 630 is held also by said trough while the one that operates underneath is also held by means of guides set for such purpose, aspects that will be shown later on.

Figure 24:
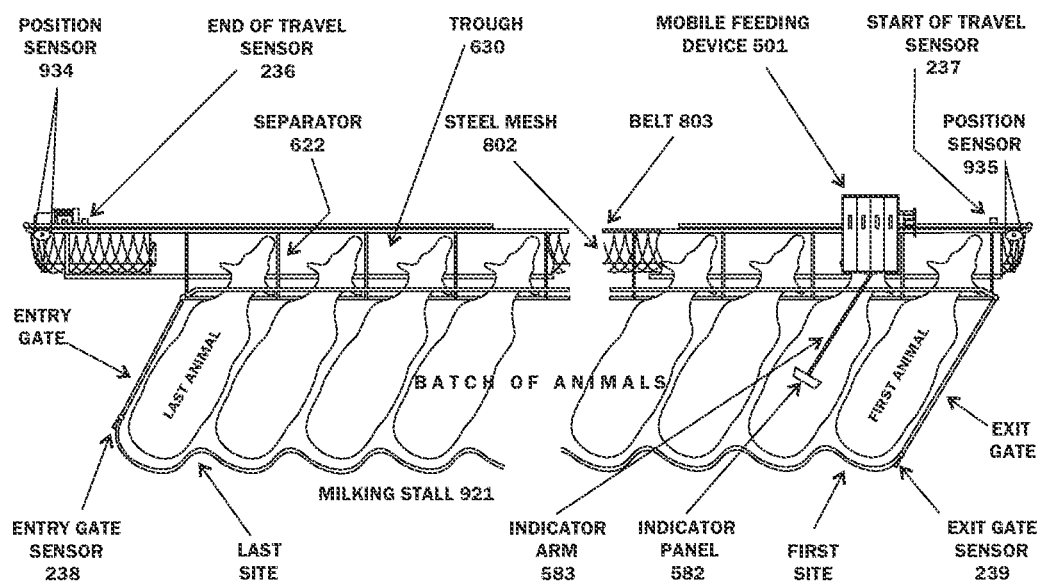
FIG. 24 shows an upper view of milking stall 921 and the lay-out of different parts of the animal handling system.

Steel mesh 802 is shown in the diagram by means of the dotted line below trough 630. Said mesh's length, that's to say the distance between start 810 and end 811, must be a little longer than the distance between the position sensors 934 and 935 when said distance measured below the trough 630 is considered, and around pulleys 830. This length obviously depends on the number of sites in stall 921 (FIG. 24).

FIG. 23 shows curtain transmission device 821 and its assembly with respect to transmission device 121 of FIG. 3, used for moving mobile identification device 101 or mobile feeding device 501.

In FIG. 23 the curtain transmission device 821 of endless curtain 801 is shown in relation to transmission device 121 of FIG. 3, said device being used both for displacing mobile identification device 101 and/or mobile feeding device 501, being the latter case here considered.

Curtain transmission device 821 is coupled to the same shaft as transmission device 121 and the displacement of the endless curtain is done by the motor with reduction gear of traction device 124 that displaces mobile feeding device 501.

As is shown in the parts diagram of curtain traction device 824, said device is coupled to pulley 130 by means of clutch 835, said clutch transmitting, when coupled, the turning of pulley 130 to pulley 830. Clutch 835 is mounted on the same shaft as pulley 130, and obviously also the insulating bushing and the pulley.

When clutch is engaged (enabled), the part of curtain 801 that operates above trough 630 is displaced in the same direction as mobile feeding device 501. The exterior diameter of pulley 830 must be the same as the external diameter of pulley 130, in such a way that the displacement speed of curtain 801 is the same as the one of mobile feeding device 501.

Given that steel mesh 802 remains electrified during the operation, all parts having contact with same must have some type of insulation.

In the case of trough 630—the same as previously described for the feeding system—this requirement had already been foreseen since in its internal part sweeping device 541 operates, same having rods 545 that are electrified during operation.

Pulley 830 of curtain traction device 824 is mounted on an insulating bushing which on its turn is mounted on clutch 835 as is shown in said device's parts diagram in FIG. 23. Pulley 830 that operates on the trough's 630 other extreme is also mounted on an insulating bushing.

It is required that the guides supporting steel mesh 802 and belt 803 be of insulating material. These guides are shown in the different views of FIG. 23.

Upper guide 827, forming part of trough 630, is slightly below the level of belt 803—in the portion that operates above trough 630—in the near vicinity of pulleys 830. In the portion distant from said pulleys, and given the curvature generated by belt's 803 weight, said belt 803 will be held by upper guide 827.

In "Transverse cut A", showing a distant point to pulleys 830, steel mesh 802 may be seen operating exclusively below trough 630, while above it belt 803 is shown held by upper guide 827. This is the situation where steel mesh 802 does not impede animal access to food in the trough.

In "Transverse cut B", showing a distant point to pulleys 830, steel mesh 802 may be seen operating above trough 630. In this case steel mesh 802 and belt 803 are supported by upper guide 827, and at the same time the left side of steel mesh 802 is leaning on the internal face of trough 630. This is the situation where steel mesh 802 does indeed impede animal access to the food in the trough.

Below trough 630 steel mesh 802 and belt 803 are held by multiple lower guides 828 arranged along the trajectory between the trough's 630 extremes, fastened to the multiple supports that hold the trough 630 and other parts, as is shown in "Transverse cut A" and "Transverse cut B".

FIG. 24 shows an upper view of milking stall 921 and the layout of the handling system's different parts.

The position of endless curtain 801 shown in FIG. 24 is the same as the position shown in the Assembly Scheme of FIG. 22, or in other words, the start 810 is slightly to the left of position sensor 935 and the end 811 is slightly to the right of position sensor 934. This is at the same time the position adopted by endless curtain 801 after the execution of the first run, that's to say, during the stay of a batch of animals in the stall.

Before starting a sweeping run of the unconsumed food, sweeping device 541 will be lowered—in order to be placed inside trough 630—in a place near start 810 on the left side. From that moment on, start 810 of steel mesh 802 will advance just behind sweeping device 541 while the sweeping run is being done.

Position sensors 934 y 935 are fixed to stall 921 in a place close to the corresponding pulley 830, and just below the area where the wire ropes 813 move, as is shown in the Assembly Scheme of FIG. 22. In this way each sensor allows the detection of passing wire ropes 813 that form the arches of steel mesh 802.

During the displacement of curtain 801, whichever its position may be, at least one of the position sensors 934 and 935 may detect the passage of the wire ropes of steel mesh 802. In this way these sensors allow to know the position of curtain 801 in every moment, and thus to supervise its operation.

Even though the curtain 801 will usually displace in the main displacement direction indicated in FIG. 22, when it is required to automatically place the curtain 801 in specific position same may be displaced in both directions. To locate curtain 801 automatically implies, necessarily, for the case of the current preferred embodiment, to displace mobile feeding device 501 at the same time that clutch 835 is engaged (enabled).

When more than one mobile feeding devices 501 are used operating in the same stall and sharing a same (unique) endless curtain 801, the curtain's transmission device will incorporate a traction device independent of mobile feeding devices, instead of using traction device 124 displacing a mobile feeding device 501 and an endless curtain, both together.

For example, there could be three mobile feeding devices 501 operating with the same curtain, or with two. If it were three curtains and three mobile feeding devices 501 (for example), it would not be necessary anymore to use independent traction devices.

b) Handling Method (Description of its Functioning)

The preferred embodiment of the handling method is described in its main aspects incorporating some additional devices to the function "SWEEPING REMAINS" of FIG. 21.

Figure 25:
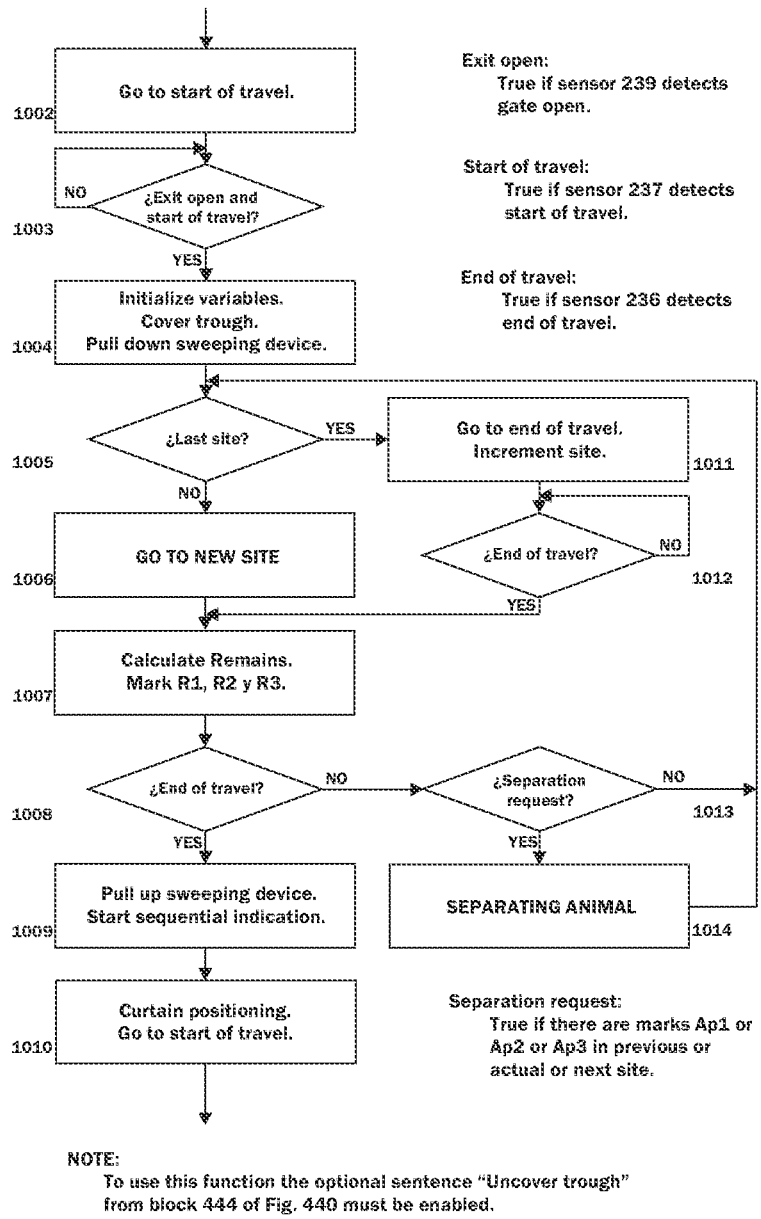
FIG. 25 shows the flow diagram of function 1001 "SWEEPING REMAINS", one other of the implementation of the function corresponding to FIG. 18, said implementation including the mechanisms of function 761 in FIG. 21.

FIG. 25 shows the flow diagram of function 1001 "SWEEPING REMAINS", another one of the implementations of the corresponding function in FIG. 18, said implementation will include the mechanisms of function 761 in FIG. 21.

Upon the initiation of the sweeping run it is assumed that the position of curtain 801 will be the one shown in Assembly Scheme in FIG. 22 and the one shown in FIG. 24. This position is verified upon execution of the statement "Cover trough" executed in block 1004 in FIG. 25.

In the cases where curtain 801 is not in the abovementioned position, the very same statement must execute the necessary mechanisms for displacing curtain 801 up to said position. This displacement shall be executed controlling clutch 835 and simultaneously making the corresponding displacements of mobile feeding device 501 for said purpose.

Statement "Cover trough" must leave clutch 835 engaged after its execution, so that once the sweeping run is started, start 810 of steel mesh 802 will be displaced behind sweeping device 541 and very close to it. In this way, steel mesh 802 will progressively cover the trough's bottom 630 and at the same time will perform the sweeping of food remaining in trough 630.

During the sweeping run mobile feeding device 501 will advance from the first site towards the last one, with the sweeping device 541 and the start 810 of steel mesh 802 being displaced one site behind mobile feeding device 501. After the passage of mobile feeding device 541 the bottom of trough 630 will remain covered by steel mesh 802, thus impeding the animals from acceding to the drained-through food that may eventually stay in said trough.

Upon the sweeping run's ending start 810 will be located near the last site. Nonetheless start 810 must be displaced considerably beyond this point before the entrance of a new batch of animals to the stall.

With the purpose of reducing the feeding process' start time for the new batch of animals that has just entered the stall, steel mesh 802 is displaced by means of the statement "Curtain positioning" that will be added (with respect to block 910) in block 1010.

The sentence "Curtain positioning" displaces the steel mesh 802 until its end 811 in the near vicinity of position sensor 935. In this way the bottom of trough 630 still remains covered in all its extension by steel mesh 802 while the recently fed animals leave the stall.

Upon the initiation of a new batch's feeding process, steel mesh 802 must cover the trough's bottom for the totality of sites excepting the first one, being it then necessary to displace the steel mesh 802 for a distance approximately equivalent to one site.

Said displacement, belonging to the next feeding process to be executed, is carried out by means of the statement "Uncover trough", that must be executed in block 444 of function 441. This statement appears as optional in FIG. 10 and must be enabled when the endless curtain is used.

The statement "Uncover trough" situates steel mesh 802 is such a way that after its execution it allows food access for the first site, then situates mobile feeding device 501 on the first site and finally leaves clutch 835 engaged. Given that this statement shall be the first one executed at the start of the feeding process, it must be capable of displacing steel mesh 802 to the abovementioned position, whichever the initial position of said mesh may be.

The positioning of mobile device 501 on the first site is then considered, from the point of view of identification, as the first accounted run on said site. Given that clutch 835 has been left engaged, during the rest of the first run, end 811 will then result displaced in one site ahead of mobile feeding device 501, uncovering the bottom of trough 630 from the second site to the last one.

On ending the first run, clutch 835 will be disengaged (disabled) on execution of block 495 of function 481. FIG. 12 shows the optional statement "Disable clutch", statement that must be enabled in blocks 493 and 495 in the cases where the endless curtain is used.

A particular situation occurs when in the first run flag "E3" is marked for a particular site, where said particular site is taken as the end of travel (due to the entering to the stall a number of animals that is smaller than the total number of sites) according to what was said before regarding the identification system's preferred embodiment.

In this case clutch 835 is disengaged on execution of statement "Disable clutch" in block 493 of function 481. In this way the steel mesh will remain impeding food access in the sites that come after the site marked by flag "E3".

b.1) Semi-Automatic Separation

Beyond the implementation described up to here, whose main purpose is reducing animal detentions during their entrance and exit from the stall, function 1001 implements a mechanism for the semi-automatic separation of animals. This mechanism is executed by means of blocks 1013 and 1014 in FIG. 25, being them added with respect to function 761 in FIG. 21.

Block 1013 detects any request for separation of an animal occupying the previously served site, the site being currently served and the next site to be served. If there is a mark in any of flags "Ap1", "Ap2" or "Ap3" for any of the sites considered, block 1014 is executed.

Figure 26:
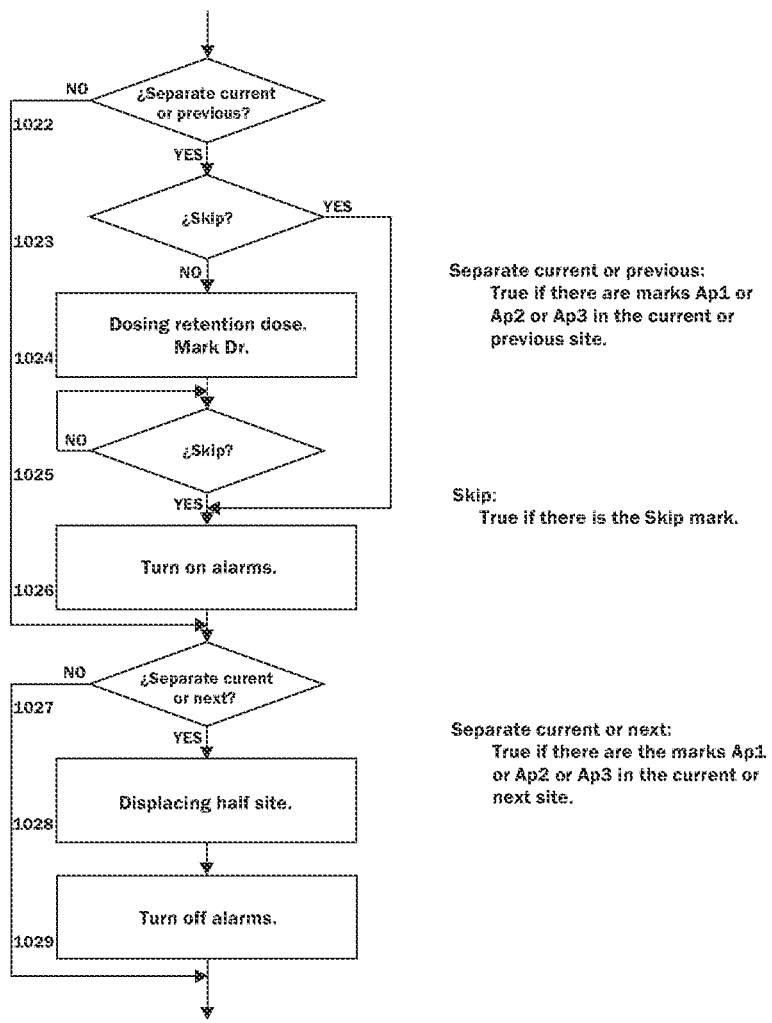
FIG. 26 shows the flow diagram for function 1021 "SEPARATING ANIMAL", one of the possible implementations of the corresponding function in block 1014, FIG. 25.

FIG. 26 shows the flow diagram for function 1021 "SEPARATING ANIMAL", one of the possible implementations of the function corresponding to block 1014 in FIG. 25.

During the sweeping run alarm lights 507 are turned on, as described for the feeding process, alarms that in this case also have the purpose of alerting the animals regarding a possible electrical shock provoked by steel mesh 802, that operates being electrified.

Given that the semi-automatic separation process is based on animals' retention (selectively and voluntary) during their exit from the stall, it is necessary to turn off said alarms at the same time that the animal that must be retained is stimulated with food.

When it is desired to separate the animal in the next site "N", a situation that is detected by the condition in block 1027, block 1028 displaces mobile feeding device 501 approximately to half the distance corresponding to one site and block 1029 turns the above mentioned alarms off.

The displacement up to site "N" will then be completed by block 1006 according to the mechanism in function 1001. In this way mobile feeding device 501 is situated in front of the animal that must be separated without submitting it to any alert signal.

When function 1021 is executed again, site "N" will result to be the currently served site whose animal separation request will be detected by the condition of block 1022. It is then that the animal is stimulated with food, upon dispensing a "Retention dose" in block 1024.

While the animal is retained, the operator will perform the necessary operations to change the animal's destiny upon its exit from the stall. Once said operation have been done, the operator must mark flag "Skip"-according to the mechanisms already described for the identification system—that will be read in block 1025.

When the operator wishes to disregard the separation of an animal, he must mark flag "Skip" on execution of block 1023, that's to say, in the moment prior to the dispensing of the retention dose.

After any of these interventions by the operator, the alarms in block 1026 are turned on to alert the animal it is wished to separate, of the possible electric shock.

Given that it is wished to separate the animal in site "N", it is necessary to retain the next animal in site (N+1), and of course the animals in all sites after (N+1), in order to allow the operator to re-establish of the animals' destiny. For such purpose the condition of block 1027 allows to execute again blocks 1028 and 1029 on site "N".

During the following execution of function 1021 on site (N+1), the condition of block 1022 will detect a separation request for the previous site N, thus enabling the dispensing of a retention dose in block 1024 for site (N+1).

Once the operator has established the destiny of the animals, he will enable the displacement of curtain 801 by marking flag "Skip", thus ending the separation process of the animal in site N.

This mechanism, as described, may be used to separate multiple nonconsecutive animals in a same batch by the multiple application of the same mechanism during the sweeping run.

A particular situation happens when it is desired to separate multiple animals located in consecutive sites. The condition of block 1027 does not then allow to end the process and blocks 1028 and 1029 are executed again.

If it is considered that it is convenient to also separate the animal in site (N+1), block 1027 will detect a separation request for the current site (currently being served) and the same process just described will be repeated again.

The retention dose will be determined by values "Vel 3" to "Vel 6" of data group 741 that correspond to the sweeping run. When in block 1024 the dispensing of said dose is executed, flag "Dr" of corresponding data group 741 shall be marked.

When condition in block 1013 on FIG. 25 is fulfilled, there will be in indicator panel 582 at least an "AP" arrow on, indicating the sites intervening in the aforementioned separation process.

When automatic marking with paint is used, as foreseen in block 708 in FIG. 18, or when manual marking is used by any method, the colors of the indicating arrows "AP" may be interpreted as different types of animal separation.

If automatic separating gates are being used (not the gates of milking stall 921) and they are based on ISO 11784-85 technology, the red color adopts a sense of alarm. This color will alert the operator that his intervention is required in order to perform the semi-automatic separation of animals that the automatic separation system cannot perform.

When the here proposed solution coexists with automatic separation gates based on ISO 11784-85 technology that do not allow the separation of animals when these have lost their tag, or when said tag shows a persistent malfunctioning, the proposed solution allows to contemplate said previous technology's deficiency.

Alternative Solutions

The application of any of the alternative solutions here proposed represent a cost higher than the application of the solution described in "Preferred embodiment". The higher cost has its origin principally in the necessity to handle higher amounts of unconsumed food.

While in the case of the preferred embodiment small amounts of food are withdrawn from the trough, same may be manually recycled or discarded, while in the case of the alternative solutions the use of systems for automatic food recycling will in many cases be required.

As an alternative to the "partial sweeping" used in the preferred embodiment, solutions are here proposed for the unconsumed food's total sweeping, or its dumping by means of invertible troughs. Moreover, a solution for the automatic recycling of the unconsumed food withdrawn from the trough is also proposed, being it possible for this solution to be applied both in the case of the "total sweeping" and in the case of "dumping".

Said solutions are based in the use of a "recovery device", being same coupled to the mobile feeding device and that receives and stores the food withdrawn from the trough. Said device is equipped with a scale that allows to know the weight of the food withdrawn from each individual site, being said weight associated to the identity of the animal that previously occupied that site.

The solutions with total sweeping, or with dumping, not only may they be applied in farms with the previously defined characteristics for the use of the preferred embodiment, but are solutions considerably more flexible with respect to the type of stall and type of cubicles—and thus the type of animal—with which they can operate.

In the first place, given that in the sites previously occupied by animals there won't be unconsumed food remaining, it will be possible to do without the use of the endless curtain—for the majority of applications—in order to handle animals.

This allows to apply the aforementioned solutions, as for example in the "rapid exit stalls". Said denomination is here used for referring to stalls where the trough(s) allow to be removed or elevated in order to allow the exit of animals through the place occupied by the trough when animals are being fed.

In the second place, given that the total sweeping or the dumping operate site by site, it is possible to realize such operations in each particular site without interfering with the processes that may be taking place in adjacent sites. This allows the use of said applications on "independent site" systems described later.

It is understood as independent site system any stall or configuration of stalls or cubicles such that it defines multiple sites approximately contiguous (to be occupied by animals), where the animals enter and exit each site of the stall at different times and not necessarily in batches as in the case of the "preferred embodiment".

1) Total Sweeping, Implementation Example

Even though the total sweeping solution regarding the unconsumed food must not be restricted to one specific sweeping direction nor to a specific way of withdrawing food from the trough, in the following implementation it is opted to sweeping the remaining food in the trough's longitudinal sense, withdrawing the food by gravity by means of a plurality of discharge holes in the trough's inferior part.

Said implementation is convenient when it is wished to apply the total sweeping solution in the same application environment aforementioned in the "Preferred embodiment". So it is that the different examples here illustrated answer to the same type of mobile device, and to the same type of stall that have been previously chosen to illustrate the application of the preferred embodiment.

In order to perform the total sweeping in this case is used the same sweeping mechanism as in the preferred embodiment, but without using the mechanisms for draining food during the sweeping and for measuring the volume of unconsumed food present in each site during the sweeping.

Figure 27:
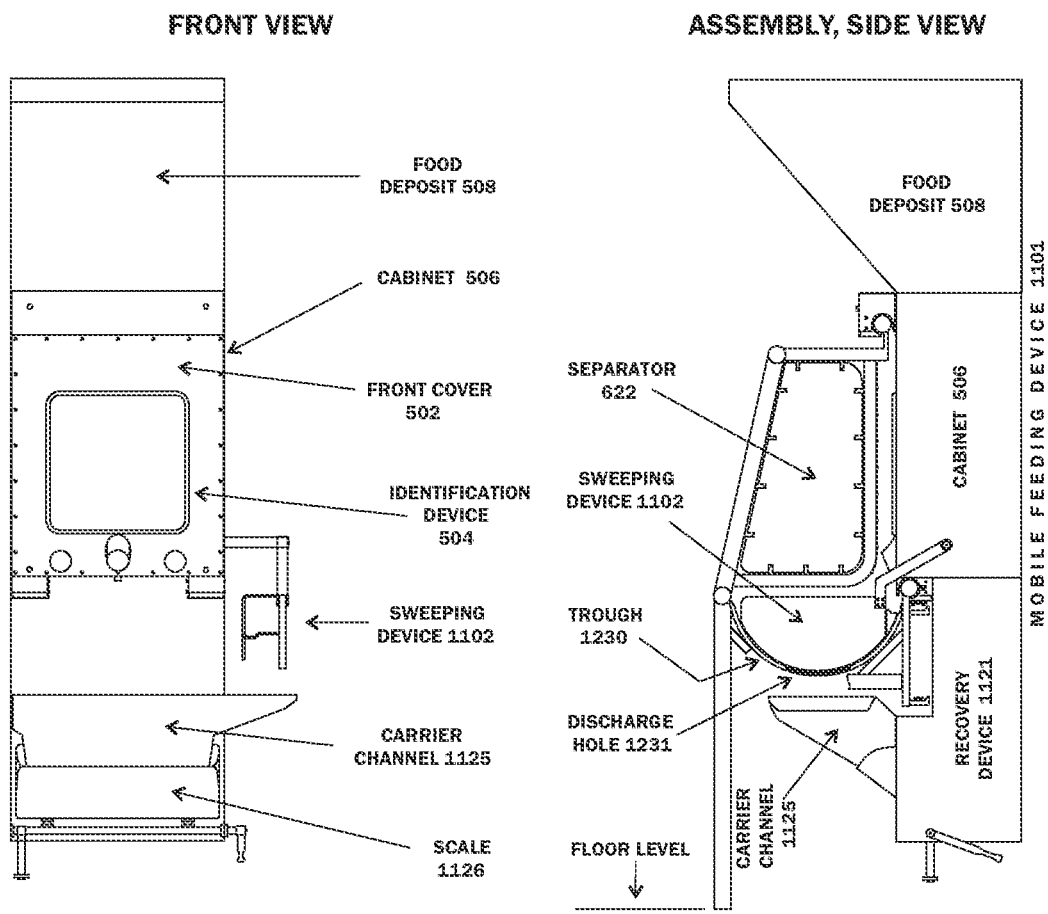
FIG. 27 illustrates mobile feeding device 1101 and its assembly with respect to some parts of milking stall 1221 in FIG. 30.
Figure 30:
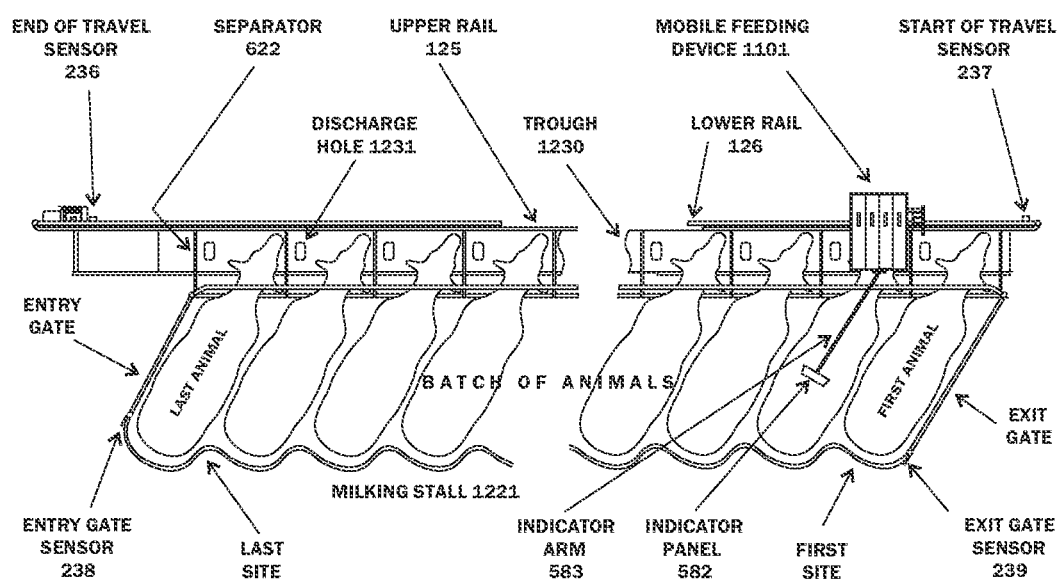
FIG. 30 illustrates the upper view of milking stall 1221 and the lay out of the different parts of the feeding system with respect to said stall.

FIG. 27 illustrates the mobile feeding device 1101 and its assembly with respect to other parts in milking stall 1221 in FIG. 30.

FIG. 27 illustrates mobile feeding device 1101, which includes the majority of the parts of mobile feeding device 501 in FIG. 13. Sweeping device 1102 is similar to sweeping device 541, but without using the mechanisms for draining-through the unconsumed food and the metering device for measuring the dragged food's level.

The lateral view in FIG. 27 illustrates the lay-out of mobile feeding device 1101 with respect to the parts in milking stall 1221 shown in FIG. 30. Said stall is similar to milking stall 621 in FIG. 17 described in the preferred embodiment, but incorporates in this case the trough 1230 that is equipped with multiple discharge holes 1231.

When during the sweeping run sweeping device 1102 gets near the discharge hole 1231, the food dragged by said device falls due to gravity inside carrier channel 1125 so as to be transported to scale 1126 that is inside recovery device 1121.

Figure 28:
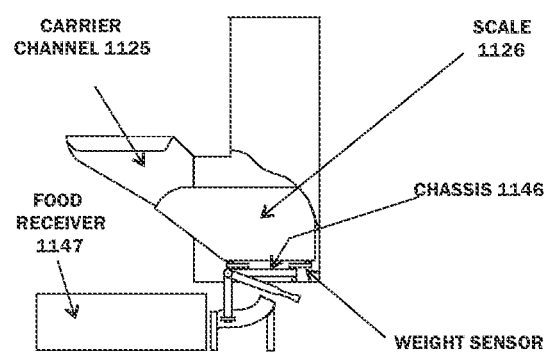
FIG. 28 shows recovery device 1121, an implementation used in cases where the unconsumed food's total sweeping is performed.

FIG. 28 illustrates recovery device 1121, device that is used when the total sweeping of the unconsumed food is implemented.

The food withdrawn from trough 1230 during the sweeping is stored inside scale 1126. This scale allows to measure the food weight that is withdrawn from each site, allowing in this way the association of said weight to the identity of the animal that previously occupied said site.

The food weight is measured by means of four weight sensors that form part of scale 1126 and that are fixed to the chassis 1146. When scale 1126 operates in the position shown in FIG. 28, it has no contact with any other part of the system except chassis 1146.

The food deposited inside scale 1126 is discharged during the sweeping run and/or after same, in one or more food receiver(s) 1147 set at fixed points of the trajectory of mobile feeding device 1101 by means of discharge device 1141 that is described below. The food accumulated in the food receiver(s) 1147 may be later withdrawn by means of any other mechanism.

Figure 29:
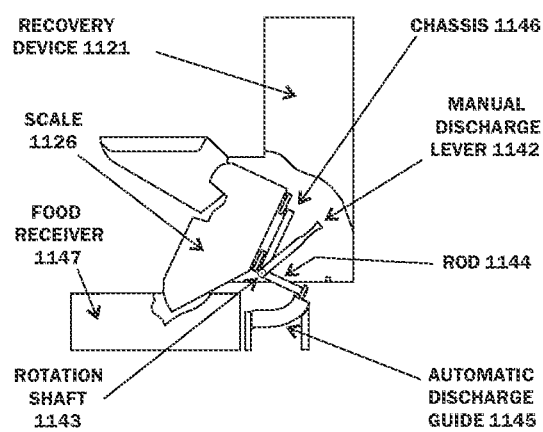
FIG. 29 illustrates discharge device 1141, a device used for manually or automatically unloading the food stored in scale 1126.

FIG. 29 illustrates discharge device 1141, a device used for the manual or automatic discharge of the food stored in scale 1126.

The food stored in scale 1126 is discharged upon turning said weigher until the position shown in FIG. 29. The turn is done on its rotation shaft 1143 that operates fixed to chassis 1146 and that turns on the supports that fix it to the recovery device's 1121 cabinet.

When the operator wishes to manually discharge the content of scale 1126, he may turn rotation shaft 1143 by means of the manual discharge lever 1142 that slightly sticks out on the cabinet's side of recovery device 1121.

The automatic discharge of the content of scale 1126 is implemented by means of rod 1144, that operates on the rotation shaft 1143 when the displacement of the mobile feeding device 1101 causes said rod to slide on the automatic discharge guide 1145.

Automatic discharge guide 1145 is fixed to the floor in front of food receiver 1147 in such a way that when said guide generates the turn of scale 1126 its content will be discharged inside the food receiver.

Given that automatic discharge guide 1145 may operate in both displacement directions of mobile feeding device 1101, multiple automatic discharge guides 1145 together with their corresponding food receivers 1147 may be used in the mobile feeding device's 1101 trajectory.

FIG. 30 shows the upper view of milking stall 1221 and the lay out of the different parts in the feeding system with respect to said stall.

Milking stall 1221 is similar to milking stall 621 in FIG. 17, mentioned in "Preferred embodiment", but in this case it incorporates trough 1230 that is equipped with multiple discharge holes 1231 that are set in the points where the sweeping corresponding to each site ends.

In the example of FIG. 30, where animals enter and exit as a batch, the food sweeping is done in a single run, pulling up the sweeping device 1102 of trough 1230 at the end of said run, but nonetheless, the total sweeping may be used to sweep each site in an independent way as we will describe below.

2) Dumping, Implementation Example

Even though the solution of dumping the unconsumed food must not be restricted to a specific way of overturning the troughs or of controlling their movement, in the following implementation it is opted to overturn each trough on a shaft that is transverse to the mobile feeding device's movement, while the troughs' movement is controlled by mechanisms incorporated to said mobile device.

Said implementation is convenient when it is desired to apply the "dumping" solution in the same application environment as aforementioned in "Preferred embodiment". In this way, the different examples here illustrated answer to the same type of mobile device and to the same type of stall that has been chosen to exemplify the preferred embodiment's application.

Figure 31:
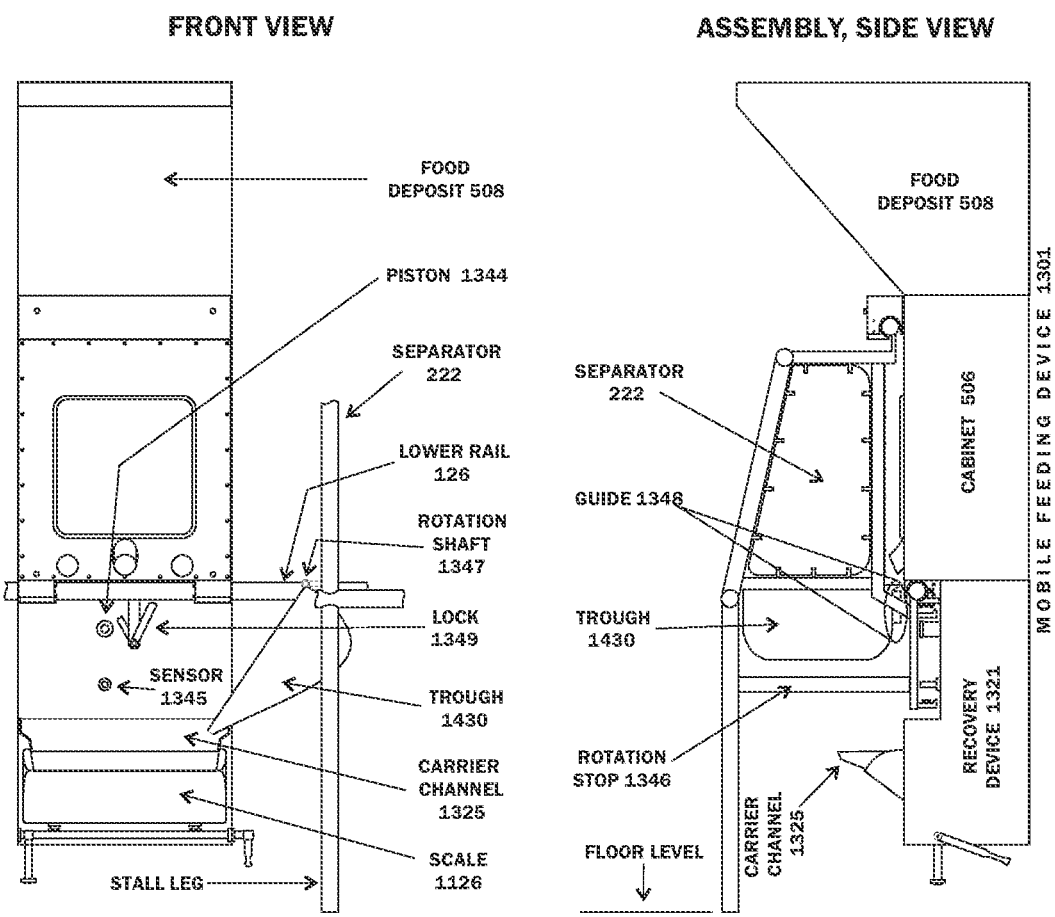
FIG. 31 illustrates mobile feeding device 1301 and its assembly with respect to certain parts of milking stall 1421 in FIG. 34.
Figure 34:
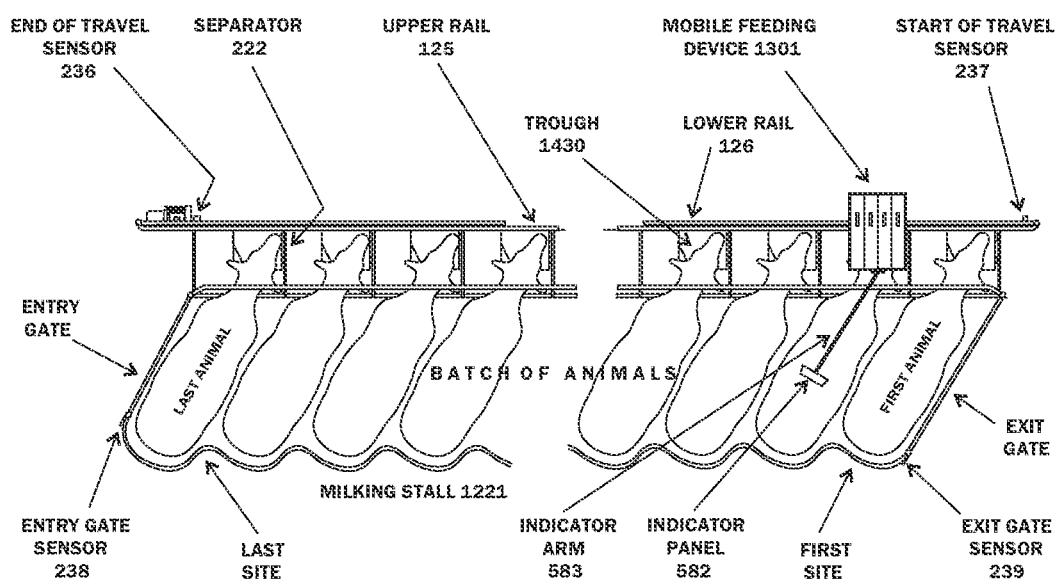
FIG. 34 illustrates upper view of milking stall 1421 and the lay-out of the different parts of the feeding system with respect to said stall.

FIG. 31 illustrates mobile feeding device 1301 and its assembly with respect to certain parts of milking stall 1421 in FIG. 34.

Overturning trough 1430 turns on a rotation shaft 1347, being it maintained in its "high" position (initial position) by means of lock 1349. The side view of FIG. 31 shows the trough 1430 in its high position, while the frontal view shows it in its "low" position (dumping position).

Rotation shaft 1347 is attached to the separator's (222) structure. The structure that includes the separator 222, the corresponding stall leg and other fastenings shown in FIG. 31, form the same structure as the one shown in detail in "Identification system" of the preferred embodiment.

Lock 1349 retains the trough 1430 in its high position once said trough is turned up to that position, or allows it to turn by gravity to its low position when said lock is slightly turned in the anti-clockwise sense by piston 1344.

Given that the piston 1344 operates attached to recovery device 1321, this is displaced with mobile feeding device 1301, being the lock 1349 turned by means of the displacement of said mobile device.

Figure 32:
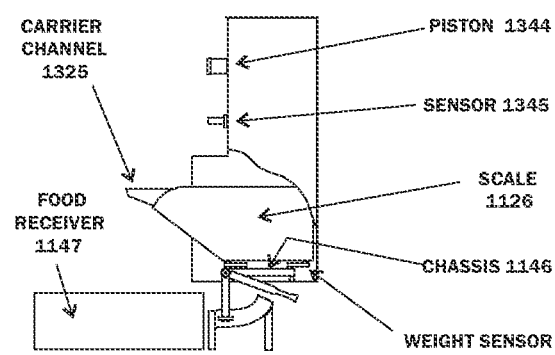
FIG. 32 shows the recovery device 1321 incorporating selector device 1341, same controlling the dumping of the unconsumed food.

FIG. 32 illustrates the recovery device 1321, said device incorporating the selector device 1341 that controls the dumping of the unconsumed food.

Piston 1344 has two operating positions, one of them deactivated in which it has no contact with other parts and an active position where as the mobile feeding device 1301 advances, it has contact with lock 1349 or with trough 1430. In FIGS. 31 and 32 said piston is shown in its deactivated position.

Sensor 1345 is attached to recovery device 1321 and allows to detect the near presence of the support structure that is in the same plane as separator 222. This sensor has the purpose of avoiding an eventual accidental collision between piston 1344 and said mentioned structure, when said piston in activated.

Figure 33:
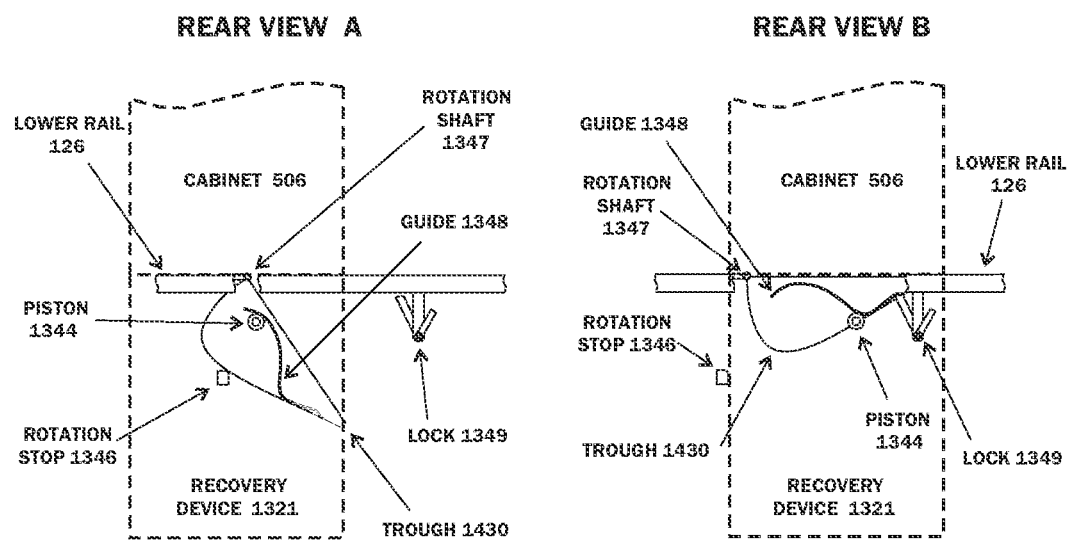
FIG. 33 illustrates the way in which selector device 1341 controls unconsumed food dumping.

FIG. 33 illustrates the way in which selector device 1341 controls unconsumed food dumping.

Rear view "A" and rear view "B" in FIG. 33 show a diagram (dotted lines) of the rear view of mobile feeding device 1301. These views could be, for example, rear views coming after the fontal view of FIG. 31, where the position of the mobile feeding device 1301 and trough 1430 have varied.

As a way of simplifying FIG. 33 and illustrating in a clearer way the functioning of selector device 1341, only some of the parts that intervene in the functioning of said device are included. The remaining parts have already been sufficiently illustrated in the previous figures.

When piston 1344 is activated, same acts in the entering sense, that is, it displaces in the sense that goes from the rear part of mobile feeding device 1301 towards guide 1348 or towards lock 1349. In this case it is only the roller that said piston 1344 has in its end is shown, roller that actuates on guide 1348 and on lock 1349.

If it is considered that mobile feeding device 1301 advances in the direction from the first site to the last site on milking stall 1421 in FIG. 34, it may be supposed a position "A" in the conditions of the rear view "A", and a position "B" in the conditions of rear view "B". This corresponds to mobile feeding device 1301 seen from its rear side and advancing from left to right.

In position "A", trough 1430 is in its low position and it is wished to return it to the high position (initial position). This is the case in which the first run is being executed during the entrance of animals to the stall, a run during which the troughs of all sites must be raised one by one.

As the mobile feeding device 1301 advances from position "A" towards the site that will be occupied by an animal, first piston 1344 is activated so that it actuates on guide 1348, and then the trough is elevated to its high position until it engages the lock and is locked when mobile feeding device 1301 arrives to position "B".

Lock 1349 is provided with a spring that tends to maintain it in the position shown in any of the figures, so that upon raising trough 1430 it stays automatically retained in place by said lock.

Position "B" illustrated is just a little bit before the position in which mobile feeding device 1301 stops in order to serve the corresponding site, for example, in order to identify the animal and dispense an "Initial dose" of food. When the mobile device stops, piston 1344 will acquire an intermediate position between position "B" and the position where it reaches lock 1349.

Before the mobile device resumes displacement towards the next site, piston 1344 must be deactivated or else it would be acting against lock 1349, again unlocking the trough.

When during the "dumping run" it is desired to unlock one by one all the troughs 1430 from the first site to the last site (in the same direction as the first run) piston 1344 must be activated when it moves in front of lock 1349, in such a way as to unlock trough 1430, that upon lowering by gravity to its low position unloads its content in the carrier channel 1325. The different parts will thus acquire the positions shown in the Frontal View in FIG. 31.

FIG. 34 illustrates the upper view of milking stall 1421 and the arrangement of the different parts of the feeding system with respect to said stall.

Milking stall 1421 is similar to milking stall 221 in FIG. 5 as described in the preferred embodiment, but it now incorporates multiple troughs 1430 and shows mobile feeding device 1301 that now incorporates the recovery device 1321.

In the example in FIG. 34, where animals enter and exit in batches, usually all the troughs will be elevated to their high (initial) position during the first run and will be unlocked in order to dump their content during the dumping run, nonetheless, the dumping mechanism may be used in order to operate trough 1430 for any site during any run and in an independent way from the rest of the sites, as would be done in the "independent sites" systems described later.

3) Automatic Recycling, Implementation Example

Recycling the unconsumed food means to administer it in small amounts to the following animals to be fed, so that the risk implied by the ingestion of said small amount is reduced to a desired point. This is attained in this case by mixing the unconsumed food with the food to be administered to said next animals.

With such purpose a solution is here provided in order to automatically recycle the food deposited inside the recovery device, by means of a recycling device that functions attached to the mobile feeding device.

The automatic recycling solution must not be restricted to a specific way of transporting and mixing the food, on the contrary, this treatment of the food must be made based on the commercial solutions that are better adapted to this type of application.

Figure 35:
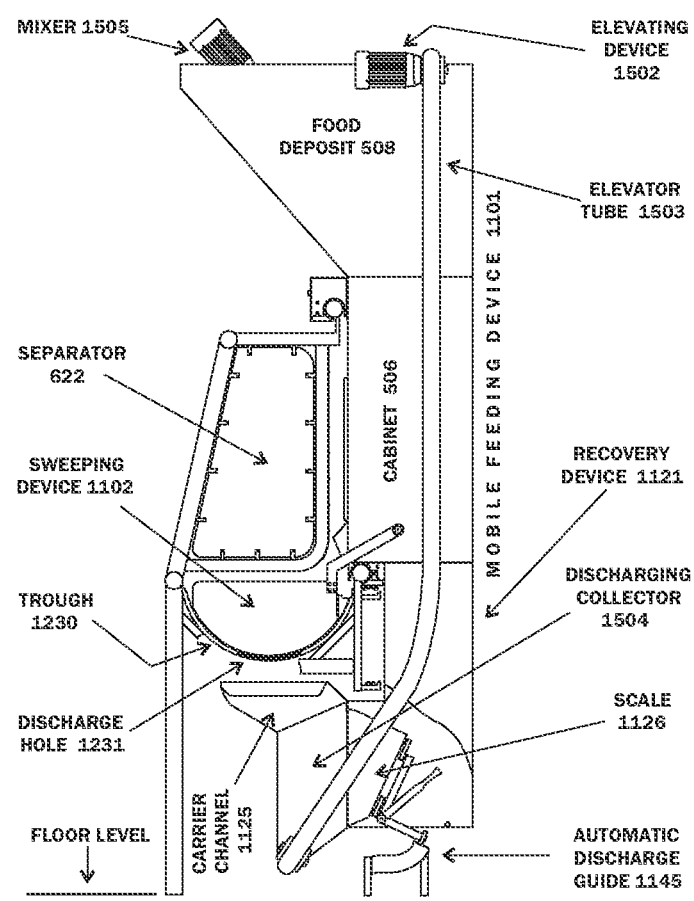
FIG. 35 illustrates recycling device 1501, one of the possible implementations of the automatic recycling of unconsumed food, in this case applied to mobile feeding device 1101.

FIG. 35 shows recycling device 1501, one of the possible implementations for the automatic recycling of unconsumed food, applied in this case to mobile feeding device 1101.

FIG. 35 illustrates scale 1126 in its unloading position, being said discharge operated in this case by means of the action of automatic discharge guide 1145. The food is unloaded inside discharging collector 1504, whose inclined bottom makes the food slide towards the inferior part, where elevator tube 1503 is coupled.

Elevator tube 1503 is symmetrical to both sides of mobile feeding device 1101 and forms a closed circuit that goes through the bottom of discharging collector 1504, where there is a hole that allows food entrance, and above food deposit 508, where there are four orifices—one for each compartment of food deposit 508—where it is possible to select which one of them will unload food.

Inside the elevator tube operates a washer chain elevator equipped with plungers (or washers, or buckets, or similar devices) that transport the food from discharging collector 1504 until food deposit 508 when said chain is displaced by the motor of the elevating device 1502.

The maximum operational flow of the whole elevator system, that will be a small flow, will be determined according to the application's environment. This flow depends of the feeding practices adopted, especially the percentage of animals that it is desired to feed to their maximum ingestion capacity, as said capacity has been defined in "Detailed description of the invention".

Mixer 1505 is a mixer implemented by means of an endless screw capable of elevating the food from the bottom of food deposit 508 towards the upper part of said deposit. Said mixer may easily be changed from one compartment to the other and will be set in the selected compartment in order to unload the food from elevator tube 1503.

The mixing of food made by mixer 1505 will be done preferably during the reloading of the pertinent compartment, or else when said compartment contains enough volume of food as to dilute to the desired degree the food that is discharged by elevator tube 1503.

While mixer 1505 is no turned on, the food discharged by elevator tube 1503 will remain over the previously existing food in the corresponding compartment, being it possible to administer said preexisting food to the animals without necessarily mixing it with the food discharged through elevator tube 1503.

In this way the "automatic recycling" allows to operate without the food receiver(s) that in previous solutions were set to store the food discharged from the recovery device, and it also allows operating without the mechanisms that necessarily had to be used for withdrawing the food from said food receivers.

4) Systems of Independent Sites

We herewith call "independent sites" to any stall or configuration of stalls or cubicles such that it defines multiple approximately contiguous sites to be occupied by animals, and where the animals enter and exit each stall's site at independent times.

In a different way to the preferred embodiment, where the task of animal identification is subdivided in batches of equal or smaller number than the number of stall's sites, in this solution the task of animal identification is subdivided in "sessions" during which multiple consecutive animals may be served in each site, being usually served a group of animals much bigger than the stall's number of sites.

A session may be initiated and finalized in an automatic or in a manual way. It may be for example during the system's start up or its turn-off, or simply during a period of time during which the system remains open. A session may be repeated, for example, twice a day in order to serve the same batch of animals during two daily shifts, or several times a day serving more than a group of animals in one or more daily shifts.

The identification method and the feeding method implemented as described in the "Preferred embodiment" may be used—with minor modifications—in the independent sites systems. The animal handling method is not applicable in these cases.

The identification system already implemented in the preferred embodiment may also be applied—with minor modifications—to the independent sites system, while the implementation of the feeding system must necessarily incorporate the total sweeping or the dumping of the unconsumed animal food.

The total sweeping or the dumping mechanisms are the ones that make possible the operation of the mobile feeding device in the independent sites systems.

Contrary to the preferred embodiment, these mechanisms will not operate during a specific "sweeping run" or a specific "dumping run", but will operate in each site as required and without interfering with the processes that may be happening in the adjacent sites.

In the preferred embodiment it was possible, as a result of the batch organization of the animals entering the stall, to obtain some synchronicity between the start of the identification and feeding process executed in the different stall's sites.

In the case of independent sites, that synchronicity may occur at the beginning of a session, but later on animal replacement for each site will take place at different times and thus the start of said processes will be executed on each site at different times.

FIG. 36 illustrates a possible way of organizing the data in the memory and exemplifies the order in which said data are organized in the case of the independent sites system.

FIG. 36 shows the dependence existing between the execution of the identification process in the different sites of a stall having independent sites, and the data storage in matrix 323. In this example the cases shown are empty sites, a site just about to be occupied by an animal and sites that have already been occupied.

This could be the case, for example, of a stall intended for individualized feeding for breeding a group of meat producing animals, where the group of animals stay all the time in a confinement area where it is fed in large troughs for a plurality of animals, and where each animal voluntarily accedes to the stall where its food is supplemented in an individualized way.

In the sites that are empty and in those that are close to being occupied it may be appreciated that the counting of runs, that's to say the value in run counter 322 corresponding to that site, said value will be the maximum value ("Max"). For this case, it has been defined as "Max"=7.

Counters 322 operate in a range that goes from zero (value that does not refer to any row of matrix 323) to a point beyond the vale that aims to the last row of matrix 323, being this value the "Max" indicated in FIG. 36.

Counters 322 are started from zero at the beginning of a session, and from there on the mobile feeding device begins to continuously execute runs, being each site's counters incremented when the site is served, an increment existing even if there are no animals in the sites.

After counter 322 acquires value "Max" its value will not increase anymore, even in the cases where the animal remains in the site, as is the case of the third site for the diagram illustrated in FIG. 36.

The case for the third site illustrates how an animal present in said site, having already finished the corresponding identification and feeding processes, has been served for six consecutive runs. For that example's case, said processes are extended to six runs as a maximum, being it possible to end in any previous run if the animal exits the site. As was before defined for this Figure, being the value "Max"=7, so that any run after the seventh is not accounted for and run counter 322 remains at "Max" value.

In the remaining sites illustrated as occupied by animals, it may be appreciated that the animals have entered their sites in different runs. Each time that an animal enters one site and is detected by the animal sensor—a sensor that operates jointly with the mobile feeding device—the corresponding run counter 322 is started at zero and it immediately acquires the value "1" since the site is served at the same moment by the run in execution.

In a different way to the preferred embodiment, loading data in each column of matrix 323 will be initiated in different runs, starting the load of one column from the first row each time that an animal enters the site corresponding to said column.

CONCLUSIONS

The solutions included in the proposed invention have been inspired mainly by the current necessity of pasture-based dairy farms in less developed countries of implementing an individualized feeding for its animals. This is especially valid in the Southern Cone countries, as has been previously explained.

Said farms started in the great majority as family businesses that in the last decades have been migrating to medium scale businesses. During said decades, a great number of these farms have used the individualized feeding of animals in the milking parlors by means of manual or semiautomatic methods.

Nonetheless, mainly as the number of animals in the milking herds grow and with it the number of sites in a milking stall, feeding in the milking stall tends to be either simplified or eliminated. This happens in spite of the fact that said feeding method is not substituted by any other similar method of feeding animals out of the milking stall and in spite of the fact that today there are a greater variety of solutions for automatic feeding.

So it is that, currently, two well defined practices have been generated: a "simplified feeding" inside the milking stall, and an "absence of feeding" during the milking process.

In both cases the individualized feeding of animals is forsaken. Additionally, in the case of the "absence of feeding" the animal stimulus during milking is additionally abandoned, with the implications that this factors have on milk productivity.

The main reasons that force producers to use these practices are the previously analyzed in "Detailed description of the invention", since if for example it is desired to feed animals with high amounts of food in stalls with a high number of sites, the experience obtained indicates that serious difficulties arise, difficulties that go from a marked increase in the counting of somatic cells in the milk to a generalized state of clinical mastitis.

As has been previously analyzed, the effect initiated with a mismatch between the milking start and the oxytocin effect tends to easily propagate due to the types of equipment and practices used. In this way the aforementioned difficulties may be generated without a cause being easily discerned. What is indeed observable of these causes is the disarray generated in the milking routine by the unconsumed food that remains in the troughs.

It is believed that this is the main reason for opting for simplified and effective practices—although not efficient ones—as the "simplified feeding" in the stall or the "absence of feeding", even though at scientific and technical levels are well known the advantages of stimulating the milking process through the feeding.

The detailed description of the invention is proof in itself of the number of aspects implied in the approach of a feeding solution that, without any distortion in the milking process, may be applied to stalls having a medium and high number of sites in the here considered dairy farms.

An additional and important argument is that the need to supplement the animals' individual diet exclusively by means of the food dispensed during milking must be considered. Said food supplement is the way of contemplating each animal's individualized diet.

Given the abovementioned needs, an efficient feeding system must be capable of administering in a safe way a wide variety of additives or nutritional supplements, as is done by the invention herewith proposed. As has been said before, said wide variety has its origin in the very varied lactation state of advance exhibited of the herds here considered.

So it is that the proposed invention answers a wide range of necessities that go from the solution of practical problems pertaining from the quality of the milking process to the problems derived from an individualized feeding (requiring a high degree of automation) as has been described.

The following table compares the main aspects solved by the proposed invention to the existing solutions in the closest state of the art.

Said table not only gives an idea of the magnitude of the perceived necessity to which this invention provides a solution, but also shows that the solution to the problems described is not an immediate or a simple one.

TABLE 1

| | VARIABLE COMPARED | PROPOSED INVENTION | FR 2704720 A1, Pierre Sigal (Owner and Inventor) | FR 2781120 A1, Bayle ETS (Owner) Pierre Sigal (Inventor) |
|---|---|---|---|---|
| | IDENTIFICATION | | | |
| 1 | Compatible with a high number of sites | YES | YES | YES |
| 2 | Compatible with stalls having wide entry gates and wide cow platform | YES | YES | YES |
| 3 | Solves animals intertwining without animals' accommodation system | YES | NO | NO |
| 4 | Solves adjacent interferences without animal accommodation system or animal headlock gates | YES | NO | NO |
| 5 | Solves animal displacement without animal headlock gates | YES | NO | NO |
| 6 | Identify each animal in multiple opportunities distributed during the same animal stay in the stall | YES | NO | NO |
| 7 | Allows to extend each identification opportunity without extending entrance time | YES | NO | NO |
| 8 | Allows to adjust identification reliability Specific characteristics for the case of RFID ISO 11784-85: | YES | NO | NO |
| 9 | Compatible ISO 11784-5 | YES | YES | YES |
| 10 | Solves tag orientation without extending entrance time | YES | NO | NO |
| 11 | Diagnoses in only one animal stay in the stall the tag's loss or its persistent malfunctioning | YES | NO | NO |
| 12 | Allows to measure individual tag performance and system performance, even if there have not been identification losses FEEDING | YES | NO | NO |
| 13 | Can dose multiple food's types at low cost | YES | YES | YES |
| 14 | Stimulates the milking end even if administering low food amount | YES | NO | NO |
| 15 | Allows to adjust identification reliability as required by feeding | YES | NO | NO |
| 16 | Optimizes identification by means of animal training without extending animals' entrance time Characteristics of unconsumed food handling: | YES | NO | NO |
| 17 | Redistributes/recycles unconsumed food | YES | NO | NO |
| 18 | Allows high quantities and a wide variety of foods | YES | NO | NO |
| 19 | Totally withdraws unconsumed food (optional) | YES (with total sweep or dumping) | NO | NO |
| 20 | Totally withdraws and recycles unconsumed food (optional) | YES (with total sweep or dumping) | NO | NO |
| | Characteristics of unconsumed food measurement: | | | |
| 21 | Measures individual amount of unconsumed food | YES | NO | NO |
| 22 | Quantify the amount of food effectively consumed by each animal | YES | NO | NO |
| 23 | Determines the animal's maximum ingestion capacity | YES | NO | NO |
| 24 | Allows to feed based on the maximum ingestion capacity | YES | NO | NO |

TABLE 1-continued

| VARIABLE COMPARED | PROPOSED INVENTION | FR 2704720 A1, Pierre Sigal (Owner and Inventor) | FR 2781120 A1, Bayle ETS (Owner) Pierre Sigal (Inventor) |
|---|---|---|---|
| 25 Allows automatic adjustment (increase) of amount of food dispensed | YES | NO | NO |
| 26 Allows to evaluate animal response to the assigned diet | YES | NO | NO |
| 27 Allows to individually maximize animal productive peak during first third lactation | YES | NO | NO |
| 28 Allows to verify high-risk additives consumption | YES | NO | NO |
| 29 Allows the early detection of sicknesses | YES | NO | NO |
| 30 Minimizes the unconsumed food that remains in the trough | YES | NO | NO |
| 31 Reduces unconsumed food handling cost | YES | NO | NO |
| ANIMAL HANDLING | | | |
| 32 Applicable to big animals at low cost | YES | NO | NO |
| 33 Has mechanisms for accommodating animals in their sites | NO (making it faster) | YES | YES |
| 34 The curtain/screen controls site access | NO | YES | YES |
| 35 Allows for the free circulation of animals during their entrance to the stall | YES | NO | NO |
| 36 Withdraws unconsumed food | YES (with total sweep or dumping) | NO | NO |
| 37 Can operate without the handling mechanism(s) without notoriously reducing milking performance | YES (with total sweep or dumping) | NO | NO |
| 38 Can operate without the handling mechanism(s) without notoriously reducing the stall's performance | YES (with total sweep or dumping) | NO | NO |
| 39 Can operate without the handling mechanism(s) without notoriously altering animal circulation Specific characteristics for the case of partial sweeping: | YES (with total sweep or dumping) | NO | NO |
| 40 The handling mechanisms control food access | YES | YES | YES |
| 41 Can operate without the use of animal accommodating mechanisms | YES | NO | NO |
| 42 Can operate without the use of animal headlock gates | YES | NO | NO |
| 43 The handling mechanisms result in low-cost for handling a high number of animals | YES | NO | NO |
| 44 The robustness of the handling mechanism is independent of animal size | YES | NO | NO |
| 45 Animal entrance and exit are controlled by the same handling mechanism | YES | NO | NO |
| 46 The handling mechanism facilitates the separation of animals without using high-cost stalls (for ex. headlock gates) | YES | NO | NO |

On the other hand, the economic aspects of the South American Southern Cone's pasture-based dairy farming must be considered. While in decades past said farms could easily compete on a price basis at a global level, in the last decade production costs—in average—have considerably increased, rendering their economic viability questionable.

During decades, said costs have been compensated—although not sufficiently—by means of a continuous genetic improvement in production animals, an improvement also in feeding practices and an increase in scale of the productive units. Nonetheless, the automatic individualized feeding is still an unresolved issue.

Given that in practical terms it has not been possible or viable to individualize animal feeding at said degree, there is an unexploited productive potential that is believed to be the next and obvious step in recovering lost profitability. We believe to be providing the solution.

In that sense, it is interesting to consider the unexploited productive potential that resides in managing the food administered to those animals that are in the first third of their lactation, and especially those that are at the beginning of their lactation.

In the measure that individualized feeding is able to compensate the nutritional deficit that the animal has in this stage (as a result of having begun to produce milk), it determines the animal's productivity not only during its lactation's first third but also determines the animal's productivity for the whole lactation period and also its reproductive efficiency and other health aspects.

Given that currently, animals in the first third of their lactation are fed with the same food mix as the rest of the animals in the herd, it is not possible to contemplate their specific nutritional needs, furthermore, given that it is nor usual to use automatic identification systems it is not possible to sufficiently observe those animals that go unnoticed in the plurality of animals of big herds.

This perceived necessity of feeding animals in an individualized way during the lactation's first third is a notorious deficit that is the main reason of being in implementing an individualized feeding in the pasture-based herds here considered, a need that, in the measure that herds and the stalls' sites' number increase, turns this production mode unsustainable as may be readily seen in the South American Southern Cone.

This notorious lack of a solution is to such a degree important in the whole lactation cycle's productivity and thus in a productive unit's economic equation, that as has been mentioned above, what is attained in increasing lactation's first third production determines the whole period's production to a factor of at least 200 times (see FIG. 1). So much so that what was not attained in the first three months of the lactation period shall not be attained later on however favorable the conditions may be, and optimum the feeding and milking quality.

Finally, as a result of the elaboration of solutions oriented firstly to solve the problem of pasture based productive units, during the development of the current invention solutions have been attained whose characteristics may turn convenient its application beyond the kind of exploitation here considered in the first instance, and beyond current scenarios.

As a result of the "mad cow disease" phenomenon, organic beef and milk global markets acquired a high dynamism, and at the same time the volatility and global competition of non-organic milk and beef prices reduce the profit margins for non-organic products.

In this way, for the case of milk and beef production units based on predominantly pasture-based feeding, may not being convenient to migrate to great scale production systems based on animal permanent enclosure, since the pasture based production may migrate rather easily to organic production, and at the same time, the size and current exploitation practices in the regions here considered are adequate for migrating to said organic production.

It is believed that the solutions here proposed for animal feeding in pasture-based production units are not only convenient for beef and milk production according to current practices, but that additionally they show a good potential for its future application to organic beef and milk production.

In this sense, it is important to remember that said solutions adequately solve the feeding of herds with animals in a varied state of their lactation, a state that comes from the lack of use of hormones to synchronize animal heat, being this one of the normative requisites for organic production, that is at world level, directly or indirectly, the market niche to which every producer (and every consumer) aims to.

An additional point to be considered is the increasing relevance of the environmental footprint caused by animal Nitrogen excretion in pasture-based production. Managing Nitrogen excretion is another challenge that depends on feeding optimization and it may easily be improved by means of the solution here proposed.

Another possible future scenery refers to the applicability of "digital nutrition" in pasture-based dairy farms. This technique, adopting "big data" services, shows a high potential for production efficiency improvement in housing dairy farms, but its applicability to pasture-based dairy farms remains unclear.

Although theoretically, many digital platforms offer functions for improving feed efficiency in pasture-based dairy farms, no one solves the precision feeding at the individual animal level for small and mid-sized pasture-based dairy farms, making questionable the applicability of such technologies to those farms.

Since the solutions here proposed meet the precision requirements for applying digital nutrition efficiently at the individual animal level, it could also be a key for the middle term sustainability of the farms here considered. Thus, this solution solves not only short term necessities but also could be a response to the future integration of those farms to digital management practices.

All the reasons exposed means no less than the survival of said small and medium-sized farms and the economic viability of many rural families that would otherwise feel forced to migrate to the cities. This undesirable depopulation of the countryside has been ameliorated in many countries as for example the ones belonging to the European Union, by big government subsidies.

Our invention would make those subsidies unnecessary. Thus, stopping the countryside's depopulation and avoiding subsidies speak for themselves of the perceived need for an invention as the one herewith proposed.

The invention claimed is:

1. A method of identifying and feeding animals that it is applied to any type of animal while remaining sited in a stall, where the stall defines multiple contiguous sites arranged in a row from a first site to a last site, where the animals are fed in a trough attached along the stall, wherein said identifying and said feeding are performed by a mobile feeding device displaced along the trough, wherein said identifying of each particular animal of the animals is achieved by an identification process that identifies each particular animal several times during a stay period of said each particular animal in each particular site of the multiple contiguous sites, wherein animals arriving or exiting the trough do so progressively from the first site to the last site, wherein animals entering the stall do so as a batch of equal or smaller size than a number of the multiple contiguous sites of the stall, where the stall is entirely vacated before each batch entrance, wherein the identification process is repeated for each batch entering the stall, and wherein the identification process includes:

displacing the mobile feeding device to a position at the first site once an entrance of a batch of animals is allowed, the first site of the row being a site most distant to an area at which animals enter;

triggering a one site displacement of the mobile feeding device to a position at a next site once identification is obtained in a current site, and so on to a position at the next site triggering each one of the one site displacement once identification is obtained in the current site, associating an identification obtained in each site to the corresponding site number;

triggering the one site displacement of the mobile feeding device to a position at the next site through a human operator intervention or after a predetermined time has elapsed for the permanence of said device in the current site, when identification cannot be achieved in the current site;

triggering the one site displacement of the mobile feeding device to a position at a previous site when it is required to verify an identification recently obtained in the previous site, and then retaking the original direction that was being traveled;

displacing the mobile feeding device according to the previous points from the first site to the last site thus performing a run, then displacing the mobile feeding device according to the previous points from the last site to the first site thus performing another run, and so on performing runs in both directions of the row, serving in each run the totality of sites of the row;

accounting the runs in which the mobile feeding device stops in order to serve each particular site through a run counting assigned to each particular site, thus performing as many run counting as sites the row has, initiating from zero the run counting of a particular site when an animal arrives at said particular site;

comparing different identifications obtained on each particular site since the run counting of said each particular site was initiated from zero, since an animal arrives, comparing as many identifications obtained in a particular site as runs accounted for in said particular site, considering as the identification the one that is repeated in said particular site at least a pre-established number of times;

determining a separation of a particular animal sited in a particular site from the rest of animals when the number of runs during which an identification cannot be achieved in said particular site exceeds a pre-established threshold, considering runs accounted for since the run counting of said particular site was initiated from zero, since an animal arrives; and storing data generated or obtained in order to be used for other purposes, wherein the mobile feeding device additionally operates accordingly to a feeding process that depends on the identification process, wherein the mobile feeding device dispenses food doses composed by a mix of different food types and/or additives to perform an individualized feeding of each particular animal, wherein unconsumed food that remains in the trough is dragged by a sweeping device that operates coupled to the mobile feeding device, wherein the sweeping device performs a sweeping action during which the volume of dragged food is measured many times in each particular site, wherein the sweeping device is equipped with a sluice that drains-through a portion of the dragged food during the sweeping action, wherein the drained-through food will remain in the trough after the sweeping action, to be eaten by any other animal later accessing the trough, wherein the feeding process includes:

determining an initial dose of food that may be ingested up to three times by any animal during its stay in the stall and without said ingestions meaning a health and/or productivity risk;

dispensing the initial dose in each particular site as the run counting of each particular site accounts the first run, dispensing the initial dose immediately after identification is obtained in said each particular site;

dispensing the initial dose in a particular site after a predetermined time has elapsed for the permanence of the mobile feeding device in said particular site, even when identification cannot be achieved in said particular site, considering said predetermined time starting when the run counting of said particular site accounts the first run;

adjusting a volume of the initial dose, being the initial dose dispensed in each particular site as a function of the volume of food previously existing inside the trough in said each particular site;

having in advance feeding parameters, according to individual diets of animals and such that it is possible to determine for each particular animal, a main dose of food composed by a mix of different food types and/or additives, and a final dose of food that should not contain high-risk additives;

dispensing a main dose in each particular site once the specific run assigned for dispensing the main dose has been counted by the run counting of each particular site, only if there is an indication that is repeated at least a pre-established number of times in said each particular site;

dispensing a final dose in each particular site once the specific run assigned to dispensing the final dose has been counted by the run counting of each particular site, only if there is an indication that is repeated at least a pre-established number of times and additionally no high-risk additives have been dispensed in said each particular site;

dispensing another initial dose instead of the main dose and/or instead of the final dose in a particular site when it is not possible to dispense the main dose and/or the final dose in said particular site because there is no identification that is repeated a pre-established number of times;

sweeping the unconsumed food in each particular site once animal exit is enabled in said each particular site, being the sweeping device displaced one site behind the mobile feeding device during the sweeping action;

measuring the dragged food volume many times in each particular site during the sweeping action performed in said each particular site, with the volume measurements made in a particular site being distributed at regular distances along the trough portion pertaining to said particular site in such a way that each measurement allows to quantify a volume increment/decrement of the dragged food across each one of said regular distances in said particular site;

determining a maximum remaining food volume that may remain in a particular site after the sweeping action and could be eaten by any other animal later occupying said particular site, without this entailing a health and/or productivity risk for said any other animal;

draining-through a portion of the food dragged during the sweeping action, in such a way that the volume of the drained-through food that remains in a particular site does not go beyond the maximum remaining food volume;

measuring the unconsumed food in each particular site and associating said unconsumed food measurement to the identity of the animal that has previously occupied said each particular site, with the unconsumed food measurement being made in a particular site as the summation of each one of the volume variations of the dragged food in said particular site and the volume of drained-through food remaining in said particular site; and storing data generated or obtained so that it may be used for other purposes.

2. The method of claim 1, wherein animal handling is done by an endless curtain that functions jointly with the mobile feeding device, wherein the endless curtain is set along the trough in such a way that approximately half of the endless curtain is set above or inside the trough, wherein the endless curtain functions such as a belt that is displaced always in the same direction and the endless curtain is equipped with a blocking portion that impedes animal access to the food inside the trough, without impeding animal access to the sites of the stall, wherein the position of the blocking portion that simultaneously impedes all access to the food in all sites is that in which a start of the blocking portion is positioned on the last site and an end of the blocking portion is positioned on the first site, and wherein the animal handling also includes:

positioning, before a batch of animals enters the stall, the blocking portion so that it will impede access to the food inside the trough in all sites except for the first site, being the end of the blocking portion positioned on the second site;

displacing the blocking portion of the endless curtain as the mobile feeding device dispenses the initial dose and the run counting of each site accounts for a first run, thus progressively enabling animal access to the food and progressively ordering animals arriving to the trough, being the end of the blocking portion displaced one site ahead of the mobile feeding device, starting at the second site, so that the blocking portion will not interfere with the current site served by the mobile feeding device;

enabling food access only for a number of existing animals and then stop the displacement of the blocking portion when the number of animals in a batch occupying the stall is less than the number of sites in the stall;

displacing the blocking portion, progressively impeding animal access to food from the first site to the last site during the sweeping action, being the start of the blocking portion displaced jointly with the sweeping device being one site behind the mobile feeding device so that it will not interfere with the current site being served by the mobile feeding device;

stopping the displacement of the mobile feeding device during the sweeping action, when the separation of a particular animal has been determined, such that the mobile feeding device remains serving the site occupied by the particular animal to be separated and the start of the blocking portion of the endless curtain remains in the previous site;

dispensing food in the current site while the mobile feeding device remains stopped accordingly to the previous point, in order to hold back the animal to be separated and as a result holding back all those animals sited from the next site to the last site;

waiting until all animals sited from the previous site to the first site abandon the stall, and perform the necessary operations to change the destiny place to which an animal to be separated shall accede after leaving the stall;

allowing again the displacement of the mobile feeding device after changing the destiny place according to previous point, discouraging the stay in the stall of an animal to be separated through a one site displacement of the blocking portion of the endless curtain;

repeating said stopping the displacement of the mobile device, said dispensing food in the current site, said waiting until all animals sited from the previous site abandon the stall, and said allowing again the displacement of the mobile feeding device to restore the destiny place to which an animal sited at the next site shall accede after leaving the stall; and storing data generated or obtained.

3. The method of claim 1, wherein the unconsumed food is partially or totally recovered and weighted in each particular site by a recovery device that is attached to the mobile feeding device, wherein food is dragged by the sweeping device and unloaded by gravity through a hole that the trough has in each particular site, wherein the food unloaded from the trough is weighted in each particular site by the recovery device, and wherein the unconsumed food is measured in each particular site associating said unconsumed food measurement to the identity of the animal that has previously occupied said each particular site, with the unconsumed food measurement being made in a particular site as a summation of each one of the volume variations of the dragged food in said particular site, the volume of drained-trough food remaining in said particular site, and the weight of food unloaded from the trough in said particular site.

4. The method of claim 3, wherein the animals are feeding during a session lasting a pre-determined time, wherein the animals arriving or exiting the trough may do so randomly during the session, wherein each particular site operates during the session independently from other sites, wherein each particular site can serve multiple consecutive animals during the session, serving in each run the totality of sites of the row, wherein the identification process and the feeding process are continuously repeated during the session, and wherein the sweeping action is performed in each particular site independently from other sites and without interfering in the identification process and the feeding process performed in said other sites.

5. A system for identifying and feeding animals that is applied to any type of animal while remaining sited in a stall, where the stall defines multiple contiguous sites arranged in a row from a first site up to a last site, wherein animals are fed in a trough that is attached along the stall, wherein each particular animal of the animals is identified several times during a stay period of said particular animal in a site, wherein each particular animal is fed several times during the stay period of said particular animal in a site, wherein each particular animal is fed according to its identity by dispensing individualized food doses composed by a mix of different food types and/or additives, wherein food that remains in the trough after feeding animals is dragged and measured in each particular site associating each measurement to the identity of the animal that previously occupied said each particular site, and wherein the system for identifying and feeding animals includes:

a mobile feeding device mounted on rails so that it may be displaced along the trough near to animals sited in the stall;

a transmission device for displacement of the mobile feeding device from site to site in both directions along the row;

a traction device capable of displacing the mobile feeding device at a speed such that the mobile feeding device is allowed to serve all sites of the row, several times in both directions along the row, during the stay period of any particular animal in the stall;

a site sensor, coupled to the mobile feeding device that detects each position where the mobile feeding device must stop in order to serve each particular site;

an identification device attached to the mobile feeding device that identifies each particular animal sited in each particular site when the mobile feeding device stops in order to serve said each particular site;

an indicator device, coupled to the mobile feeding device and operated above animals sited in the stall, physically indicating, by visual association, to a human operator each particular site being served by the mobile feeding device;

an animal sensor, attached to the indicator device, that detects each particular animal sited in each particular site that is being served by the mobile feeding device;

an indicator panel, attached to the indicator device, that reports to the human operator at least an identification code associated with each particular animal that is being identified and also indicates the eventual separation of said each particular animal from the rest of animals;

a food deposit, attached to the mobile feeding device, equipped with multiple internal compartments, each one of the multiple internal compartments dedicated to store a type of food or an additive;

a dosing device, attached to the mobile feeding device, capable of dispensing in the trough, in each particular site, food doses composed by a mix of different food types and/or additives;

a collector, coupled to the dosing device, that receives different food types and additives from the dosing device and mixes them before being dispensed in the trough;

a sweeping device, coupled to the mobile feeding device, that allows the sweeping device to be displaced inside the trough performing a sweeping action during which the unconsumed food is dragged along the trough;

a sluice, attached to the sweeping device, that drains through part of the food dragged along the trough so that the drained-through food will remain in the trough, being the sluice opening adjustable either manually or automatically;

a metering device, coupled to the sweeping device, that measures a volume of the dragged food; and a handler for handling animals during entrance and/or exit to the stall, said handler comprising:

an endless curtain set along the trough, that functions as a belt displaced always in a same direction;

a blocking portion of approximately a first half of the length of the endless curtain that impedes access to the food for the animals when the blocking portion is positioned above or inside the trough;

a non-blocking portion of approximately a second half of the length of the endless curtain that allows animal access to the food when the non-blocking portion is positioned above or inside the trough;

a curtain transmission device that during animals entrance to the stall displaces the blocking portion to allow food access progressively, site by site, until access to the food is allowed in all sites, and that during animal exit from the stall displaces the endless curtain in the same direction of displacement and in such a way that the blocking portion impedes food access progressively, site by site, until it impedes access to the food in all sites;

a curtain traction device capable of displacing the endless curtain in synchronicity with the mobile feeding device displacement one or more position sensors, coupled to the curtain traction device;

one or more additional endless curtains, each one operating in a segment of the trough, when the trough length is excessive for using only a single endless curtain; and one or more additional sweeping devices coupled to the endless curtains when the trough length is excessive for using only the sweeping device that is coupled to the mobile feeding device, wherein the blocking portion of the endless curtain that impedes food access is electrified.

6. A system for identifying and feeding animals that is applied to any type of animal while remaining sited in a stall, where the stall defines multiple contiguous sites arranged in a row from a first site up to a last site, wherein animals are fed in a trough that is attached along the stall, wherein each particular animal of the animals is identified several times during a stay period of said particular animal in a site, wherein each particular animal is fed several times during the stay period of said particular animal in a site, wherein each particular animal is fed according to its identity by dispensing individualized food doses composed by a mix of different food types and/or additives, wherein food that remains in the trough after feeding animals is dragged and measured in each particular site associating each measurement to the identity of the animal that previously occupied said each particular site, and wherein the system for identifying and feeding animals includes:

a mobile feeding device mounted on rails so that it may be displaced along the trough near to animals sited in the stall;

a transmission device for displacement of the mobile feeding device from site to site in both directions along the row;

a traction device capable of displacing the mobile feeding device at a speed such that the mobile feeding device is allowed to serve all sites of the row, several times in both directions along the row, during the stay period of any particular animal in the stall;

a site sensor, coupled to the mobile feeding device that detects each position where the mobile feeding device must stop in order to serve each particular site;

an identification device attached to the mobile feeding device that identifies each particular animal sited in each particular site when the mobile feeding device stops in order to serve said each particular site;

an indicator device, coupled to the mobile feeding device and operated above animals sited in the stall, physically indicating, by visual association, to a human operator each particular site being served by the mobile feeding device;

an animal sensor, attached to the indicator device, that detects each particular animal sited in each particular site that is being served by the mobile feeding device;

an indicator panel, attached to the indicator device, that reports to the human operator at least an identification code associated with each particular animal that is being identified and also indicates the eventual separation of said each particular animal from the rest of animals;

a food deposit, attached to the mobile feeding device, equipped with multiple internal compartments, each one of the multiple internal compartments dedicated to store a type of food or an additive;

a dosing device, attached to the mobile feeding device, capable of dispensing in the trough, in each particular site, food doses composed by a mix of different food types and/or additives;

a collector, coupled to the dosing device, that receives different food types and additives from the dosing device and mixes them before being dispensed in the trough;

a sweeping device, coupled to the mobile feeding device, that allows the sweeping device to be displaced inside the trough performing a sweeping action during which the unconsumed food is dragged along the trough;

a sluice, attached to the sweeping device, that drains through part of the food dragged along the trough so that the drained-through food will remain in the trough, being the sluice opening adjustable either manually or automatically; and a metering device, coupled to the sweeping device, that measures a volume of the dragged food, wherein food dragged inside the trough is partially or totally unloaded from the trough in each particular site, wherein food unloaded from the trough is recovered and weighted in each particular site associating food weight measurement to the identity of the animal that previously occupied said each particular site, and where the system further comprises:

a recovery device attached to the mobile feeding device, that receives and stores the unloaded food, the recovery device being equipped with a scale to determine a weight of the unloaded food in each particular site;

a plurality of discharge holes in a bottom part of the trough, having in each particular site a discharge hole that unloads by gravity the food dragged inside the trough;

a carrier channel, attached to the recovery device, that receives the food unloaded from the trough and transports it to the recovery device, by gravity;

a discharging device, coupled to the recovery device, configured to discharge food received by the recovery device; and one or more food receivers, sited in fixed points of the row, allowing discharging food stored in the recovery device to be later recycled or discarded.

7. The system of claim 6, wherein the unloaded food stored in the recovery device is automatically withdrawn and recycled, and wherein the system further comprises:

a recycling device attached to the mobile feeding device that withdraws food stored in the recovery device and mixes it with food stored in at least one of the compartments of the food deposit;

a discharging collector attached to the recovery device that receives food stored in the recovery device;

an elevating device that withdraws food stored in the discharging collector and discharge said food in at least one of the food deposit of the mobile feeding device; and one or more mixers, each mixer assigned to each compartment of the food deposit.

\* \* \* \* \*